(12) United States Patent
Lakshamanan et al.

(10) Patent No.: US 11,810,405 B2
(45) Date of Patent: *Nov. 7, 2023

(54) AUTONOMOUS VEHICLE ADVANCED SENSING AND RESPONSE

(71) Applicant: Intel Corporation, Santa Clara, CA (US)

(72) Inventors: Barath Lakshamanan, Chandler, AZ (US); Linda L. Hurd, Cool, CA (US); Ben J. Ashbaugh, Folsom, CA (US); Elmoustapha Ould-Ahmed-Vall, Chandler, AZ (US); Liwei Ma, Beijing (CN); Jingyi Jin, Folsom, CA (US); Justin E. Gottschlich, Santa Clara, CA (US); Chandrasekaran Sakthivel, Sunnyvale, CA (US); Michael S. Strickland, Sunnyvale, CA (US); Brian T. Lewis, Palo Alto, CA (US); Lindsey Kuper, Santa Clara, CA (US); Altug Koker, El Dorado Hills, CA (US); Abhishek R. Appu, El Dorado Hills, CA (US); Prasoonkumar Surti, Folsom, CA (US); Joydeep Ray, Folsom, CA (US); Balaji Vembu, Folsom, CA (US); Javier S. Turek, Hillsboro, OR (US); Naila Farooqui, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 164 days.

This patent is subject to a terminal disclaimer.

(21) Appl. No.: 17/539,083

(22) Filed: Nov. 30, 2021

(65) Prior Publication Data
US 2022/0084329 A1 Mar. 17, 2022

Related U.S. Application Data

(63) Continuation of application No. 16/383,849, filed on Apr. 15, 2019, now Pat. No. 11,217,040, which is a
(Continued)

(51) Int. Cl.
G01C 22/00 (2006.01)
G07C 5/00 (2006.01)
(Continued)

(52) U.S. Cl.
CPC ............. *G07C 5/008* (2013.01); *B60W 30/00* (2013.01); *G01C 21/34* (2013.01);
(Continued)

(58) Field of Classification Search
CPC .... G07C 5/008; G06N 99/005; G05D 1/0088; G05D 1/0257; G01C 21/3492;
(Continued)

(56) References Cited

U.S. PATENT DOCUMENTS 4,920,487 A 4/1990 Baffes
6,601,101 B1 * 7/2003 Lee .................... H04L 67/1008
709/227
(Continued)

FOREIGN PATENT DOCUMENTS

EP 2808792 A1 12/2014
EP 3401786 11/2018
(Continued)

OTHER PUBLICATIONS

Notification of Publication for CN Application No. 201810339594.7 (Pub No. 108733051), 5 pages, Nov. 2, 2018.
(Continued)

*Primary Examiner* — Shardul D Patel
(74) *Attorney, Agent, or Firm* — Jaffery Watson Mendonsa & Hamilton LLP

(57) ABSTRACT

An autonomous vehicle is provided that includes one or more processors configured to provide a local compute manager to manage execution of compute workloads associated with the autonomous vehicle. The local compute manager can perform various compute operations, including
(Continued)

US 11,810,405 B2
Page 2 receiving offload of compute operations from to other compute nodes and offloading compute operations to other compute notes, where the other compute nodes can be other autonomous vehicles. The local compute manager can also facilitate autonomous navigation functionality.

25 Claims, 48 Drawing Sheets

Related U.S. Application Data continuation of application No. 15/488,914, filed on Apr. 17, 2017, now Pat. No. 10,332,320.

(51) Int. Cl.

| | |
|---|---|
| *G05D 1/00* | (2006.01) |
| *G08G 1/01* | (2006.01) |
| *H04L 67/12* | (2022.01) |
| *G06N 20/00* | (2019.01) |
| *G06F 9/50* | (2006.01) |
| *G01C 21/34* | (2006.01) |
| *B60W 30/00* | (2006.01) |
| *G06N 3/063* | (2023.01) |
| *G06N 3/084* | (2023.01) |
| *G06N 20/10* | (2019.01) |
| *G06N 3/044* | (2023.01) |
| *G06N 3/045* | (2023.01) |
| *G08G 1/052* | (2006.01) |
| *G01S 19/13* | (2010.01) |
| *H04L 43/0852* | (2022.01) |
| *G05D 1/02* | (2020.01) |
| *H04L 43/16* | (2022.01) |

(52) U.S. Cl.
CPC ..... *G01C 21/3415* (2013.01); *G01C 21/3492* (2013.01); *G05D 1/0088* (2013.01); *G06F 9/5027* (2013.01); *G06N 3/044* (2023.01); *G06N 3/045* (2023.01); *G06N 3/063* (2013.01); *G06N 3/084* (2013.01); *G06N 20/00* (2019.01); *G06N 20/10* (2019.01); *G08G 1/012* (2013.01); *H04L 67/12* (2013.01); *G01S 19/13* (2013.01); *G05D 1/0257* (2013.01); *G05D 2201/0213* (2013.01); *G06F 2209/509* (2013.01); *G08G 1/0112* (2013.01); *G08G 1/052* (2013.01); *H04L 43/0852* (2013.01); *H04L 43/16* (2013.01)

(58) Field of Classification Search
CPC ... G01C 21/3415; G01C 22/00; H04W 28/08; G08G 1/012; G08G 1/052; H04L 67/12; H04L 43/0852; H04L 43/16; G01S 19/13
USPC .......................................................... 701/24
See application file for complete search history.

(56) References Cited

U.S. PATENT DOCUMENTS

| | | | |
|---|---|---|---|
| 7,873,812 B1 | 1/2011 | Mimar | |
| 10,332,320 B2* | 6/2019 | Lakshamanan | G06N 3/063 |
| 10,528,864 B2 | 1/2020 | Dally et al. | |
| 10,860,922 B2 | 12/2020 | Dally et al. | |
| 10,891,538 B2 | 1/2021 | Dally et al. | |
| 11,217,040 B2* | 1/2022 | Lakshamanan | G06N 20/10 |
| 2012/0102189 A1 | 4/2012 | Burge et al. | |
| 2013/0047155 A1* | 2/2013 | Caspole | G06F 9/5055 718/1 |
| 2015/0331422 A1 | 11/2015 | Hartung et al. | |
| 2015/0348335 A1* | 12/2015 | Ramanujam | G05D 1/0225 701/23 |
| 2016/0062947 A1* | 3/2016 | Chetlur | G06F 17/153 708/420 |
| 2016/0170785 A1* | 6/2016 | Liguori | G06F 9/5016 718/1 |
| 2016/0223813 A1* | 8/2016 | Feldman | B60K 37/04 |
| 2017/0068550 A1* | 3/2017 | Zeitlin | G10L 15/285 |
| 2017/0264493 A1* | 9/2017 | Cencini | H04L 41/0893 |
| 2018/0046906 A1 | 2/2018 | Dally et al. | |
| 2018/0183860 A1* | 6/2018 | Majumdar | H04L 67/1001 |

FOREIGN PATENT DOCUMENTS

| | | |
|---|---|---|
| GB | 2272085 A | 5/1994 |
| WO | 2015130645 A1 | 9/2015 |

OTHER PUBLICATIONS

Goodfellow, et al. "Adaptive Computation and Machine Learning Series", Book, Nov. 18, 2016, pp. 98-165, Chapter 5, The MIT Press, Cambridge, MA.

Ross, et al. "Intel Processor Graphics: Architecture & Programming", Power Point Presentation, Aug. 2015, 78 pages, Intel Corporation, Santa Clara, CA.

Shane Cook, "CUDA Programming", Book, 2013, pp. 37-52, Chapter 3, Elsevier Inc., Amsterdam Netherlands.

Nicholas Wilt, "The CUDA Handbook; A Comprehensive Guide to GPU Programming", Book, Jun. 22, 2013, pp. 41-57, Addison-Wesley Professional, Boston, MA.

Stephen Junkins, "The Compute Architecture of Intel Processor Graphics Gen9", paper, Aug. 14, 2015, 22 pages, Version 1.0, Intel Corporation, Santa Clara, CA.

Partial European Search Report for EP 18162597.1, Oct. 4, 2018, 18 pages.

Gil, et al., "Cooperative Scheduling of Tasks for Networked Uninhabited Autonomous Vehicles", 42nd IEEE Conference on Decision and Control, XP010686314, Dec. 9, 2003, pp. 522-527.

Taj Alam et al., "A Dynamic Load Balancing Strategy with Adaptive Threshold Based Approach", Parallel Distributed and Grid Computing, 2012 2nd IEEE International Conference, Dec. 6, 2012, pp. 927-932, XP032325999.

Yook et al., "A Design Methodology for Distributed Control Systems to Optimize Performance in the Presence of Time Delays", American Control Conference, Jun. 28, 2000, XP010518251, pp. 1959-1964.

Notice of Allowance from U.S. Appl. No. 15/488,914, 9 pages, Jan. 24, 2019.

Communication Pursuant to Article 94(3) for EP Application No. 18 162 597.1, dated Apr. 26, 2021, 5 pages.

* cited by examiner

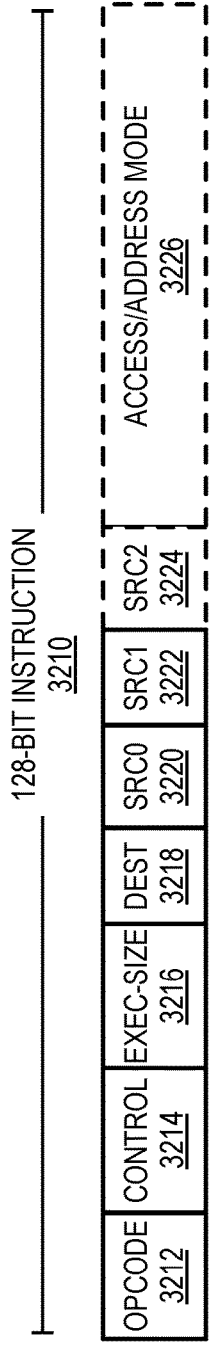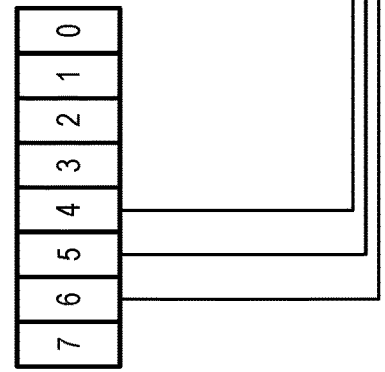
FIG. 32

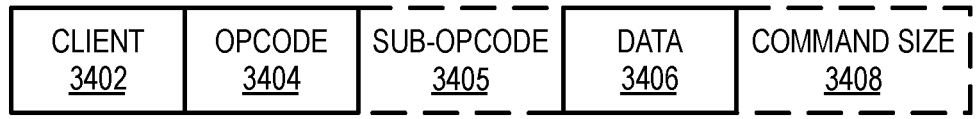
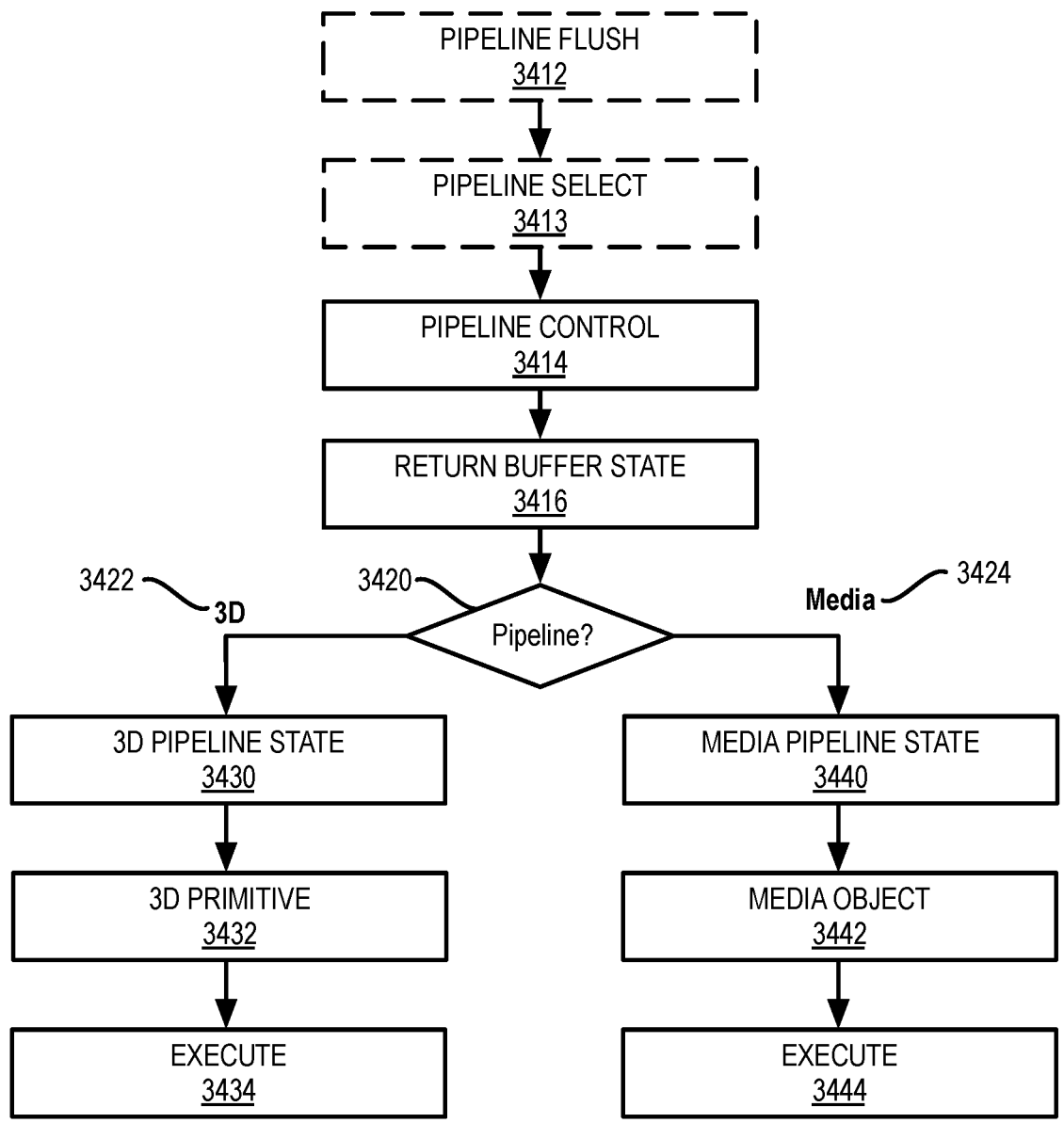

AUTONOMOUS VEHICLE ADVANCED SENSING AND RESPONSE

CROSS-REFERENCE

This application is a continuation of application Ser. No. 16/383,849, filed Apr. 15, 2019, now issued as U.S. Pat. No. 11,217,040, which is a continuation of application Ser. No. 15/488,914, filed Apr. 17, 2017, now issued as U.S. Pat. No. 10,332,320, the entire contents of which are hereby incorporated herein by reference.

FIELD

Embodiments relate generally to data processing and more particularly to data processing via a general-purpose graphics processing unit.

BACKGROUND OF THE DESCRIPTION

Current parallel graphics data processing includes systems and methods developed to perform specific operations on graphics data such as, for example, linear interpolation, tessellation, rasterization, texture mapping, depth testing, etc. Traditionally, graphics processors used fixed function computational units to process graphics data; however, more recently, portions of graphics processors have been made programmable, enabling such processors to support a wider variety of operations for processing vertex and fragment data.

To further increase performance, graphics processors typically implement processing techniques such as pipelining that attempt to process, in parallel, as much graphics data as possible throughout the different parts of the graphics pipeline. Parallel graphics processors with single instruction, multiple thread (SIMT) architectures are designed to maximize the amount of parallel processing in the graphics pipeline. In an SIMT architecture, groups of parallel threads attempt to execute program instructions synchronously together as often as possible to increase processing efficiency. A general overview of software and hardware for SIMT architectures can be found in Shane Cook, *CUDA Programming*, Chapter 3, pages 37-51 (2013) and/or Nicholas Wilt, *CUDA Handbook, A Comprehensive Guide to GPU Programming*, Sections 2.6.2 to 3.1.2 (June 2013).

BRIEF DESCRIPTION OF THE DRAWINGS

Embodiments described herein are illustrated by the way of example and not limitation in the figures of the accompanying drawings in which like references indicate similar elements, and in which:

FIG. 32 is a block diagram illustrating graphics processor instruction formats according to some embodiments;

FIG. 34A-34B illustrate a graphics processor command format and command sequence, according to some embodiments;

DETAILED DESCRIPTION

In some embodiments, a graphics processing unit (GPU) is communicatively coupled to host/processor cores to accelerate graphics operations, machine-learning operations, pattern analysis operations, and various general purpose GPU (GPGPU) functions. The GPU may be communicatively coupled to the host processor/cores over a bus or another interconnect (e.g., a high-speed interconnect such as PCIe or NVLink). In other embodiments, the GPU may be integrated on the same package or chip as the cores and communicatively coupled to the cores over an internal processor bus/interconnect (i.e., internal to the package or chip). Regardless of the manner in which the GPU is connected, the processor cores may allocate work to the GPU in the form of sequences of commands/instructions contained in a work descriptor. The GPU then uses dedicated circuitry/logic for efficiently processing these commands/instructions.

In the following description, numerous specific details are set forth to provide a more thorough understanding. However, it will be apparent to one of skill in the art that the embodiments described herein may be practiced without one or more of these specific details. In other instances, well-known features have not been described to avoid obscuring the details of the present embodiments.

System Overview

Figure 1:
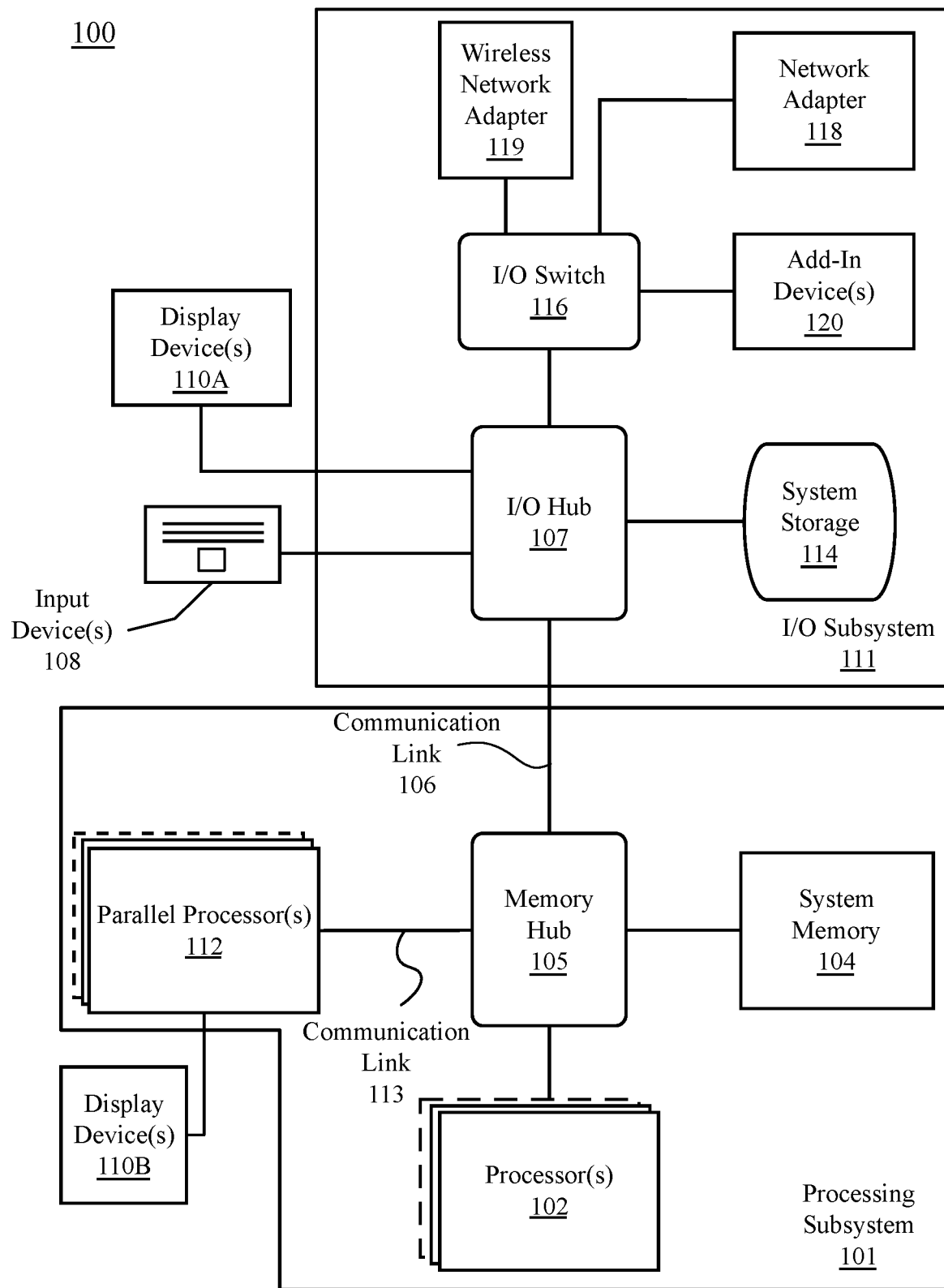
FIG. 1 is a block diagram illustrating a computer system configured to implement one or more aspects of the embodiments described herein.

FIG. 1 is a block diagram illustrating a computing system 100 configured to implement one or more aspects of the embodiments described herein. The computing system 100 includes a processing subsystem 101 having one or more processor(s) 102 and a system memory 104 communicating via an interconnection path that may include a memory hub 105. The memory hub 105 may be a separate component within a chipset component or may be integrated within the one or more processor(s) 102. The memory hub 105 couples with an I/O subsystem 111 via a communication link 106. The I/O subsystem 111 includes an I/O hub 107 that can enable the computing system 100 to receive input from one or more input device(s) 108. Additionally, the I/O hub 107 can enable a display controller, which may be included in the one or more processor(s) 102, to provide outputs to one or more display device(s) 110A. In one embodiment the one or more display device(s) 110A coupled with the I/O hub 107 can include a local, internal, or embedded display device.

In one embodiment the processing subsystem 101 includes one or more parallel processor(s) 112 coupled to memory hub 105 via a bus or other communication link 113. The communication link 113 may be one of any number of standards based communication link technologies or protocols, such as, but not limited to PCI Express, or may be a vendor specific communications interface or communications fabric. In one embodiment the one or more parallel processor(s) 112 form a computationally focused parallel or vector processing system that can include a large number of processing cores and/or processing clusters, such as a many integrated core (MIC) processor. In one embodiment the one or more parallel processor(s) 112 form a graphics processing subsystem that can output pixels to one of the one or more display device(s) 110A coupled via the I/O hub 107. The one or more parallel processor(s) 112 can also include a display controller and display interface (not shown) to enable a direct connection to one or more display device(s) 110B.

Within the I/O subsystem 111, a system storage unit 114 can connect to the I/O hub 107 to provide a storage mechanism for the computing system 100. An I/O switch 116 can be used to provide an interface mechanism to enable connections between the I/O hub 107 and other components, such as a network adapter 118 and/or wireless network adapter 119 that may be integrated into the platform, and various other devices that can be added via one or more add-in device(s) 120. The network adapter 118 can be an Ethernet adapter or another wired network adapter. The wireless network adapter 119 can include one or more of a Wi-Fi, Bluetooth, near field communication (NFC), or other network device that includes one or more wireless radios.

The computing system 100 can include other components not explicitly shown, including USB or other port connections, optical storage drives, video capture devices, and the like, may also be connected to the I/O hub 107. Communication paths interconnecting the various components in FIG. 1 may be implemented using any suitable protocols, such as PCI (Peripheral Component Interconnect) based protocols (e.g., PCI-Express), or any other bus or point-to-point communication interfaces and/or protocol(s), such as the NV-Link high-speed interconnect, or interconnect protocols known in the art.

In one embodiment, the one or more parallel processor(s) 112 incorporate circuitry optimized for graphics and video processing, including, for example, video output circuitry, and constitutes a graphics processing unit (GPU). In another embodiment, the one or more parallel processor(s) 112 incorporate circuitry optimized for general purpose processing, while preserving the underlying computational architecture, described in greater detail herein. In yet another embodiment, components of the computing system 100 may be integrated with one or more other system elements on a single integrated circuit. For example, the one or more parallel processor(s) 112, memory hub 105, processor(s) 102, and I/O hub 107 can be integrated into a system on chip (SoC) integrated circuit. Alternatively, the components of the computing system 100 can be integrated into a single package to form a system in package (SIP) configuration. In one embodiment at least a portion of the components of the computing system 100 can be integrated into a multi-chip module (MCM), which can be interconnected with other multi-chip modules into a modular computing system.

It will be appreciated that the computing system 100 shown herein is illustrative and that variations and modifications are possible. The connection topology, including the number and arrangement of bridges, the number of processor(s) 102, and the number of parallel processor(s) 112, may be modified as desired. For instance, in some embodiments, system memory 104 is connected to the processor(s) 102 directly rather than through a bridge, while other devices communicate with system memory 104 via the memory hub 105 and the processor(s) 102. In other alternative topologies, the parallel processor(s) 112 are connected to the I/O hub 107 or directly to one of the one or more processor(s) 102, rather than to the memory hub 105. In other embodiments, the I/O hub 107 and memory hub 105 may be integrated into a single chip. Some embodiments may include two or more sets of processor(s) 102 attached via multiple sockets, which can couple with two or more instances of the parallel processor(s) 112.

Some of the particular components shown herein are optional and may not be included in all implementations of the computing system 100. For example, any number of add-in cards or peripherals may be supported, or some components may be eliminated. Furthermore, some architectures may use different terminology for components similar to those illustrated in FIG. 1. For example, the memory hub 105 may be referred to as a Northbridge in some architectures, while the I/O hub 107 may be referred to as a Southbridge.

Figure 2A:
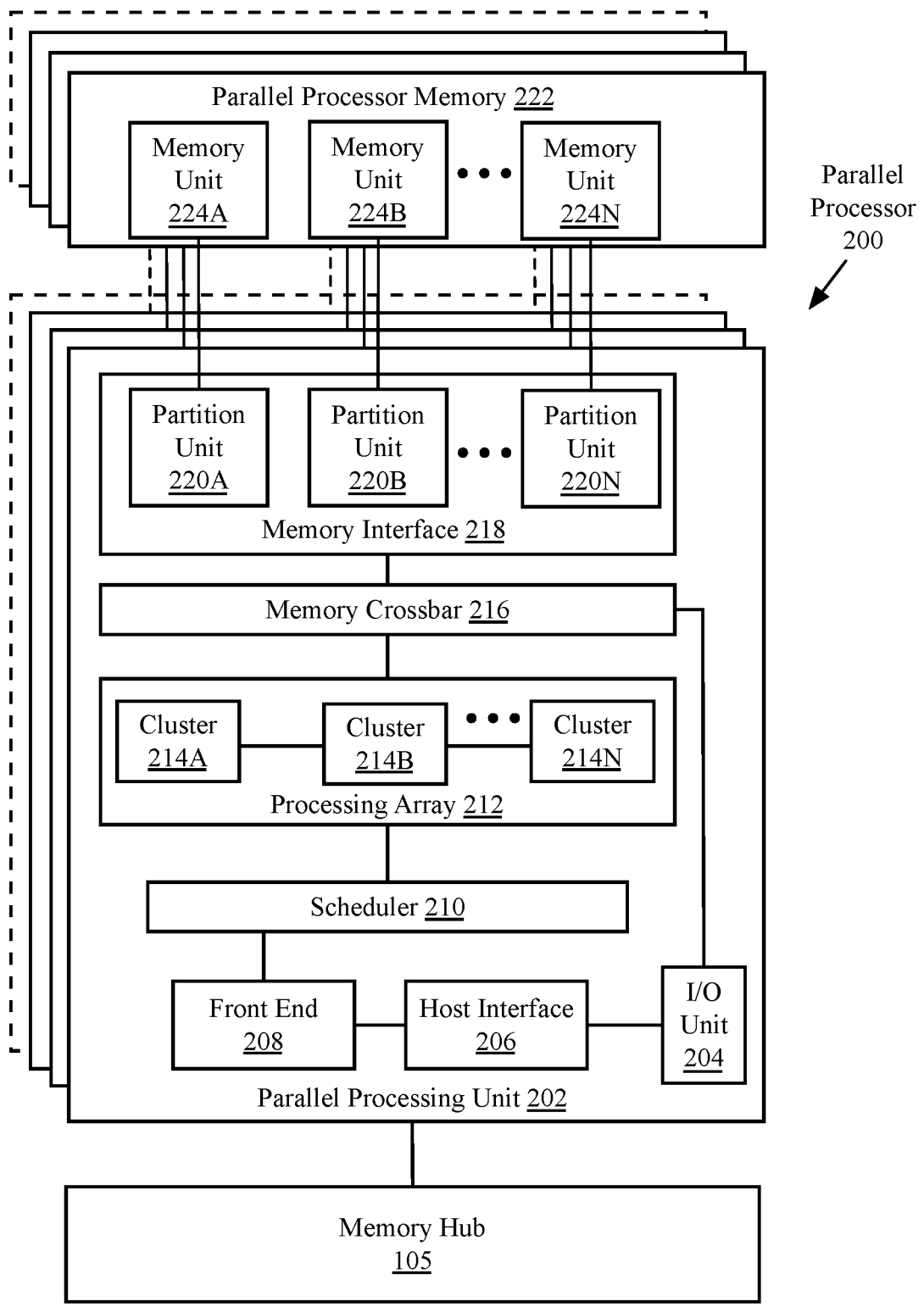
FIG. 2A-2D illustrate parallel processor components, according to an embodiment.

FIG. 2A illustrates a parallel processor 200, according to an embodiment. The various components of the parallel processor 200 may be implemented using one or more integrated circuit devices, such as programmable processors, application specific integrated circuits (ASICs), or field programmable gate arrays (FPGA). The illustrated parallel processor 200 is a variant of the one or more parallel processor(s) 112 shown in FIG. 1, according to an embodiment.

In one embodiment the parallel processor 200 includes a parallel processing unit 202. The parallel processing unit includes an I/O unit 204 that enables communication with other devices, including other instances of the parallel processing unit 202. The I/O unit 204 may be directly connected to other devices. In one embodiment the I/O unit 204 connects with other devices via the use of a hub or switch interface, such as memory hub 105. The connections between the memory hub 105 and the I/O unit 204 form a communication link 113. Within the parallel processing unit 202, the I/O unit 204 connects with a host interface 206 and a memory crossbar 216, where the host interface 206 receives commands directed to performing processing operations and the memory crossbar 216 receives commands directed to performing memory operations.

When the host interface 206 receives a command buffer via the I/O unit 204, the host interface 206 can direct work operations to perform those commands to a front end 208. In one embodiment the front end 208 couples with a scheduler 210, which is configured to distribute commands or other work items to a processing cluster array 212. In one embodiment the scheduler 210 ensures that the processing cluster array 212 is properly configured and in a valid state before tasks are distributed to the processing clusters of the processing cluster array 212.

The processing cluster array 212 can include up to "N" processing clusters (e.g., cluster 214A, cluster 214B, through cluster 214N). Each cluster 214A-214N of the processing cluster array 212 can execute a large number of concurrent threads. The scheduler 210 can allocate work to the clusters 214A-214N of the processing cluster array 212 using various scheduling and/or work distribution algorithms, which may vary depending on the workload arising for each type of program or computation. The scheduling can be handled dynamically by the scheduler 210, or can be assisted in part by compiler logic during compilation of program logic configured for execution by the processing cluster array 212. In one embodiment, different clusters 214A-214N of the processing cluster array 212 can be allocated for processing different types of programs or for performing different types of computations.

The processing cluster array 212 can be configured to perform various types of parallel processing operations. In one embodiment the processing cluster array 212 is configured to perform general-purpose parallel compute operations. For example, the processing cluster array 212 can include logic to execute processing tasks including filtering of video and/or audio data, performing modeling operations, including physics operations, and performing data transformations.

In one embodiment the processing cluster array 212 is configured to perform parallel graphics processing operations. In embodiments in which the parallel processor 200 is configured to perform graphics processing operations, the processing cluster array 212 can include additional logic to support the execution of such graphics processing operations, including, but not limited to texture sampling logic to perform texture operations, as well as tessellation logic and other vertex processing logic. Additionally, the processing cluster array 212 can be configured to execute graphics processing related shader programs such as, but not limited to vertex shaders, tessellation shaders, geometry shaders, and pixel shaders. The parallel processing unit 202 can transfer data from system memory via the I/O unit 204 for processing. During processing the transferred data can be stored to on-chip memory (e.g., parallel processor memory 222) during processing, then written back to system memory.

In one embodiment, when the parallel processing unit 202 is used to perform graphics processing, the scheduler 210 can be configured to divide the processing workload into approximately equal sized tasks, to better enable distribution of the graphics processing operations to multiple clusters 214A-214N of the processing cluster array 212. In some embodiments, portions of the processing cluster array 212 can be configured to perform different types of processing. For example a first portion may be configured to perform vertex shading and topology generation, a second portion may be configured to perform tessellation and geometry shading, and a third portion may be configured to perform pixel shading or other screen space operations, to produce a rendered image for display. Intermediate data produced by one or more of the clusters 214A-214N may be stored in buffers to allow the intermediate data to be transmitted between clusters 214A-214N for further processing.

During operation, the processing cluster array 212 can receive processing tasks to be executed via the scheduler 210, which receives commands defining processing tasks from front end 208. For graphics processing operations, processing tasks can include indices of data to be processed, e.g., surface (patch) data, primitive data, vertex data, and/or pixel data, as well as state parameters and commands defining how the data is to be processed (e.g., what program is to be executed). The scheduler 210 may be configured to fetch the indices corresponding to the tasks or may receive the indices from the front end 208. The front end 208 can be configured to ensure the processing cluster array 212 is configured to a valid state before the workload specified by incoming command buffers (e.g., batch-buffers, push buffers, etc.) is initiated.

Each of the one or more instances of the parallel processing unit 202 can couple with parallel processor memory 222. The parallel processor memory 222 can be accessed via the memory crossbar 216, which can receive memory requests from the processing cluster array 212 as well as the I/O unit 204. The memory crossbar 216 can access the parallel processor memory 222 via a memory interface 218. The memory interface 218 can include multiple partition units (e.g., partition unit 220A, partition unit 220B, through partition unit 220N) that can each couple to a portion (e.g., memory unit) of parallel processor memory 222. In one implementation the number of partition units 220A-220N is configured to be equal to the number of memory units, such that a first partition unit 220A has a corresponding first memory unit 224A, a second partition unit 220B has a corresponding memory unit 224B, and an Nth partition unit 220N has a corresponding Nth memory unit 224N. In other embodiments, the number of partition units 220A-220N may not be equal to the number of memory devices.

In various embodiments, the memory units 224A-224N can include various types of memory devices, including dynamic random access memory (DRAM) or graphics random access memory, such as synchronous graphics random access memory (SGRAM), including graphics double data rate (GDDR) memory. In one embodiment, the memory units 224A-224N may also include 3D stacked memory, including but not limited to high bandwidth memory (HBM). Persons skilled in the art will appreciate that the specific implementation of the memory units 224A-224N can vary, and can be selected from one of various conventional designs. Render targets, such as frame buffers or texture maps may be stored across the memory units 224A-224N, allowing partition units 220A-220N to write portions of each render target in parallel to efficiently use the available bandwidth of parallel processor memory 222. In some embodiments, a local instance of the parallel processor memory 222 may be excluded in favor of a unified memory design that utilizes system memory in conjunction with local cache memory.

In one embodiment, any one of the clusters 214A-214N of the processing cluster array 212 can process data that will be written to any of the memory units 224A-224N within parallel processor memory 222. The memory crossbar 216 can be configured to transfer the output of each cluster 214A-214N to any partition unit 220A-220N or to another cluster 214A-214N, which can perform additional processing operations on the output. Each cluster 214A-214N can communicate with the memory interface 218 through the memory crossbar 216 to read from or write to various external memory devices. In one embodiment the memory crossbar 216 has a connection to the memory interface 218 to communicate with the I/O unit 204, as well as a connection to a local instance of the parallel processor memory 222, enabling the processing units within the different processing clusters 214A-214N to communicate with system memory or other memory that is not local to the parallel processing unit 202. In one embodiment the memory crossbar 216 can use virtual channels to separate traffic streams between the clusters 214A-214N and the partition units 220A-220N.

While a single instance of the parallel processing unit 202 is illustrated within the parallel processor 200, any number of instances of the parallel processing unit 202 can be included. For example, multiple instances of the parallel processing unit 202 can be provided on a single add-in card, or multiple add-in cards can be interconnected. The different instances of the parallel processing unit 202 can be configured to inter-operate even if the different instances have different numbers of processing cores, different amounts of local parallel processor memory, and/or other configuration differences. For example and in one embodiment, some instances of the parallel processing unit 202 can include higher precision floating point units relative to other instances. Systems incorporating one or more instances of the parallel processing unit 202 or the parallel processor 200 can be implemented in a variety of configurations and form factors, including but not limited to desktop, laptop, or handheld personal computers, servers, workstations, game consoles, and/or embedded systems.

Figure 2B:
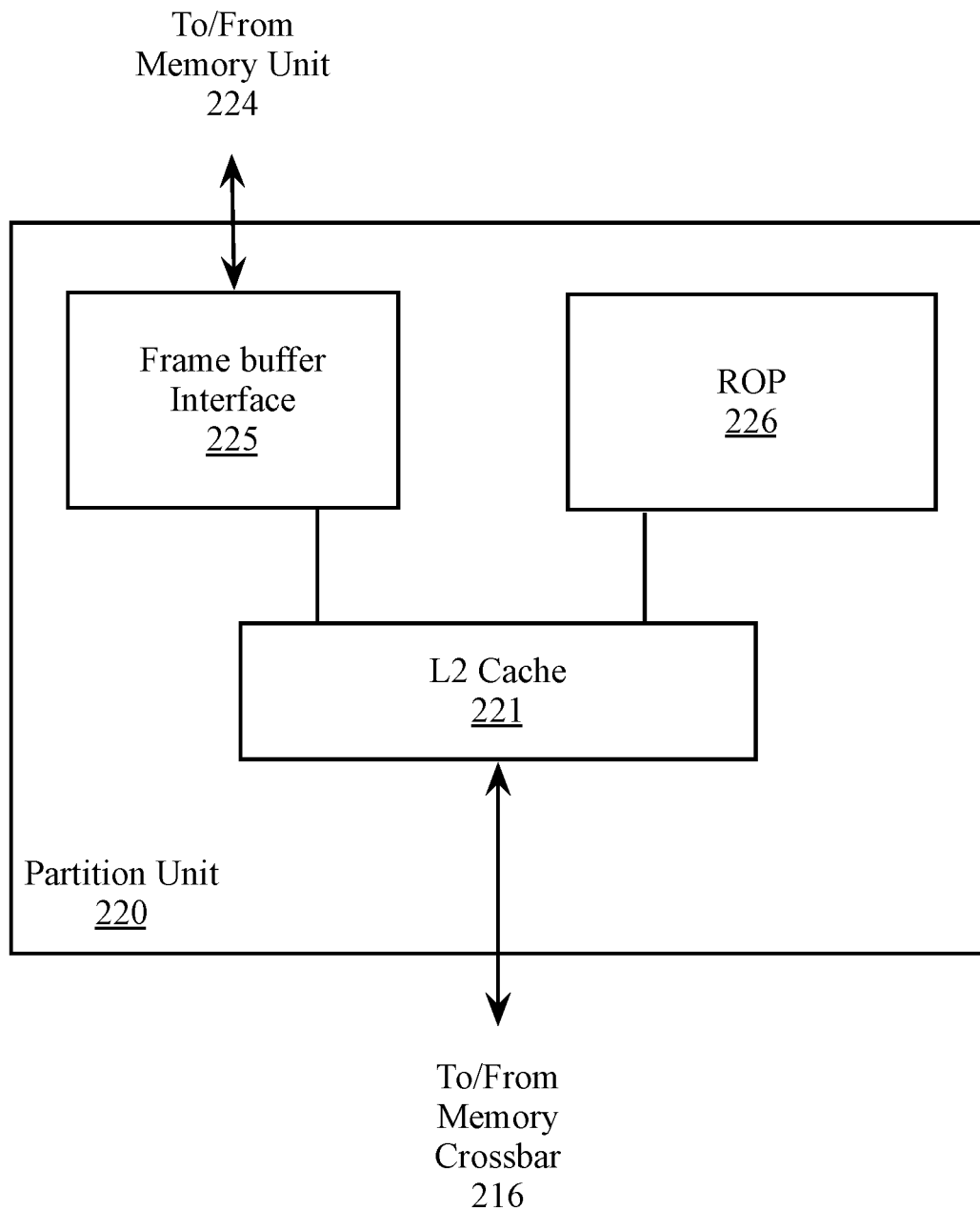

FIG. 2B is a block diagram of a partition unit 220, according to an embodiment. In one embodiment the partition unit 220 is an instance of one of the partition units 220A-220N of FIG. 2A. As illustrated, the partition unit 220 includes an L2 cache 221, a frame buffer interface 225, and a ROP 226 (raster operations unit). The L2 cache 221 is a read/write cache that is configured to perform load and store operations received from the memory crossbar 216 and ROP 226. Read misses and urgent write-back requests are output by L2 cache 221 to frame buffer interface 225 for processing. Updates can also be sent to the frame buffer via the frame buffer interface 225 for processing. In one embodiment the frame buffer interface 225 interfaces with one of the memory units in parallel processor memory, such as the memory units 224A-224N of FIG. 2A (e.g., within parallel processor memory 222).

In graphics applications, the ROP 226 is a processing unit that performs raster operations such as stencil, z test, blending, and the like. The ROP 226 then outputs processed graphics data that is stored in graphics memory. In some embodiments the ROP 226 includes compression logic to compress depth or color data that is written to memory and decompress depth or color data that is read from memory. The compression logic can be lossless compression logic that makes use of one or more of multiple compression algorithms. The type of compression that is performed by the ROP 226 can vary based on the statistical characteristics of the data to be compressed. For example, in one embodiment, delta color compression is performed on depth and color data on a per-tile basis.

In some embodiments, the ROP 226 is included within each processing cluster (e.g., cluster 214A-214N of FIG. 2A) instead of within the partition unit 220. In such embodiment, read and write requests for pixel data are transmitted over the memory crossbar 216 instead of pixel fragment data. The processed graphics data may be displayed on a display device, such as one of the one or more display device(s) 110A-110B of FIG. 1, routed for further processing by the processor(s) 102, or routed for further processing by one of the processing entities within the parallel processor 200 of FIG. 2A.

Figure 2C:
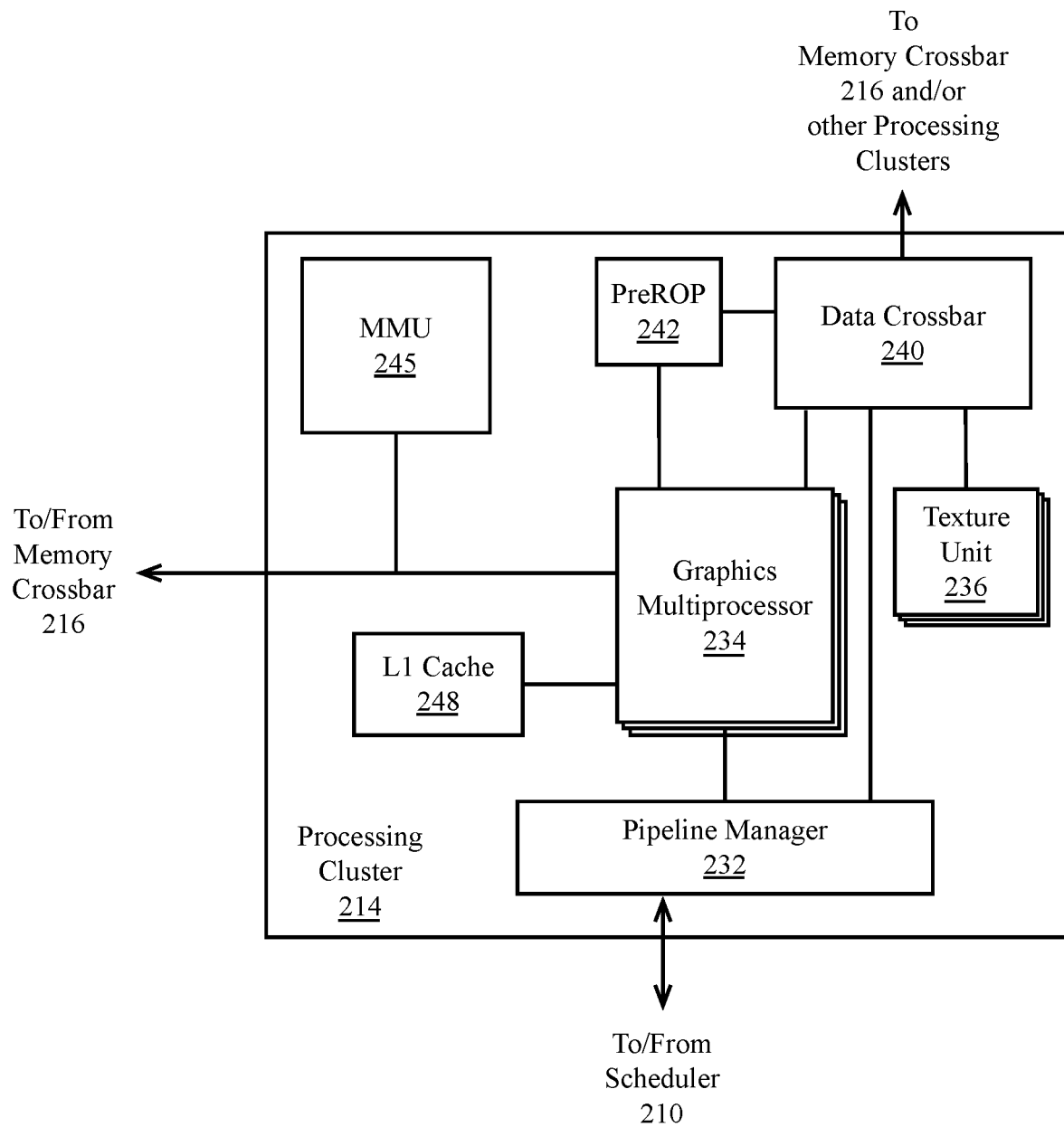

FIG. 2C is a block diagram of a processing cluster 214 within a parallel processing unit, according to an embodiment. In one embodiment the processing cluster is an instance of one of the processing clusters 214A-214N of FIG. 2A. The processing cluster 214 can be configured to execute many threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the processing clusters. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of the processing cluster 214 can be controlled via a pipeline manager 232 that distributes processing tasks to SIMT parallel processors. The pipeline manager 232 receives instructions from the scheduler 210 of FIG. 2A and manages execution of those instructions via a graphics multiprocessor 234 and/or a texture unit 236. The illustrated graphics multiprocessor 234 is an exemplary instance of a SIMT parallel processor. However, various types of SIMT parallel processors of differing architectures may be included within the processing cluster 214. One or more instances of the graphics multiprocessor 234 can be included within a processing cluster 214. The graphics multiprocessor 234 can process data and a data crossbar 240 can be used to distribute the processed data to one of multiple possible destinations, including other shader units. The pipeline manager 232 can facilitate the distribution of processed data by specifying destinations for processed data to be distributed via the data crossbar 240.

Each graphics multiprocessor 234 within the processing cluster 214 can include an identical set of functional execution logic (e.g., arithmetic logic units, load-store units, etc.). The functional execution logic can be configured in a pipelined manner in which new instructions can be issued before previous instructions are complete. The functional execution logic supports a variety of operations including integer and floating point arithmetic, comparison operations, Boolean operations, bit-shifting, and computation of various algebraic functions. In one embodiment the same functional-unit hardware can be leveraged to perform different operations and any combination of functional units may be present.

The instructions transmitted to the processing cluster 214 constitutes a thread. A set of threads executing across the set of parallel processing engines is a thread group. A thread group executes the same program on different input data. Each thread within a thread group can be assigned to a different processing engine within a graphics multiprocessor 234. A thread group may include fewer threads than the number of processing engines within the graphics multiprocessor 234. When a thread group includes fewer threads than the number of processing engines, one or more of the processing engines may be idle during cycles in which that thread group is being processed. A thread group may also include more threads than the number of processing engines within the graphics multiprocessor 234. When the thread group includes more threads than the number of processing engines within the graphics multiprocessor 234, processing can be performed over consecutive clock cycles. In one embodiment multiple thread groups can be executed concurrently on a graphics multiprocessor 234.

In one embodiment the graphics multiprocessor 234 includes an internal cache memory to perform load and store operations. In one embodiment, the graphics multiprocessor 234 can forego an internal cache and use a cache memory (e.g., L1 cache 248) within the processing cluster 214. Each graphics multiprocessor 234 also has access to L2 caches within the partition units (e.g., partition units 220A-220N of FIG. 2A) that are shared among all processing clusters 214 and may be used to transfer data between threads. The graphics multiprocessor 234 may also access off-chip global memory, which can include one or more of local parallel processor memory and/or system memory. Any memory external to the parallel processing unit 202 may be used as global memory. Embodiments in which the processing cluster 214 includes multiple instances of the graphics multiprocessor 234 can share common instructions and data, which may be stored in the L1 cache 248.

Each processing cluster 214 may include an MMU 245 (memory management unit) that is configured to map virtual addresses into physical addresses. In other embodiments, one or more instances of the MMU 245 may reside within the memory interface 218 of FIG. 2A. The MMU 245 includes a set of page table entries (PTEs) used to map a virtual address to a physical address of a tile and optionally a cache line index. The MMU 245 may include address translation lookaside buffers (TLB) or caches that may reside within the graphics multiprocessor 234 or the L1 cache or processing cluster 214. The physical address is processed to distribute surface data access locality to allow efficient request interleaving among partition units. The cache line index may be used to determine whether a request for a cache line is a hit or miss.

In graphics and computing applications, a processing cluster 214 may be configured such that each graphics multiprocessor 234 is coupled to a texture unit 236 for performing texture mapping operations, e.g., determining texture sample positions, reading texture data, and filtering the texture data. Texture data is read from an internal texture L1 cache (not shown) or in some embodiments from the L1 cache within graphics multiprocessor 234 and is fetched from an L2 cache, local parallel processor memory, or system memory, as needed. Each graphics multiprocessor 234 outputs processed tasks to the data crossbar 240 to provide the processed task to another processing cluster 214 for further processing or to store the processed task in an L2 cache, local parallel processor memory, or system memory via the memory crossbar 216. A preROP 242 (pre-raster operations unit) is configured to receive data from graphics multiprocessor 234, direct data to ROP units, which may be located with partition units as described herein (e.g., partition units 220A-220N of FIG. 2A). The preROP 242 unit can perform optimizations for color blending, organize pixel color data, and perform address translations.

It will be appreciated that the core architecture described herein is illustrative and that variations and modifications are possible. Any number of processing units, e.g., graphics multiprocessor 234, texture units 236, preROPs 242, etc., may be included within a processing cluster 214. Further, while only one processing cluster 214 is shown, a parallel processing unit as described herein may include any number of instances of the processing cluster 214. In one embodiment, each processing cluster 214 can be configured to operate independently of other processing clusters 214 using separate and distinct processing units, L1 caches, etc.

Figure 2D:
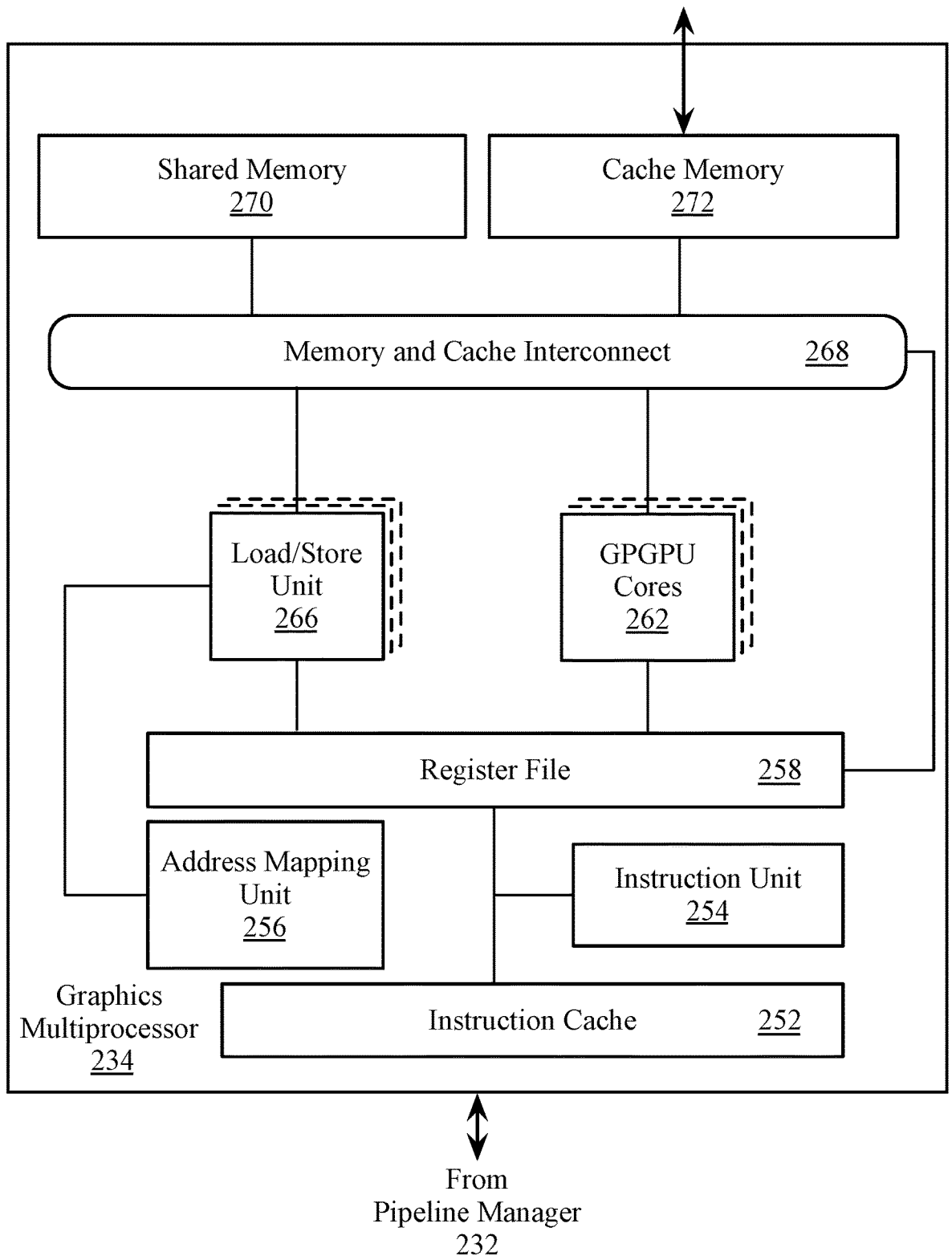

FIG. 2D shows a graphics multiprocessor 234, according to one embodiment. In such embodiment the graphics multiprocessor 234 couples with the pipeline manager 232 of the processing cluster 214. The graphics multiprocessor 234 has an execution pipeline including but not limited to an instruction cache 252, an instruction unit 254, an address mapping unit 256, a register file 258, one or more general purpose graphics processing unit (GPGPU) cores 262, and one or more load/store units 266. The GPGPU cores 262 and load/store units 266 are coupled with cache memory 272 and shared memory 270 via a memory and cache interconnect 268.

In one embodiment, the instruction cache 252 receives a stream of instructions to execute from the pipeline manager 232. The instructions are cached in the instruction cache 252 and dispatched for execution by the instruction unit 254. The instruction unit 254 can dispatch instructions as thread groups (e.g., warps), with each thread of the thread group assigned to a different execution unit within GPGPU core 262. An instruction can access any of a local, shared, or global address space by specifying an address within a unified address space. The address mapping unit 256 can be used to translate addresses in the unified address space into a distinct memory address that can be accessed by the load/store units 266.

The register file 258 provides a set of registers for the functional units of the graphics multiprocessor 234. The register file 258 provides temporary storage for operands connected to the data paths of the functional units (e.g., GPGPU cores 262, load/store units 266) of the graphics multiprocessor 234. In one embodiment, the register file 258 is divided between each of the functional units such that each functional unit is allocated a dedicated portion of the register file 258. In one embodiment, the register file 258 is divided between the different warps being executed by the graphics multiprocessor 234.

The GPGPU cores 262 can each include floating point units (FPUs) and/or integer arithmetic logic units (ALUs) that are used to execute instructions of the graphics multiprocessor 234. The GPGPU cores 262 can be similar in architecture or can differ in architecture, according to embodiments. For example and in one embodiment, a first portion of the GPGPU cores 262 include a single precision FPU and an integer ALU while a second portion of the GPGPU cores include a double precision FPU. In one embodiment the FPUs can implement the IEEE 754-2008 standard for floating point arithmetic or enable variable precision floating point arithmetic. The graphics multiprocessor 234 can additionally include one or more fixed function or special function units to perform specific functions such as copy rectangle or pixel blending operations. In one embodiment one or more of the GPGPU cores can also include fixed or special function logic The memory and cache interconnect 268 is an interconnect network that connects each of the functional units of the graphics multiprocessor 234 to the register file 258 and to the shared memory 270. In one embodiment, the memory and cache interconnect 268 is a crossbar interconnect that allows the load/store unit 266 to implement load and store operations between the shared memory 270 and the register file 258. shared memory 270 can be used to enable communication between threads that execute on the functional units within the graphics multiprocessor 234. The cache memory 272 can be used as a data cache for example, to cache texture data communicated between the functional units and the texture unit 236. The shared memory 270 can also be used as a program managed cached. Threads executing on the GPGPU cores 262 can programmatically store data within the shared memory in addition to the automatically cached data that is stored within the cache memory 272.

Figure 3A:
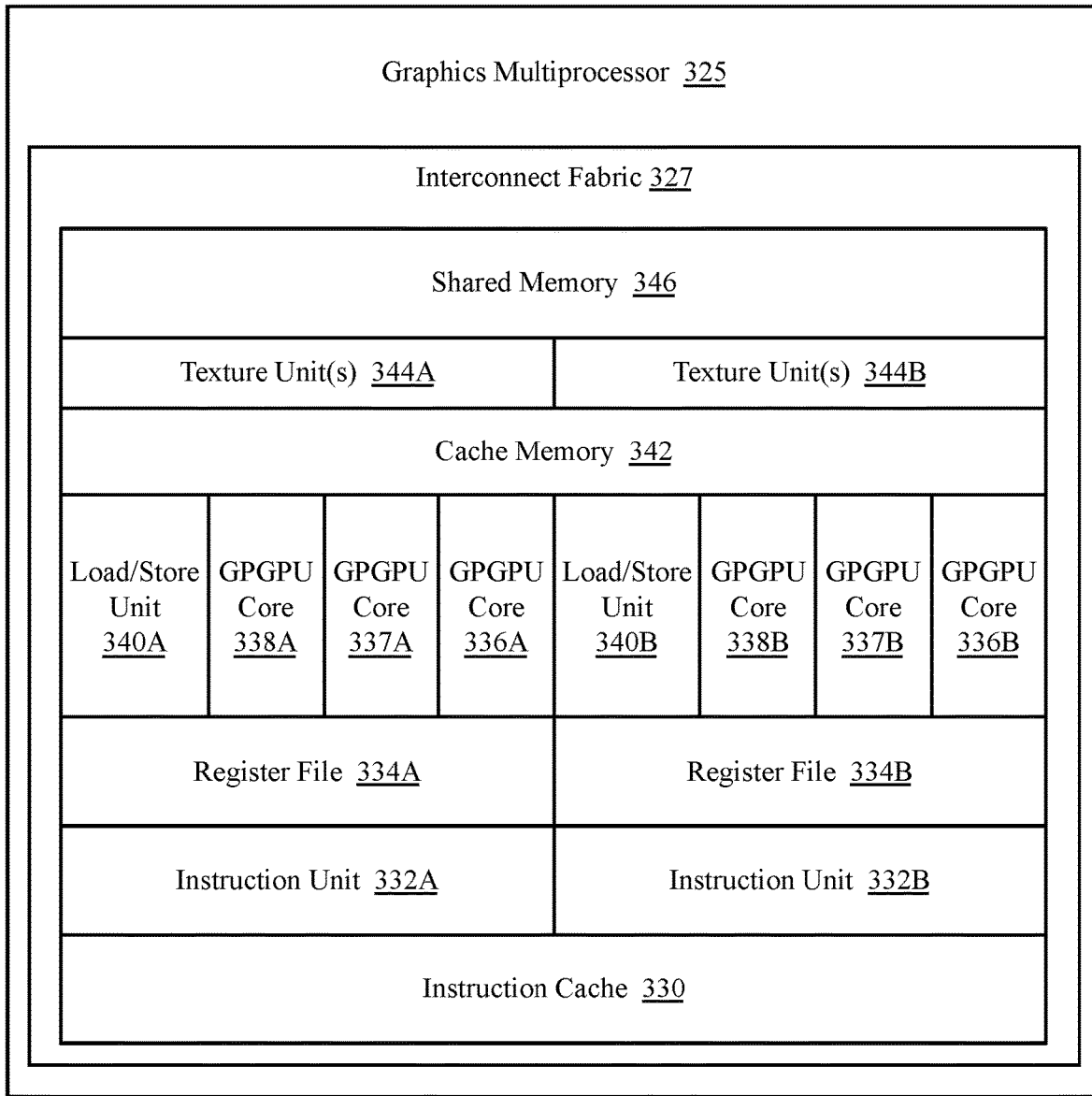
FIG. 3A-3B are block diagrams of graphics multiprocessors, according to embodiments.
Figure 3B:
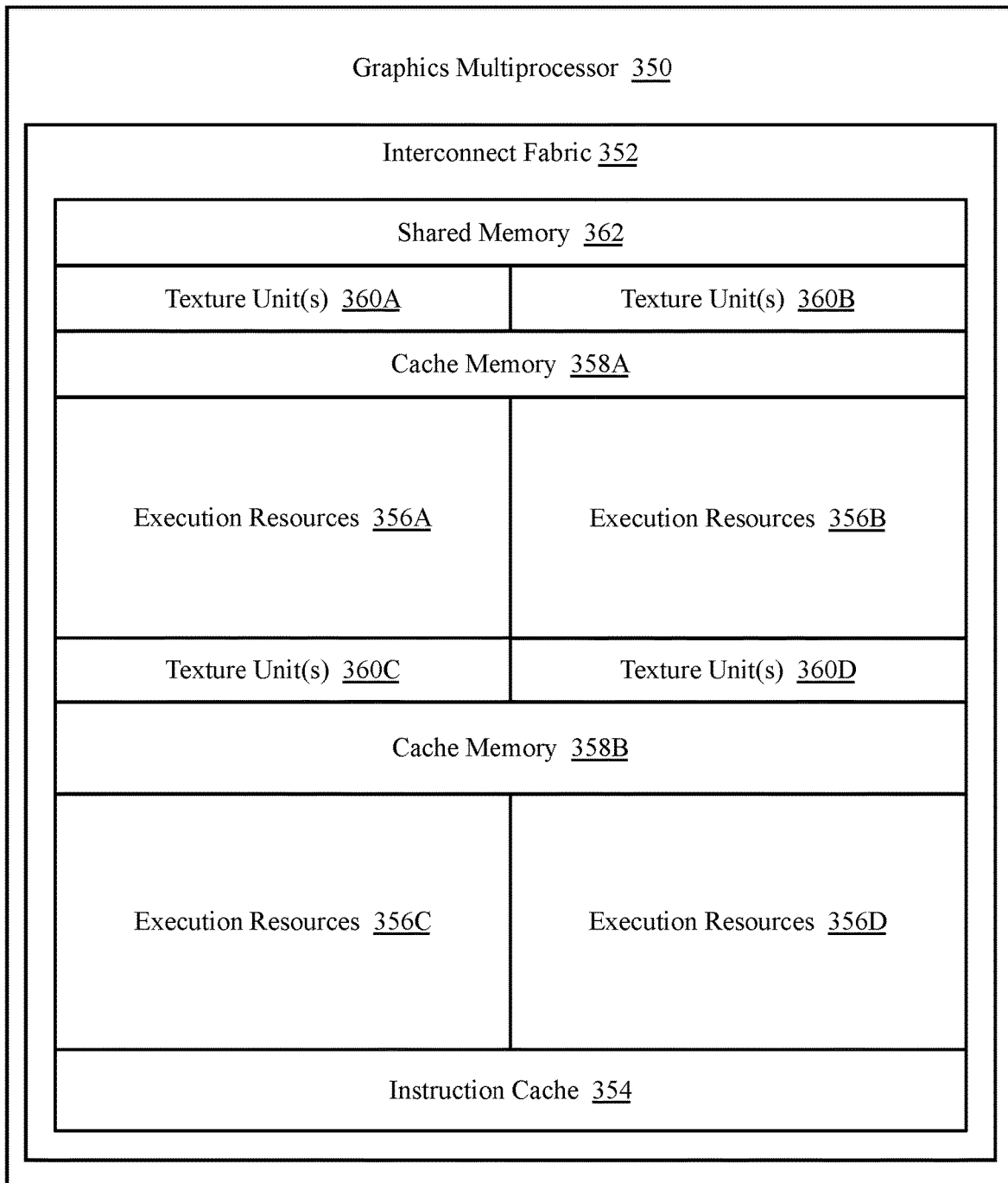

FIG. 3A-3B illustrate additional graphics multiprocessors, according to embodiments. The illustrated graphics multiprocessors 325, 350 are variants of the graphics multiprocessor 234 of FIG. 2C. The illustrated graphics multiprocessors 325, 350 can be configured as a streaming multiprocessor (SM) capable of simultaneous execution of a large number of execution threads.

FIG. 3A shows a graphics multiprocessor 325 according to an additional embodiment. The graphics multiprocessor 325 includes multiple additional instances of execution resource units relative to the graphics multiprocessor 234 of FIG. 2D. For example, the graphics multiprocessor 325 can include multiple instances of the instruction unit 332A-332B, register file 334A-334B, and texture unit(s) 344A-344B. The graphics multiprocessor 325 also includes multiple sets of graphics or compute execution units (e.g., GPGPU core 336A-336B, GPGPU core 337A-337B, GPGPU core 338A-338B) and multiple sets of load/store units 340A-340B. In one embodiment the execution resource units have a common instruction cache 330, texture and/or data cache memory 342, and shared memory 346.

The various components can communicate via an interconnect fabric 327. In one embodiment the interconnect fabric 327 includes one or more crossbar switches to enable communication between the various components of the graphics multiprocessor 325. In one embodiment the interconnect fabric 327 is a separate, high-speed network fabric layer upon which each component of the graphics multiprocessor 325 is stacked. The components of the graphics multiprocessor 325 communicate with remote components via the interconnect fabric 327. For example, the GPGPU cores 336A-336B, 337A-337B, and 3378A-338B can each communicate with shared memory 346 via the interconnect fabric 327. The interconnect fabric 327 can arbitrate communication within the graphics multiprocessor 325 to ensure a fair bandwidth allocation between components.

FIG. 3B shows a graphics multiprocessor 350 according to an additional embodiment. The graphics processor includes multiple sets of execution resources 356A-356D, where each set of execution resource includes multiple instruction units, register files, GPGPU cores, and load store units, as illustrated in FIG. 2D and FIG. 3A. The execution resources 356A-356D can work in concert with texture unit(s) 360A-360D for texture operations, while sharing an instruction cache 354, and shared memory 362. In one embodiment the execution resources 356A-356D can share an instruction cache 354 and shared memory 362, as well as multiple instances of a texture and/or data cache memory 358A-358B. The various components can communicate via an interconnect fabric 352 similar to the interconnect fabric 327 of FIG. 3A.

Persons skilled in the art will understand that the architecture described in FIGS. 1, 2A-2D, and 3A-3B are descriptive and not limiting as to the scope of the present embodiments. Thus, the techniques described herein may be implemented on any properly configured processing unit, including, without limitation, one or more mobile application processors, one or more desktop or server central processing units (CPUs) including multi-core CPUs, one or more parallel processing units, such as the parallel processing unit 202 of FIG. 2A, as well as one or more graphics processors or special purpose processing units, without departure from the scope of the embodiments described herein.

In some embodiments a parallel processor or GPGPU as described herein is communicatively coupled to host/processor cores to accelerate graphics operations, machine-learning operations, pattern analysis operations, and various general purpose GPU (GPGPU) functions. The GPU may be communicatively coupled to the host processor/cores over a bus or other interconnect (e.g., a high speed interconnect such as PCIe or NVLink). In other embodiments, the GPU may be integrated on the same package or chip as the cores and communicatively coupled to the cores over an internal processor bus/interconnect (i.e., internal to the package or chip). Regardless of the manner in which the GPU is connected, the processor cores may allocate work to the GPU in the form of sequences of commands/instructions contained in a work descriptor. The GPU then uses dedicated circuitry/logic for efficiently processing these commands/instructions.

Techniques for GPU to Host Processor Interconnection

Figure 4A:
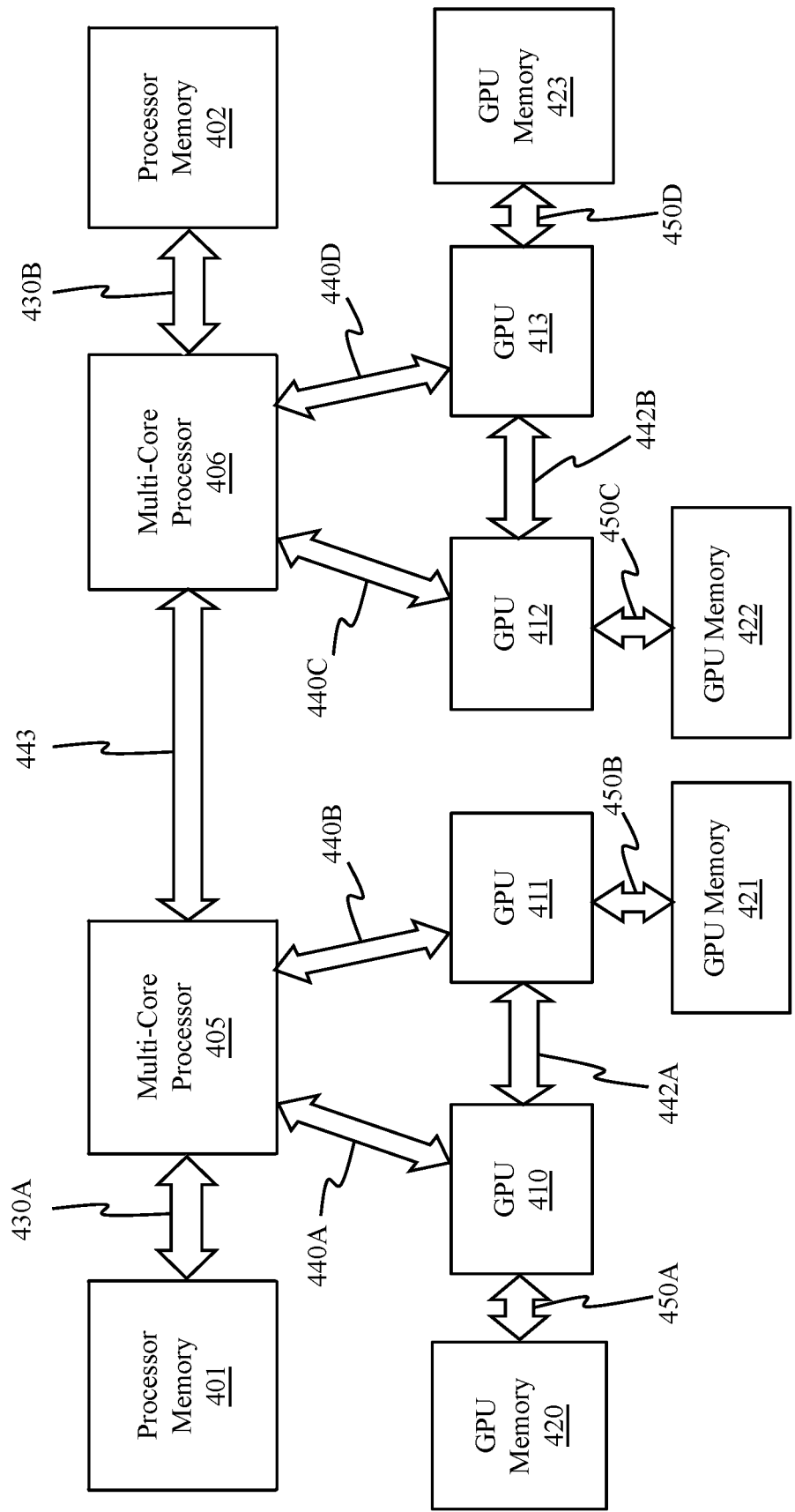
FIG. 4A-4F illustrate an exemplary architecture in which a plurality of GPUs are communicatively coupled to a plurality of multi-core processors.

FIG. 4A illustrates an exemplary architecture in which a plurality of GPUs 410-413 are communicatively coupled to a plurality of multi-core processors 405-406 over high-speed links 440A-440D (e.g., buses, point-to-point interconnects, etc.). In one embodiment, the high-speed links 440A-440D support a communication throughput of 4 GB/s, 30 GB/s, 80 GB/s or higher, depending on the implementation. Various interconnect protocols may be used including, but not limited to, PCIe 4.0 or 5.0 and NVLink 2.0. However, the underlying principles of the invention are not limited to any particular communication protocol or throughput.

In addition, in one embodiment, two or more of the GPUs 410-413 are interconnected over high-speed links 442A-442B, which may be implemented using the same or different protocols/links than those used for high-speed links 440A-440D. Similarly, two or more of the multi-core processors 405-406 may be connected over high speed link 443 which may be symmetric multi-processor (SMP) buses operating at 20 GB/s, 30 GB/s, 120 GB/s or higher. Alternatively, all communication between the various system components shown in FIG. 4A may be accomplished using the same protocols/links (e.g., over a common interconnection fabric). As mentioned, however, the underlying principles of the invention are not limited to any particular type of interconnect technology.

In one embodiment, each of multi-core processor 405 and multi-core processor 406 are communicatively coupled to a processor memory 401-402, via memory interconnects 430A-430B, respectively, and each GPU 410-413 is communicatively coupled to GPU memory 420-423 over GPU memory interconnects 450A-450D, respectively. The memory interconnects 430A-430B and 450A-450D may utilize the same or different memory access technologies. By way of example, and not limitation, the processor memories 401-402 and GPU memories 420-423 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint or Nano-Ram. In one embodiment, some portion of the memories may be volatile memory and another portion may be non-volatile memory (e.g., using a two-level memory (2LM) hierarchy).

As described below, although the various processors 405-406 and GPUs 410-413 may be physically coupled to a particular memory 401-402, 420-423, respectively, a unified memory architecture may be implemented in which the same virtual system address space (also referred to as the "effective address" space) is distributed among all of the various physical memories. For example, processor memories 401-402 may each comprise 64 GB of the system memory address space and GPU memories 420-423 may each comprise 32 GB of the system memory address space (resulting in a total of 256 GB addressable memory in this example).

Figure 4B:
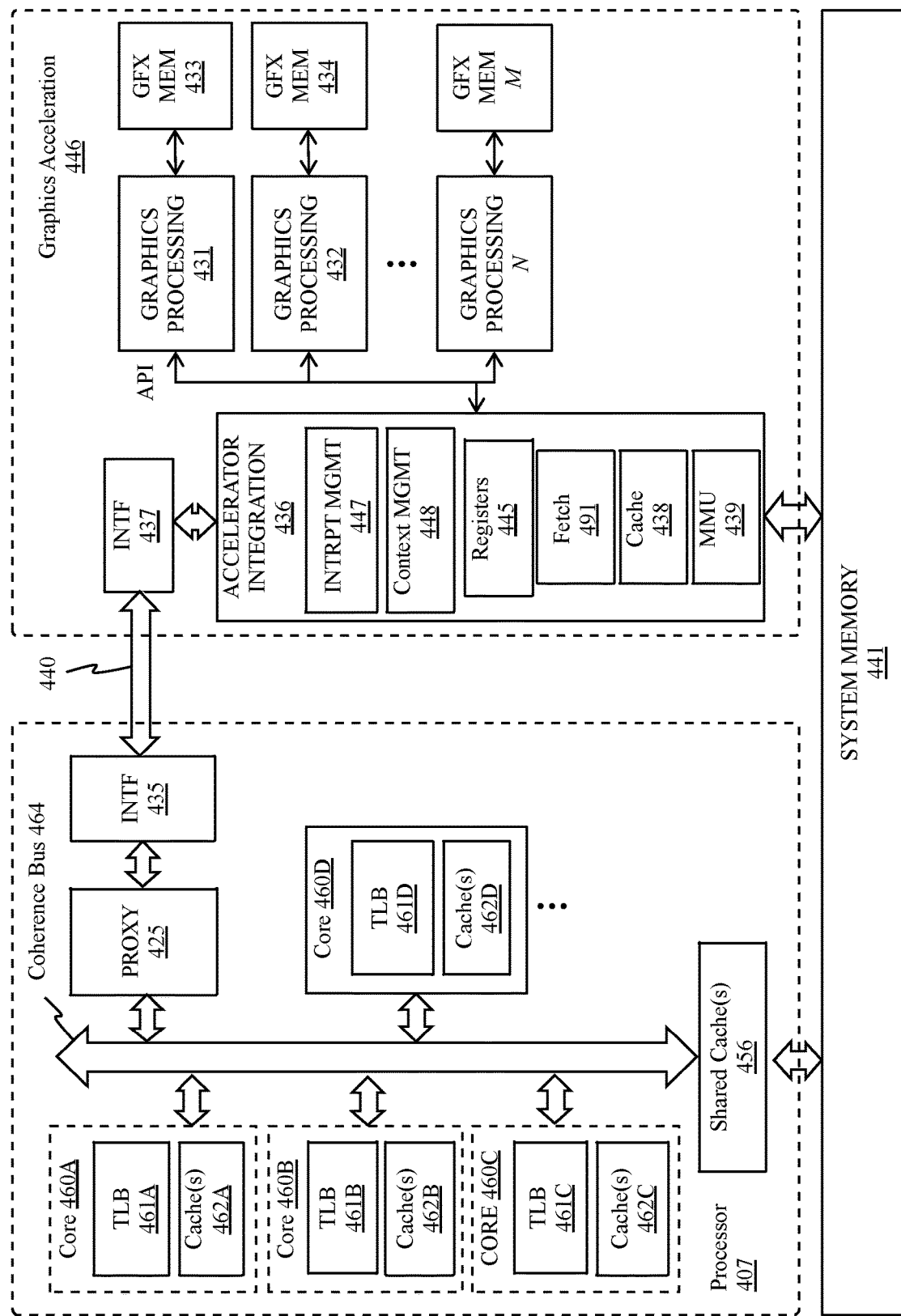

FIG. 4B illustrates additional details for an interconnection between a multi-core processor 407 and a graphics acceleration module 446 in accordance with one embodiment. The graphics acceleration module 446 may include one or more GPU chips integrated on a line card which is coupled to the processor 407 via the high-speed link 440. Alternatively, the graphics acceleration module 446 may be integrated on the same package or chip as the processor 407.

The illustrated processor 407 includes a plurality of cores 460A-460D, each with a translation lookaside buffer 461A-461D and one or more caches 462A-462D. The cores may include various other components for executing instructions and processing data which are not illustrated to avoid obscuring the underlying principles of the invention (e.g., instruction fetch units, branch prediction units, decoders, execution units, reorder buffers, etc.). The caches 462A-462D may comprise level 1 (L1) and level 2 (L2) caches. In addition, one or more shared caches 456 may be included in the caching hierarchy and shared by sets of the cores 460A-460D. For example, one embodiment of the processor 407 includes 24 cores, each with its own L1 cache, twelve shared L2 caches, and twelve shared L3 caches. In this embodiment, one of the L2 and L3 caches are shared by two adjacent cores. The processor 407 and the graphics accelerator integration module 446 connect with system memory 441, which may include processor memories 401-402.

Coherency is maintained for data and instructions stored in the various caches 462A-462D, 456 and system memory 441 via inter-core communication over a coherence bus 464. For example, each cache may have cache coherency logic/circuitry associated therewith to communicate to over the coherence bus 464 in response to detected reads or writes to particular cache lines. In one implementation, a cache snooping protocol is implemented over the coherence bus 464 to snoop cache accesses. Cache snooping/coherency techniques are well understood by those of skill in the art and will not be described in detail here to avoid obscuring the underlying principles of the invention.

In one embodiment, a proxy circuit 425 communicatively couples the graphics acceleration module 446 to the coherence bus 464, allowing the graphics acceleration module 446 to participate in the cache coherence protocol as a peer of the cores. In particular, an interface 435 provides connectivity to the proxy circuit 425 over high-speed link 440 (e.g., a PCIe bus, NVLink, etc.) and an interface 437 connects the graphics acceleration module 446 to the high-speed link 440.

In one implementation, an accelerator integration circuit 436 provides cache management, memory access, context management, and interrupt management services on behalf of a plurality of graphics processing engines 431, 432, N of the graphics acceleration module 446. The graphics processing engines 431, 432, N may each comprise a separate graphics processing unit (GPU). Alternatively, the graphics processing engines 431, 432, N may comprise different types of graphics processing engines within a GPU such as graphics execution units, media processing engines (e.g., video encoders/decoders), samplers, and blit engines. In other words, the graphics acceleration module may be a GPU with a plurality of graphics processing engines 431-432, N or the graphics processing engines 431-432, N may be individual GPUs integrated on a common package, line card, or chip.

In one embodiment, the accelerator integration circuit 436 includes a memory management unit (MMU) 439 for performing various memory management functions such as virtual-to-physical memory translations (also referred to as effective-to-real memory translations) and memory access protocols for accessing system memory 441. The MMU 439 may also include a translation lookaside buffer (TLB) (not shown) for caching the virtual/effective to physical/real address translations. In one implementation, a cache 438 stores commands and data for efficient access by the graphics processing engines 431-432, N. In one embodiment, the data stored in cache 438 and graphics memories 433-434, M is kept coherent with the core caches 462A-462D, 456 and system memory 411. As mentioned, this may be accomplished via proxy circuit 425 which takes part in the cache coherency mechanism on behalf of cache 438 and memories 433-434, M (e.g., sending updates to the cache 438 related to modifications/accesses of cache lines on processor caches 462A-462D, 456 and receiving updates from the cache 438).

A set of registers 445 store context data for threads executed by the graphics processing engines 431-432, N and a context management circuit 448 manages the thread contexts. For example, the context management circuit 448 may perform save and restore operations to save and restore contexts of the various threads during contexts switches (e.g., where a first thread is saved and a second thread is stored so that the second thread can be execute by a graphics processing engine). For example, on a context switch, the context management circuit 448 may store current register values to a designated region in memory (e.g., identified by a context pointer). It may then restore the register values when returning to the context. In one embodiment, an interrupt management circuit 447 receives and processes interrupts received from system devices.

In one implementation, virtual/effective addresses from a graphics processing engine 431 are translated to real/physical addresses in system memory 411 by the MMU 439. One embodiment of the accelerator integration circuit 436 supports multiple (e.g., 4, 8, 16) graphics accelerator modules 446 and/or other accelerator devices. The graphics accelerator module 446 may be dedicated to a single application executed on the processor 407 or may be shared between multiple applications. In one embodiment, a virtualized graphics execution environment is presented in which the resources of the graphics processing engines 431-432, N are shared with multiple applications or virtual machines (VMs). The resources may be subdivided into "slices" which are allocated to different VMs and/or applications based on the processing requirements and priorities associated with the VMs and/or applications.

Thus, the accelerator integration circuit acts as a bridge to the system for the graphics acceleration module 446 and provides address translation and system memory cache services. In addition, the accelerator integration circuit 436 may provide virtualization facilities for the host processor to manage virtualization of the graphics processing engines, interrupts, and memory management.

Because hardware resources of the graphics processing engines 431-432, N are mapped explicitly to the real address space seen by the host processor 407, any host processor can address these resources directly using an effective address value. One function of the accelerator integration circuit 436, in one embodiment, is the physical separation of the graphics processing engines 431-432, N so that they appear to the system as independent units.

As mentioned, in the illustrated embodiment, one or more graphics memories 433-434, M are coupled to each of the graphics processing engines 431-432, N, respectively. The graphics memories 433-434, M store instructions and data being processed by each of the graphics processing engines 431-432, N. The graphics memories 433-434, M may be volatile memories such as DRAMs (including stacked DRAMs), GDDR memory (e.g., GDDR5, GDDR6), or HBM, and/or may be non-volatile memories such as 3D XPoint or Nano-Ram.

In one embodiment, to reduce data traffic over the high-speed link 440, biasing techniques are used to ensure that the data stored in graphics memories 433-434, M is data which will be used most frequently by the graphics processing engines 431-432, N and preferably not used by the cores 460A-460D (at least not frequently). Similarly, the biasing mechanism attempts to keep data needed by the cores (and preferably not the graphics processing engines 431-432, N) within the caches 462A-462D, 456 of the cores and system memory 411.

Figure 4C:
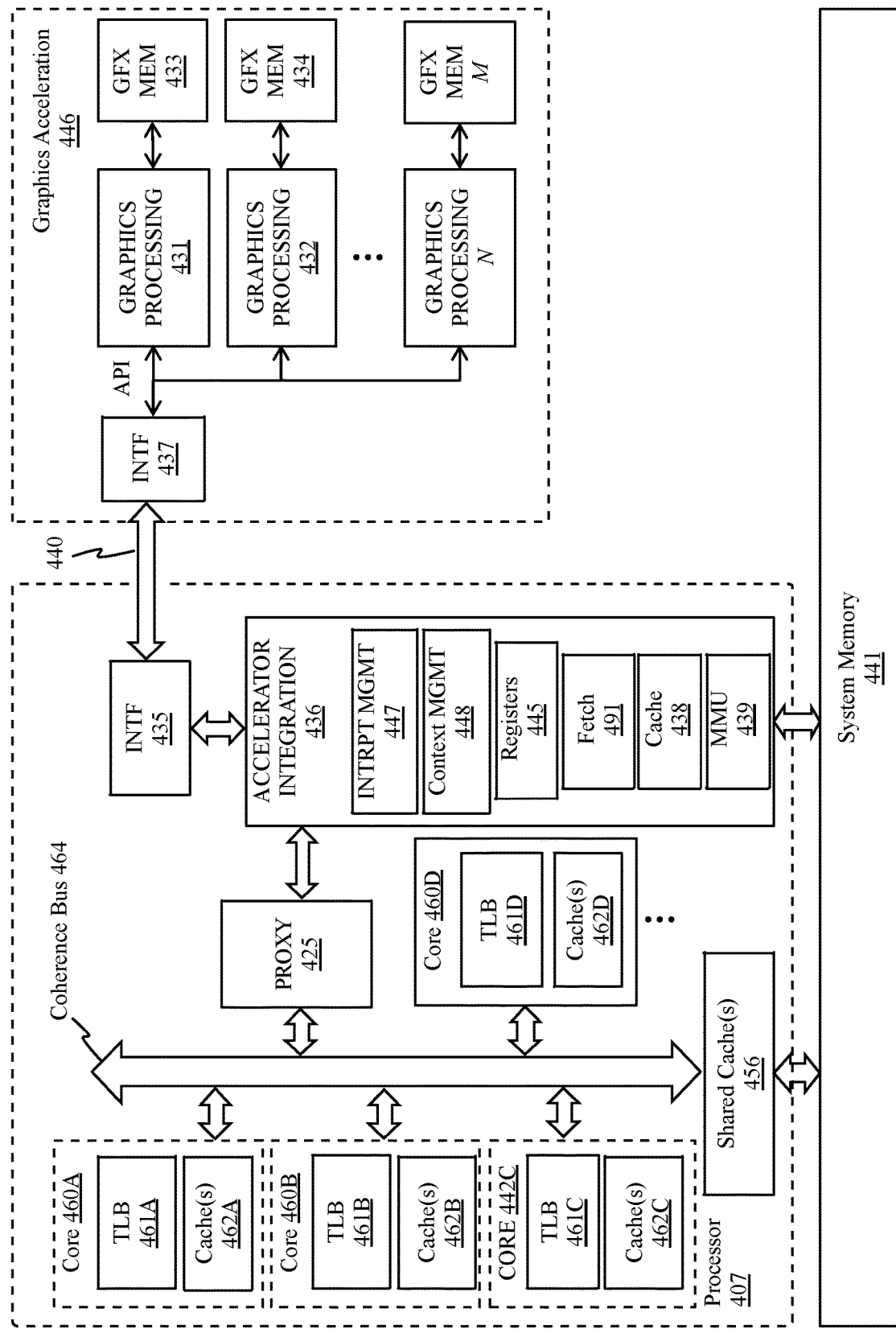

FIG. 4C illustrates another embodiment in which the accelerator integration circuit 436 is integrated within the processor 407. In this embodiment, the graphics processing engines 431-432, N communicate directly over the high-speed link 440 to the accelerator integration circuit 436 via interface 437 and interface 435 (which, again, may be utilize any form of bus or interface protocol). The accelerator integration circuit 436 may perform the same operations as those described with respect to FIG. 4B, but potentially at a higher throughput given its close proximity to the coherence bus 464 and caches 462A-462D, 456.

One embodiment supports different programming models including a dedicated-process programming model (no graphics acceleration module virtualization) and shared programming models (with virtualization). The latter may include programming models which are controlled by the accelerator integration circuit 436 and programming models which are controlled by the graphics acceleration module 446.

In one embodiment of the dedicated process model, graphics processing engines 431-432, N are dedicated to a single application or process under a single operating system. The single application can funnel other application requests to the graphics engines 431-432, N, providing virtualization within a VM/partition.

In the dedicated-process programming models, the graphics processing engines 431-432, N, may be shared by multiple VM/application partitions. The shared models require a system hypervisor to virtualize the graphics processing engines 431-432, N to allow access by each operating system. For single-partition systems without a hypervisor, the graphics processing engines 431-432, N are owned by the operating system. In both cases, the operating system can virtualize the graphics processing engines 431-432, N to provide access to each process or application.

For the shared programming model, the graphics acceleration module 446 or an individual graphics processing engine 431-432, N selects a process element using a process handle. In one embodiment, process elements are stored in system memory 411 and are addressable using the effective address to real address translation techniques described herein. The process handle may be an implementation-specific value provided to the host process when registering its context with the graphics processing engine 431-432, N (that is, calling system software to add the process element to the process element linked list). The lower 16-bits of the process handle may be the offset of the process element within the process element linked list.

Figure 4D:
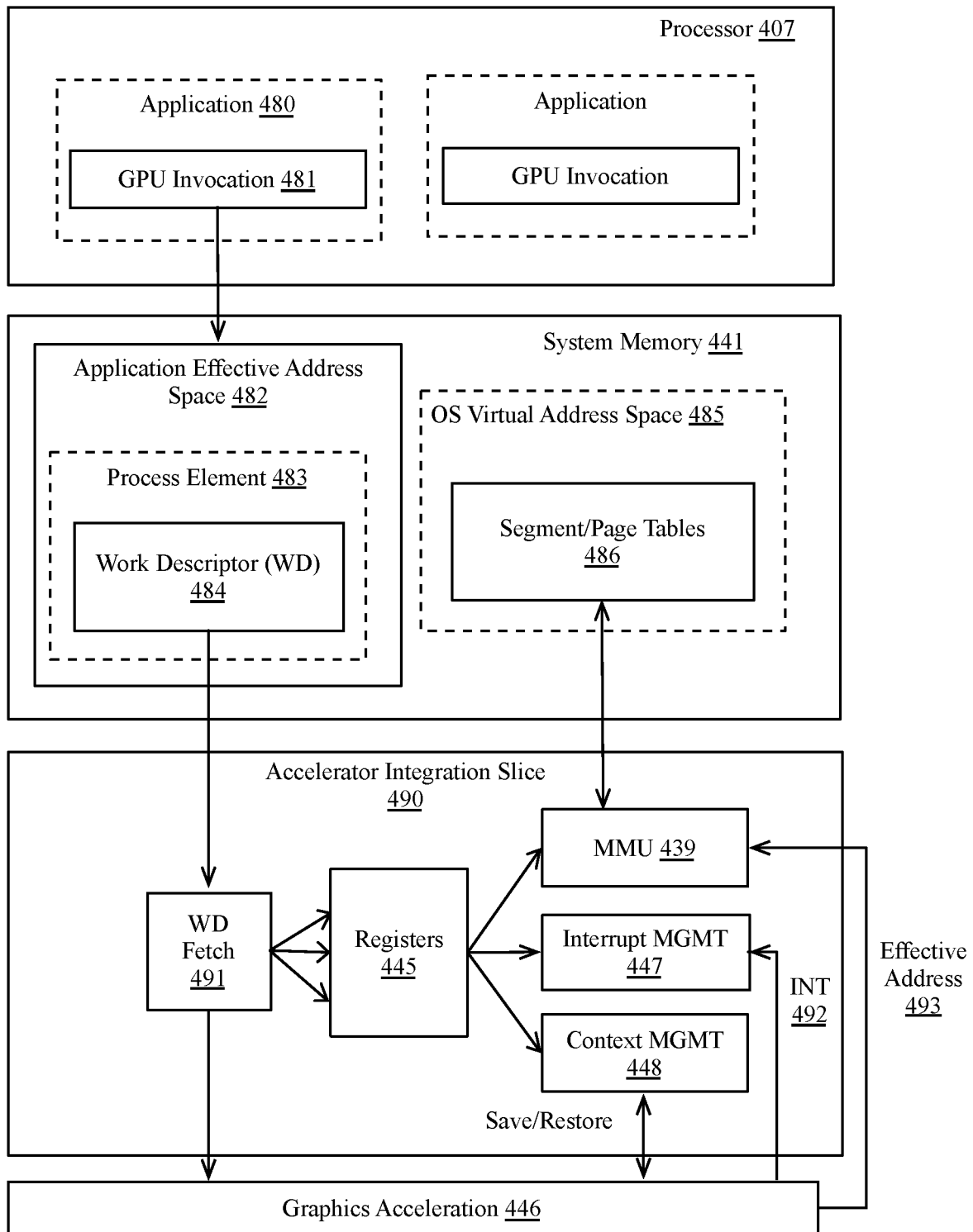

FIG. 4D illustrates an exemplary accelerator integration slice 490. As used herein, a "slice" comprises a specified portion of the processing resources of the accelerator integration circuit 436. Application effective address space 482 within system memory 411 stores process elements 483. In one embodiment, the process elements 483 are stored in response to GPU invocations 481 from applications 480 executed on the processor 407. A process element 483 contains the process state for the corresponding application 480. A work descriptor (WD) 484 contained in the process element 483 can be a single job requested by an application or may contain a pointer to a queue of jobs. In the latter case, the WD 484 is a pointer to the job request queue in the application's address space 482.

The graphics acceleration module 446 and/or the individual graphics processing engines 431-432, N can be shared by all or a subset of the processes in the system. Embodiments of the invention include an infrastructure for setting up the process state and sending a WD 484 to a graphics acceleration module 446 to start a job in a virtualized environment.

In one implementation, the dedicated-process programming model is implementation-specific. In this model, a single process owns the graphics acceleration module 446 or an individual graphics processing engine 431. Because the graphics acceleration module 446 is owned by a single process, the hypervisor initializes the accelerator integration circuit 436 for the owning partition and the operating system initializes the accelerator integration circuit 436 for the owning process at the time when the graphics acceleration module 446 is assigned.

In operation, a WD fetch unit 491 in the accelerator integration slice 490 fetches the next WD 484 which includes an indication of the work to be done by one of the graphics processing engines of the graphics acceleration module 446. Data from the WD 484 may be stored in registers 445 and used by the MMU 439, interrupt management circuit 447 and/or context management circuit 448 as illustrated. For example, one embodiment of the MMU 439 includes segment/page walk circuitry for accessing segment/page tables 486 within the OS virtual address space 485. The interrupt management circuit 447 may process interrupt events 492 received from the graphics acceleration module 446. When performing graphics operations, an effective address 493 generated by a graphics processing engine 431-432, N is translated to a real address by the MMU 439.

In one embodiment, the same set of registers 445 are duplicated for each graphics processing engine 431-432, N and/or graphics acceleration module 446 and may be initialized by the hypervisor or operating system. Each of these duplicated registers may be included in an accelerator integration slice 490. Exemplary registers that may be initialized by the hypervisor are shown in Table 1.

TABLE 1

Hypervisor Initialized Registers

| | |
|---|---|
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by the operating system are shown in Table 2.

TABLE 2

Operating System Initialized Registers

| | |
|---|---|
| 1 | Process and Thread Identification |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |
| 5 | Authority Mask |
| 6 | Work descriptor |

In one embodiment, each WD 484 is specific to a particular graphics acceleration module 446 and/or graphics processing engine 431-432, N. It contains all the information a graphics processing engine 431-432, N requires to do its work or it can be a pointer to a memory location where the application has set up a command queue of work to be completed.

Figure 4E:
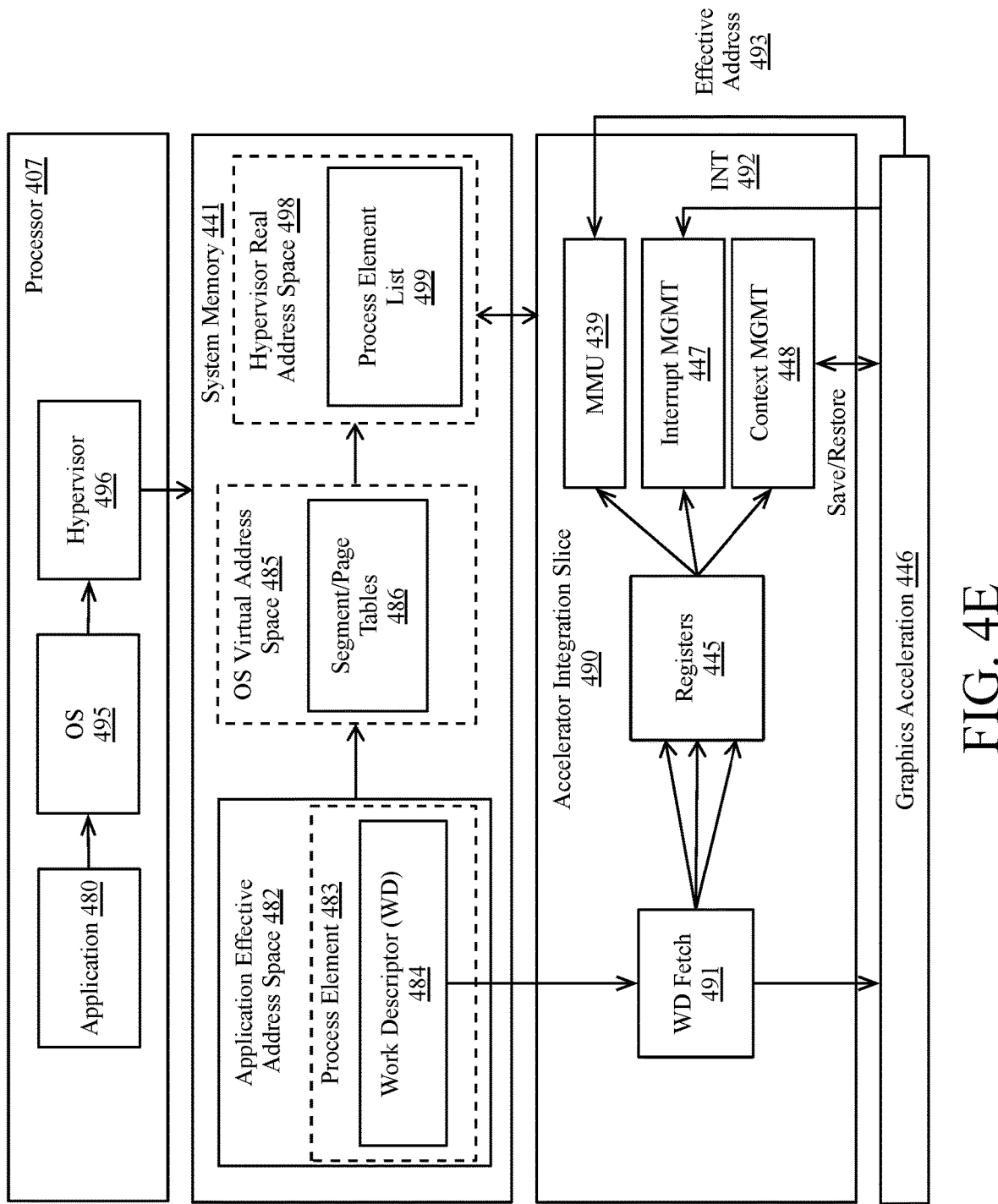

FIG. 4E illustrates additional details for one embodiment of a shared model. This embodiment includes a hypervisor real address space 498 in which a process element list 499 is stored. The hypervisor real address space 498 is accessible via a hypervisor 496 which virtualizes the graphics acceleration module engines for the operating system 495.

The shared programming models allow for all or a subset of processes from all or a subset of partitions in the system to use a graphics acceleration module 446. There are two programming models where the graphics acceleration module 446 is shared by multiple processes and partitions: time-sliced shared and graphics directed shared.

In this model, the system hypervisor 496 owns the graphics acceleration module 446 and makes its function available to all operating systems 495. For a graphics acceleration module 446 to support virtualization by the system hypervisor 496, the graphics acceleration module 446 may adhere to the following requirements: 1) An application's job request must be autonomous (that is, the state does not need to be maintained between jobs), or the graphics acceleration module 446 must provide a context save and restore mechanism. 2) An application's job request is guaranteed by the graphics acceleration module 446 to complete in a specified amount of time, including any translation faults, or the graphics acceleration module 446 provides the ability to preempt the processing of the job. 3) The graphics acceleration module 446 must be guaranteed fairness between processes when operating in the directed shared programming model.

In one embodiment, for the shared model, the application 480 is required to make an operating system 495 system call with a graphics acceleration module 446 type, a work descriptor (WD), an authority mask register (AMR) value, and a context save/restore area pointer (CSRP). The graphics acceleration module 446 type describes the targeted acceleration function for the system call. The graphics acceleration module 446 type may be a system-specific value. The WD is formatted specifically for the graphics acceleration module 446 and can be in the form of a graphics acceleration module 446 command, an effective address pointer to a user-defined structure, an effective address pointer to a queue of commands, or any other data structure to describe the work to be done by the graphics acceleration module 446. In one embodiment, the AMR value is the AMR state to use for the current process. The value passed to the operating system is similar to an application setting the AMR. If the accelerator integration circuit 436 and graphics acceleration module 446 implementations do not support a User Authority Mask Override Register (UAMOR), the operating system may apply the current UAMOR value to the AMR value before passing the AMR in the hypervisor call. The hypervisor 496 may optionally apply the current Authority Mask Override Register (AMOR) value before placing the AMR into the process element 483. In one embodiment, the CSRP is one of the registers 445 containing the effective address of an area in the application's address space 482 for the graphics acceleration module 446 to save and restore the context state. This pointer is optional if no state is required to be saved between jobs or when a job is preempted. The context save/restore area may be pinned system memory.

Upon receiving the system call, the operating system 495 may verify that the application 480 has registered and been given the authority to use the graphics acceleration module 446. The operating system 495 then calls the hypervisor 496 with the information shown in Table 3.

TABLE 3

OS to Hypervisor Call Parameters

1. A work descriptor (WD)
2. An Authority Mask Register (AMR) value (potentially masked).
3. An effective address (EA) Context Save/Restore Area Pointer (CSRP)
4. A process ID (PID) and optional thread ID (TID)
5. A virtual address (VA) accelerator utilization record pointer (AURP)
6. The virtual address of the storage segment table pointer (SSTP)
7. A logical interrupt service number (LISN)

Upon receiving the hypervisor call, the hypervisor 496 verifies that the operating system 495 has registered and been given the authority to use the graphics acceleration module 446. The hypervisor 496 then puts the process element 483 into the process element linked list for the corresponding graphics acceleration module 446 type. The process element may include the information shown in Table 4.

TABLE 4

Process Element Information

1. A work descriptor (WD)
2. An Authority Mask Register (AMR) value (potentially masked).
3. An effective address (EA) Context Save/Restore Area Pointer (CSRP)
4. A process ID (PID) and optional thread ID (TID)
5. A virtual address (VA) accelerator utilization record pointer (AURP)
6. The virtual address of the storage segment table pointer (SSTP)
7. A logical interrupt service number (LISN)
8. Interrupt vector table, derived from the hypervisor call parameters.
9. A state register (SR) value
10. A logical partition ID (LPID)
11. A real address (RA) hypervisor accelerator utilization record pointer
12. The Storage Descriptor Register (SDR)

In one embodiment, the hypervisor initializes a plurality of accelerator integration slice 490 registers 445.

Figure 4F:
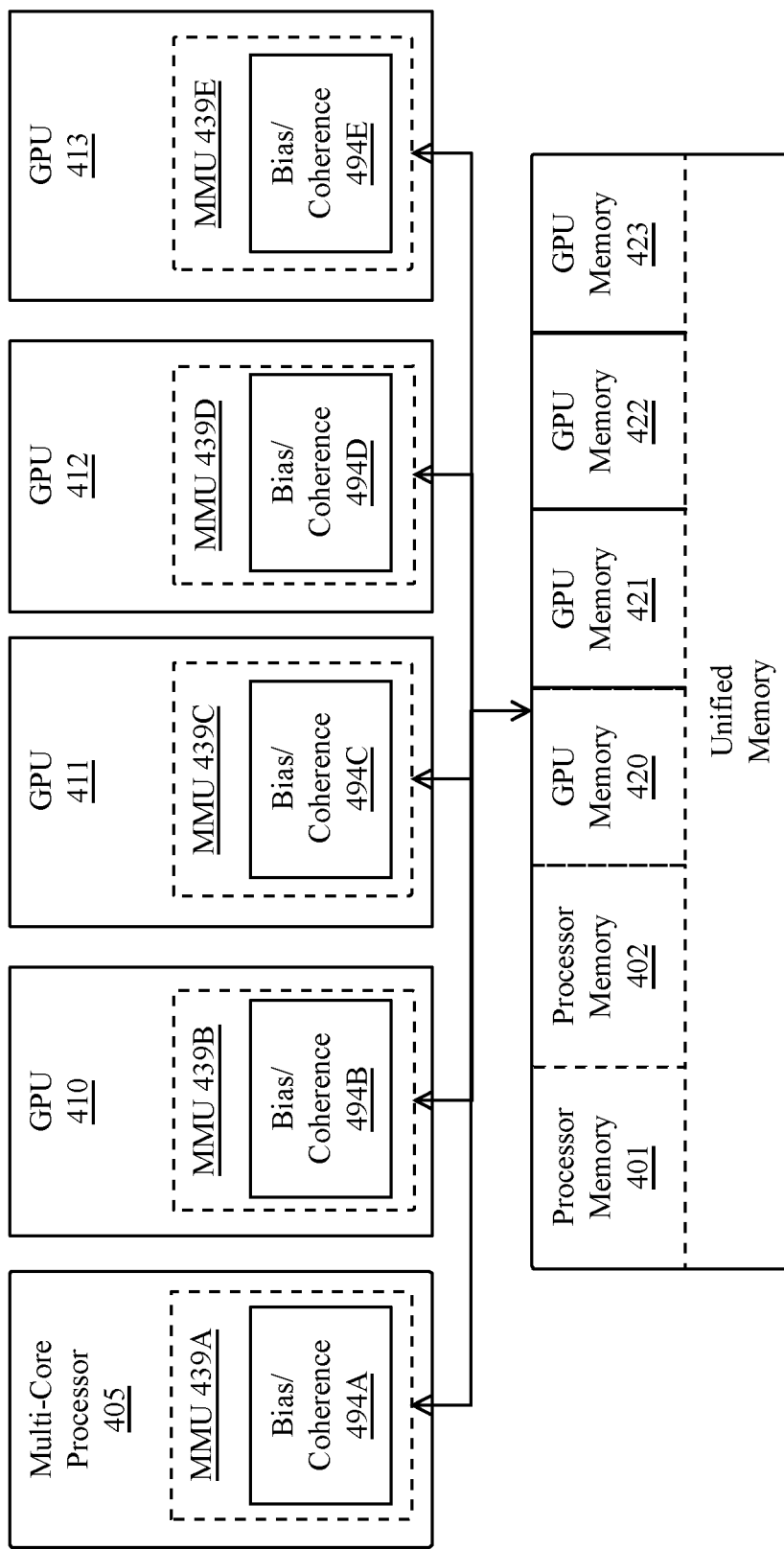

As illustrated in FIG. 4F, one embodiment of the invention employs a unified memory addressable via a common virtual memory address space used to access the physical processor memories 401-402 and GPU memories 420-423. In this implementation, operations executed on the GPUs 410-413 utilize the same virtual/effective memory address space to access the processors memories 401-402 and vice versa, thereby simplifying programmability. In one embodiment, a first portion of the virtual/effective address space is allocated to the processor memory 401, a second portion to the second processor memory 402, a third portion to the GPU memory 420, and so on. The entire virtual/effective memory space (sometimes referred to as the effective address space) is thereby distributed across each of the processor memories 401-402 and GPU memories 420-423, allowing any processor or GPU to access any physical memory with a virtual address mapped to that memory.

In one embodiment, bias/coherence management circuitry 494A-494E within one or more of the MMUs 439A-439E ensures cache coherence between the caches of the host processors (e.g., 405) and the GPUs 410-413 and implements biasing techniques indicating the physical memories in which certain types of data should be stored. While multiple instances of bias/coherence management circuitry 494A-494E are illustrated in FIG. 4F, the bias/coherence circuitry may be implemented within the MMU of one or more host processors 405 and/or within the accelerator integration circuit 436.

One embodiment allows GPU-attached memory 420-423 to be mapped as part of system memory, and accessed using shared virtual memory (SVM) technology, but without suffering the typical performance drawbacks associated with full system cache coherence. The ability to GPU-attached memory 420-423 to be accessed as system memory without onerous cache coherence overhead provides a beneficial operating environment for GPU offload. This arrangement allows the host processor 405 software to setup operands and access computation results, without the overhead of tradition I/O DMA data copies. Such traditional copies involve driver calls, interrupts and memory mapped I/O (MMIO) accesses that are all inefficient relative to simple memory accesses. At the same time, the ability to access GPU attached memory 420-423 without cache coherence overheads can be critical to the execution time of an offloaded computation. In cases with substantial streaming write memory traffic, for example, cache coherence overhead can significantly reduce the effective write bandwidth seen by a GPU 410-413. The efficiency of operand setup, the efficiency of results access, and the efficiency of GPU computation all play a role in determining the effectiveness of GPU offload.

In one implementation, the selection of between GPU bias and host processor bias is driven by a bias tracker data structure. A bias table may be used, for example, which may be a page-granular structure (i.e., controlled at the granularity of a memory page) that includes 1 or 2 bits per GPU-attached memory page. The bias table may be implemented in a stolen memory range of one or more GPU-attached memories 420-423, with or without a bias cache in the GPU 410-413 (e.g., to cache frequently/recently used entries of the bias table). Alternatively, the entire bias table may be maintained within the GPU.

In one implementation, the bias table entry associated with each access to the GPU-attached memory 420-423 is accessed prior the actual access to the GPU memory, causing the following operations. First, local requests from the GPU 410-413 that find their page in GPU bias are forwarded directly to a corresponding GPU memory 420-423. Local requests from the GPU that find their page in host bias are forwarded to the processor 405 (e.g., over a high-speed link as discussed above). In one embodiment, requests from the processor 405 that find the requested page in host processor bias complete the request like a normal memory read. Alternatively, requests directed to a GPU-biased page may be forwarded to the GPU 410-413. The GPU may then transition the page to a host processor bias if it is not currently using the page.

The bias state of a page can be changed either by a software-based mechanism, a hardware-assisted software-based mechanism, or, for a limited set of cases, a purely hardware-based mechanism.

One mechanism for changing the bias state employs an API call (e.g. OpenCL), which, in turn, calls the GPU's device driver which, in turn, sends a message (or enqueues a command descriptor) to the GPU directing it to change the bias state and, for some transitions, perform a cache flushing operation in the host. The cache flushing operation is required for a transition from host processor 405 bias to GPU bias, but is not required for the opposite transition.

In one embodiment, cache coherency is maintained by temporarily rendering GPU-biased pages uncacheable by the host processor 405. To access these pages, the processor 405 may request access from the GPU 410 which may or may not grant access right away, depending on the implementation. Thus, to reduce communication between the processor 405 and GPU 410 it is beneficial to ensure that GPU-biased pages are those which are required by the GPU but not the host processor 405 and vice versa.

Graphics Processing Pipeline

Figure 5:
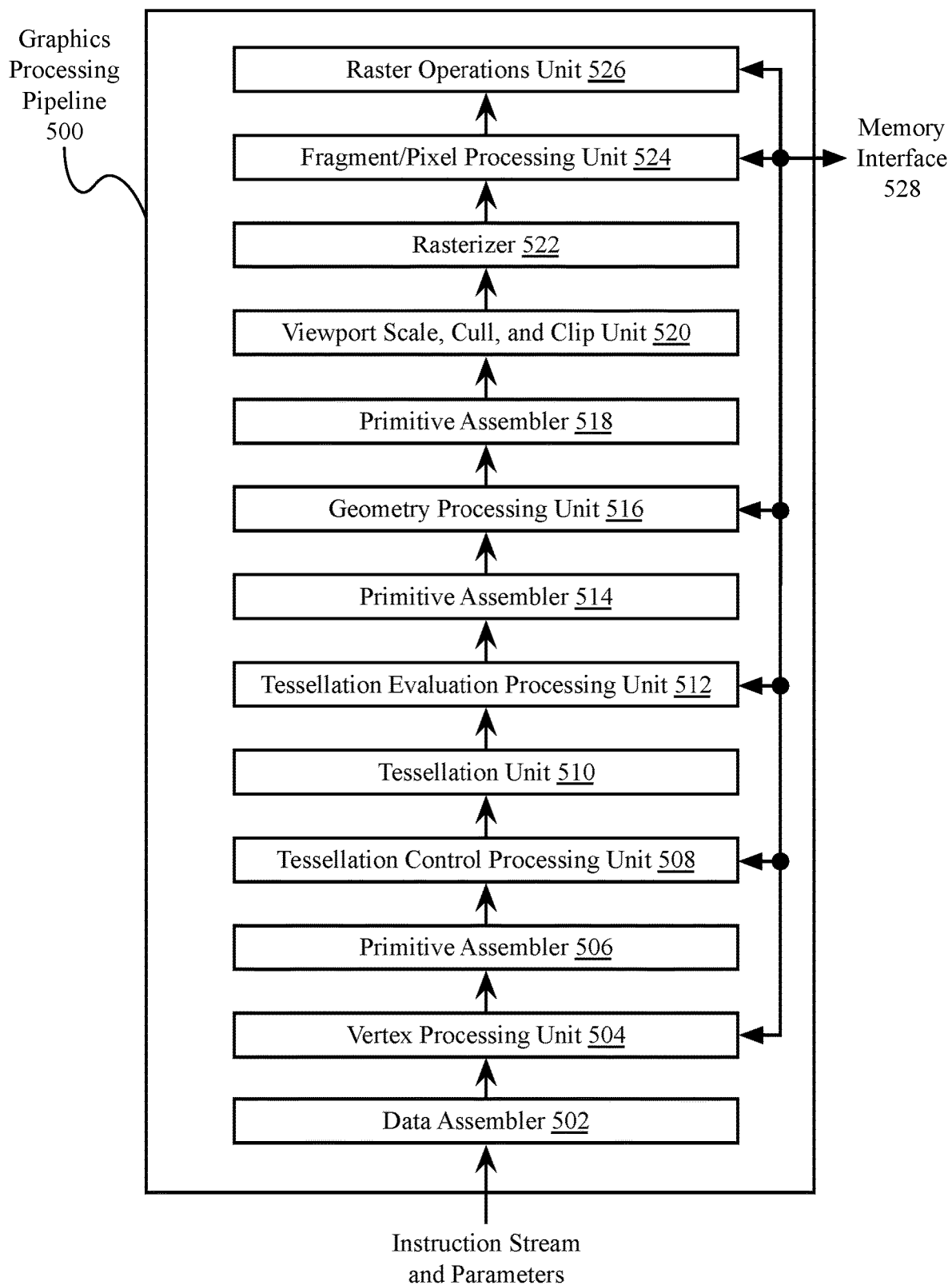
FIG. 5 illustrates a graphics processing pipeline, according to an embodiment.

FIG. 5 illustrates a graphics processing pipeline 500, according to an embodiment. In one embodiment a graphics processor can implement the illustrated graphics processing pipeline 500. The graphics processor can be included within the parallel processing subsystems as described herein, such as the parallel processor 200 of FIG. 2A, which, in one embodiment, is a variant of the parallel processor(s) 112 of FIG. 1. The various parallel processing systems can implement the graphics processing pipeline 500 via one or more instances of the parallel processing unit (e.g., parallel processing unit 202 of FIG. 2A) as described herein. For example, a shader unit (e.g., graphics multiprocessor 234 of FIG. 2C) may be configured to perform the functions of one or more of a vertex processing unit 504, a tessellation control processing unit 508, a tessellation evaluation processing unit 512, a geometry processing unit 516, and a fragment/pixel processing unit 524. The functions of data assembler 502, primitive assemblers 506, 514, 518, tessellation unit 510, rasterizer 522, and raster operations unit 526 may also be performed by other processing engines within a processing cluster (e.g., processing cluster 214 of FIG. 2A) and a corresponding partition unit (e.g., partition unit 220A-220N of FIG. 2A). The graphics processing pipeline 500 may also be implemented using dedicated processing units for one or more functions. In one embodiment, one or more portions of the graphics processing pipeline 500 can be performed by parallel processing logic within a general purpose processor (e.g., CPU). In one embodiment, one or more portions of the graphics processing pipeline 500 can access on-chip memory (e.g., parallel processor memory 222 as in FIG. 2A) via a memory interface 528, which may be an instance of the memory interface 218 of FIG. 2A.

In one embodiment the data assembler 502 is a processing unit that collects vertex data for surfaces and primitives. The data assembler 502 then outputs the vertex data, including the vertex attributes, to the vertex processing unit 504. The vertex processing unit 504 is a programmable execution unit that executes vertex shader programs, lighting and transforming vertex data as specified by the vertex shader programs. The vertex processing unit 504 reads data that is stored in cache, local or system memory for use in processing the vertex data and may be programmed to transform the vertex data from an object-based coordinate representation to a world space coordinate space or a normalized device coordinate space.

A first instance of a primitive assembler 506 receives vertex attributes from the vertex processing unit 504. The primitive assembler 506 readings stored vertex attributes as needed and constructs graphics primitives for processing by tessellation control processing unit 508. The graphics primitives include triangles, line segments, points, patches, and so forth, as supported by various graphics processing application programming interfaces (APIs).

The tessellation control processing unit 508 treats the input vertices as control points for a geometric patch. The control points are transformed from an input representation from the patch (e.g., the patch's bases) to a representation that is suitable for use in surface evaluation by the tessellation evaluation processing unit 512. The tessellation control processing unit 508 can also compute tessellation factors for edges of geometric patches. A tessellation factor applies to a single edge and quantifies a view-dependent level of detail associated with the edge. A tessellation unit 510 is configured to receive the tessellation factors for edges of a patch and to tessellate the patch into multiple geometric primitives such as line, triangle, or quadrilateral primitives, which are transmitted to a tessellation evaluation processing unit 512. The tessellation evaluation processing unit 512 operates on parameterized coordinates of the subdivided patch to generate a surface representation and vertex attributes for each vertex associated with the geometric primitives.

A second instance of a primitive assembler 514 receives vertex attributes from the tessellation evaluation processing unit 512, reading stored vertex attributes as needed, and constructs graphics primitives for processing by the geometry processing unit 516. The geometry processing unit 516 is a programmable execution unit that executes geometry shader programs to transform graphics primitives received from primitive assembler 514 as specified by the geometry shader programs. In one embodiment the geometry processing unit 516 is programmed to subdivide the graphics primitives into one or more new graphics primitives and calculate parameters used to rasterize the new graphics primitives.

In some embodiments the geometry processing unit 516 can add or delete elements in the geometry stream. The geometry processing unit 516 outputs the parameters and vertices specifying new graphics primitives to primitive assembler 518. The primitive assembler 518 receives the parameters and vertices from the geometry processing unit 516 and constructs graphics primitives for processing by a viewport scale, cull, and clip unit 520. The geometry processing unit 516 reads data that is stored in parallel processor memory or system memory for use in processing the geometry data. The viewport scale, cull, and clip unit 520 performs clipping, culling, and viewport scaling and outputs processed graphics primitives to a rasterizer 522.

The rasterizer 522 can perform depth culling and other depth-based optimizations. The rasterizer 522 also performs scan conversion on the new graphics primitives to generate fragments and output those fragments and associated coverage data to the fragment/pixel processing unit 524. The fragment/pixel processing unit 524 is a programmable execution unit that is configured to execute fragment shader programs or pixel shader programs. The fragment/pixel processing unit 524 transforming fragments or pixels received from rasterizer 522, as specified by the fragment or pixel shader programs. For example, the fragment/pixel processing unit 524 may be programmed to perform operations included but not limited to texture mapping, shading, blending, texture correction and perspective correction to produce shaded fragments or pixels that are output to a raster operations unit 526. The fragment/pixel processing unit 524 can read data that is stored in either the parallel processor memory or the system memory for use when processing the fragment data. Fragment or pixel shader programs may be configured to shade at sample, pixel, tile, or other granularities depending on the sampling rate configured for the processing units.

The raster operations unit 526 is a processing unit that performs raster operations including, but not limited to stencil, z test, blending, and the like, and outputs pixel data as processed graphics data to be stored in graphics memory (e.g., parallel processor memory 222 as in FIG. 2A, and/or system memory 104 as in FIG. 1), to be displayed on the one or more display device(s) 110A-110B or for further processing by one of the one or more processor(s) 102 or parallel processor(s) 112. In some embodiments the raster operations unit 526 is configured to compress z or color data that is written to memory and decompress z or color data that is read from memory.

Machine Learning Overview

A machine learning algorithm is an algorithm that can learn based on a set of data. Embodiments of machine learning algorithms can be designed to model high-level abstractions within a data set. For example, image recognition algorithms can be used to determine which of several categories to which a given input belong; regression algorithms can output a numerical value given an input; and pattern recognition algorithms can be used to generate translated text or perform text to speech and/or speech recognition.

An exemplary type of machine learning algorithm is a neural network. There are many types of neural networks; a simple type of neural network is a feedforward network. A feedforward network may be implemented as an acyclic graph in which the nodes are arranged in layers. Typically, a feedforward network topology includes an input layer and an output layer that are separated by at least one hidden layer. The hidden layer transforms input received by the input layer into a representation that is useful for generating output in the output layer. The network nodes are fully connected via edges to the nodes in adjacent layers, but there are no edges between nodes within each layer. Data received at the nodes of an input layer of a feedforward network are propagated (i.e., "fed forward") to the nodes of the output layer via an activation function that calculates the states of the nodes of each successive layer in the network based on coefficients ("weights") respectively associated with each of the edges connecting the layers. Depending on the specific model being represented by the algorithm being executed, the output from the neural network algorithm can take various forms.

Before a machine learning algorithm can be used to model a particular problem, the algorithm is trained using a training data set. Training a neural network involves selecting a network topology, using a set of training data representing a problem being modeled by the network, and adjusting the weights until the network model performs with a minimal error for all instances of the training data set. For example, during a supervised learning training process for a neural network, the output produced by the network in response to the input representing an instance in a training data set is compared to the "correct" labeled output for that instance, an error signal representing the difference between the output and the labeled output is calculated, and the weights associated with the connections are adjusted to minimize that error as the error signal is backward propagated through the layers of the network. The network is considered "trained" when the errors for each of the outputs generated from the instances of the training data set are minimized.

The accuracy of a machine learning algorithm can be affected significantly by the quality of the data set used to train the algorithm. The training process can be computationally intensive and may require a significant amount of time on a conventional general-purpose processor. Accordingly, parallel processing hardware is used to train many types of machine learning algorithms. This is particularly useful for optimizing the training of neural networks, as the computations performed in adjusting the coefficients in neural networks lend themselves naturally to parallel implementations. Specifically, many machine learning algorithms and software applications have been adapted to make use of the parallel processing hardware within general-purpose graphics processing devices.

Figure 6:
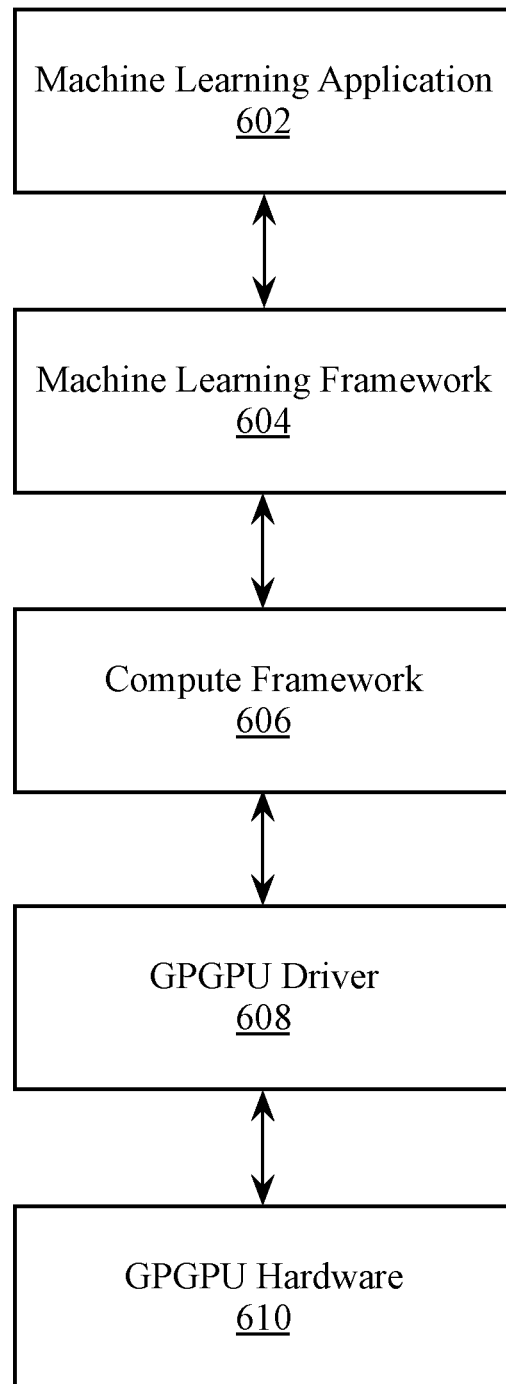
FIG. 6 illustrates a machine learning software stack, according to an embodiment.

FIG. 6 is a generalized diagram of a machine learning software stack 600. A machine learning application 602 can be configured to train a neural network using a training dataset or to use a trained deep neural network to implement machine intelligence. The machine learning application 602 can include training and inference functionality for a neural network and/or specialized software that can be used to train a neural network before deployment. The machine learning application 602 can implement any type of machine intelligence including but not limited to image recognition, mapping and localization, autonomous navigation, speech synthesis, medical imaging, or language translation.

Hardware acceleration for the machine learning application 602 can be enabled via a machine learning framework 604. The machine learning framework 604 can provide a library of machine learning primitives. Machine learning primitives are basic operations that are commonly performed by machine learning algorithms. Without the machine learning framework 604, developers of machine learning algorithms would be required to create and optimize the main computational logic associated with the machine learning algorithm, then re-optimize the computational logic as new parallel processors are developed. Instead, the machine learning application can be configured to perform the necessary computations using the primitives provided by the machine learning framework 604. Exemplary primitives include tensor convolutions, activation functions, and pooling, which are computational operations that are performed while training a convolutional neural network (CNN). The machine learning framework 604 can also provide primitives to implement basic linear algebra subprograms performed by many machine-learning algorithms, such as matrix and vector operations.

The machine learning framework 604 can process input data received from the machine learning application 602 and generate the appropriate input to a compute framework 606. The compute framework 606 can abstract the underlying instructions provided to the GPGPU driver 608 to enable the machine learning framework 604 to take advantage of hardware acceleration via the GPGPU hardware 610 without requiring the machine learning framework 604 to have intimate knowledge of the architecture of the GPGPU hardware 610. Additionally, the compute framework 606 can enable hardware acceleration for the machine learning framework 604 across a variety of types and generations of the GPGPU hardware 610.

GPGPU Machine Learning Acceleration

Figure 7:
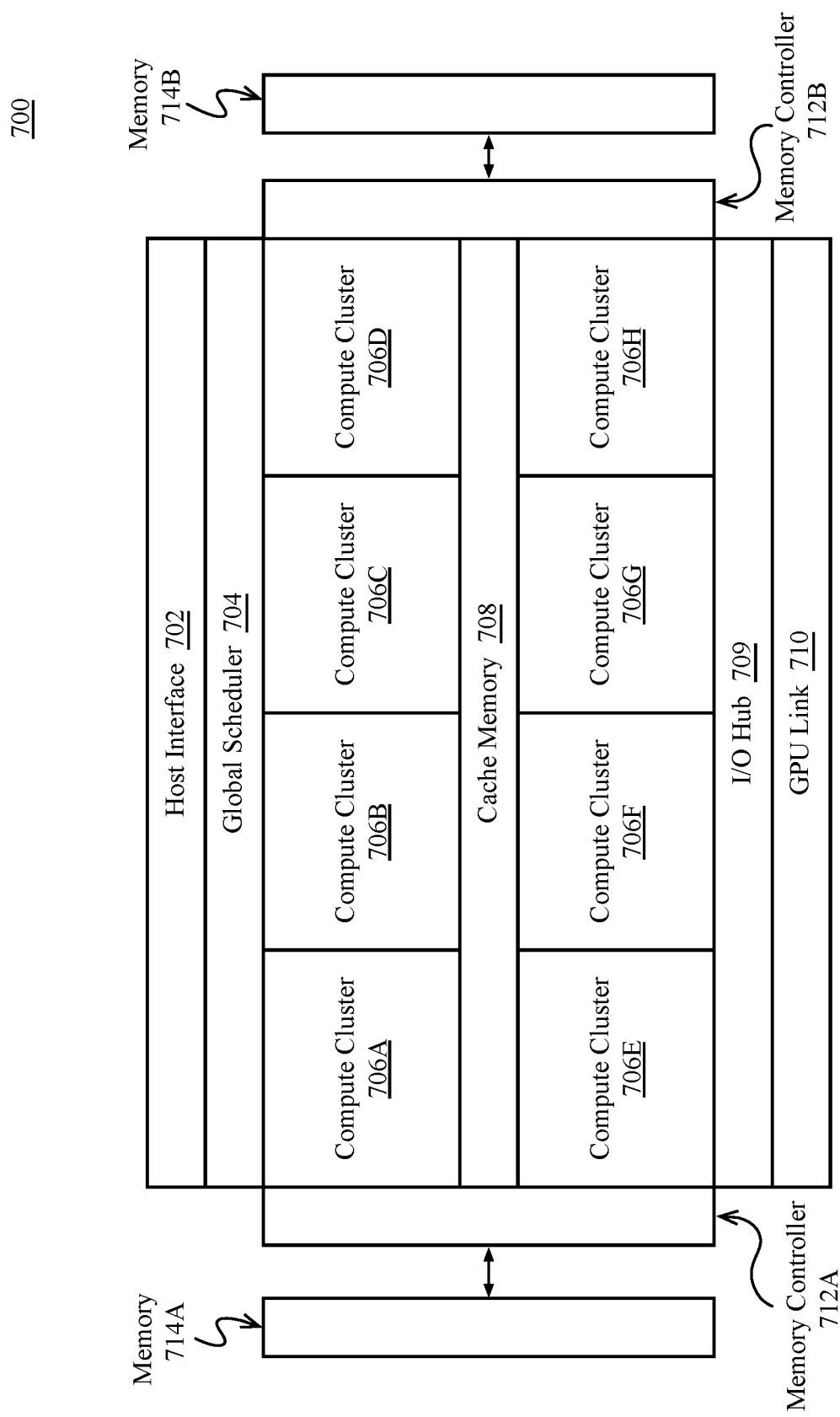
FIG. 7 illustrates a highly-parallel general-purpose graphics processing unit, according to an embodiment.

FIG. 7 illustrates a highly-parallel general-purpose graphics processing unit 700, according to an embodiment. In one embodiment the general-purpose processing unit (GPGPU) 700 can be configured to be particularly efficient in processing the type of computational workloads associated with training deep neural networks. Additionally, the GPGPU 700 can be linked directly to other instances of the GPGPU to create a multi-GPU cluster to improve training speed for particularly deep neural networks.

The GPGPU 700 includes a host interface 702 to enable a connection with a host processor. In one embodiment the host interface 702 is a PCI Express interface. However, the host interface can also be a vendor specific communications interface or communications fabric. The GPGPU 700 receives commands from the host processor and uses a global scheduler 704 to distribute execution threads associated with those commands to a set of compute clusters 706A-706H. The compute clusters 706A-706H share a cache memory 708. The cache memory 708 can serve as a higher-level cache for cache memories within the compute clusters 706A-706H.

The GPGPU 700 includes memory 714A-714B coupled with the compute clusters 706A-H via a set of memory controllers 712A-712B. In various embodiments, the memory 714A-714B can include various types of memory devices including dynamic random access memory (DRAM) or graphics random access memory, such as synchronous graphics random access memory (SGRAM), including graphics double data rate (GDDR) memory or 3D stacked memory, including but not limited to high bandwidth memory (HBM).

In one embodiment each compute cluster 706A-706H includes a set of graphics multiprocessors, such as the graphics multiprocessor 325 of FIG. 3A. The graphics multiprocessors of the compute cluster multiple types of integer and floating point logic units that can perform computational operations at a range of precisions including suited for machine learning computations. For example and in one embodiment at least a subset of the floating point units in each of the compute clusters 706A-H can be configured to perform 16-bit or 32-bit floating point operations, while a different subset of the floating point units can be configured to perform 64-bit floating point operations.

Multiple instances of the GPGPU 700 can be configured to operate as a compute cluster. The communication mechanism used by the compute cluster for synchronization and data exchange varies across embodiments. In one embodiment the multiple instances of the GPGPU 700 communicate over the host interface 702. In one embodiment the GPGPU 700 includes an I/O hub 709 that couples the GPGPU 700 with a GPU link 710 that enables a direct connection to other instances of the GPGPU. In one embodiment the GPU link 710 is coupled to a dedicated GPU-to-GPU bridge that enables communication and synchronization between multiple instances of the GPGPU 700. In one embodiment the GPU link 710 couples with a high speed interconnect to transmit and receive data to other GPGPUs or parallel processors. In one embodiment the multiple instances of the GPGPU 700 are located in separate data processing systems and communicate via a network device that is accessible via the host interface 702. In one embodiment the GPU link 710 can be configured to enable a connection to a host processor in addition to or as an alternative to the host interface 702.

While the illustrated configuration of the GPGPU 700 can be configured to train neural networks, one embodiment provides alternate configuration of the GPGPU 700 that can be configured for deployment within a high performance or low power inferencing platform. In an inferencing configuration the GPGPU 700 includes fewer of the compute clusters 706A-H relative to the training configuration. Additionally memory technology associated with the memory 714A-714B may differ between inferencing and training configurations. In one embodiment the inferencing configuration of the GPGPU 700 can support inferencing specific instructions. For example, an inferencing configuration can provide support for one or more 8-bit integer dot product instructions, which are commonly used during inferencing operations for deployed neural networks.

Figure 8:
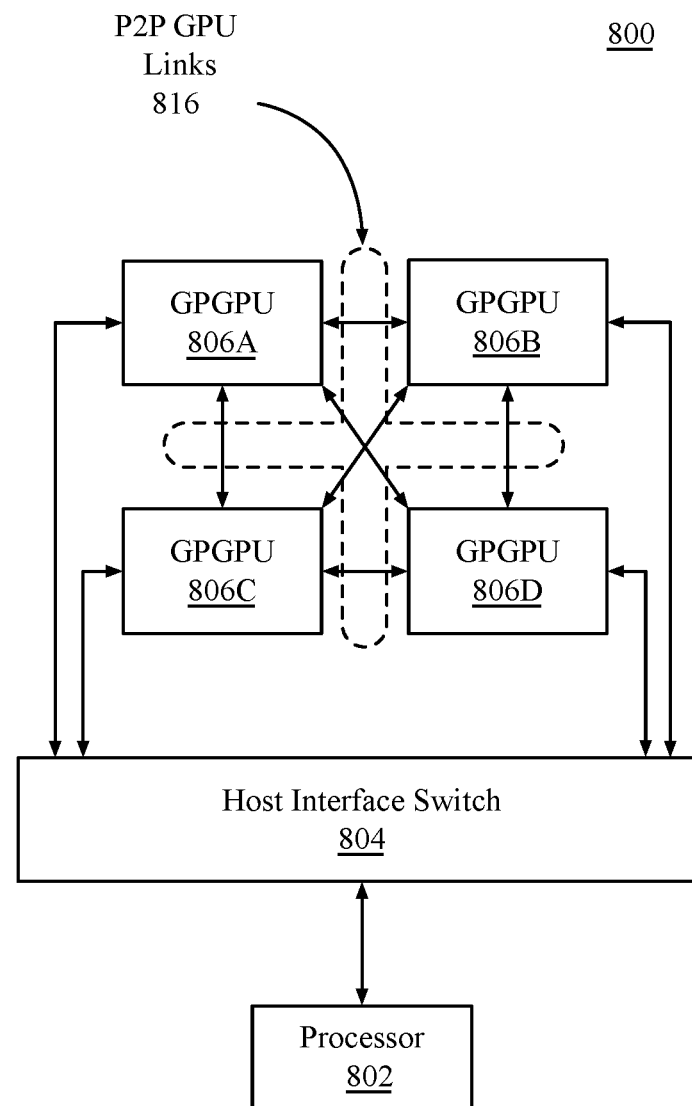
FIG. 8 illustrates a multi-GPU computing system, according to an embodiment.

FIG. 8 illustrates a multi-GPU computing system 800, according to an embodiment. The multi-GPU computing system 800 can include a processor 802 coupled to multiple GPGPUs 806A-D via a host interface switch 804. The host interface switch 804, in one embodiment, is a PCI express switch device that couples the processor 802 to a PCI express bus over which the processor 802 can communicate with the set of GPGPUs 806A-D. Each of the multiple GPGPUs 806A-806D can be an instance of the GPGPU 700 of FIG. 7. The GPGPUs 806A-D can interconnect via a set of high-speed point-to-point GPU to GPU links 816. The high-speed GPU to GPU links can connect to each of the GPGPUs 806A-806D via a dedicated GPU link, such as the GPU link 710 as in FIG. 7. The P2P GPU links 816 enable direct communication between each of the GPGPUs 806A-D without requiring communication over the host interface bus to which the processor 802 is connected. With GPU-to-GPU traffic directed to the P2P GPU links, the host interface bus remains available for system memory access or to communicate with other instances of the multi-GPU computing system 800, for example, via one or more network devices. While in the illustrated embodiment the GPGPUs 806A-D connect to the processor 802 via the host interface switch 804, in one embodiment the processor 802 includes direct support for the P2P GPU links 816 and can connect directly to the GPGPUs 806A-806D.

Machine Learning Neural Network Implementations

The computing architecture provided by embodiments described herein can be configured to perform the types of parallel processing that is particularly suited for training and deploying neural networks for machine learning. A neural network can be generalized as a network of functions having a graph relationship. As is well-known in the art, there are a variety of types of neural network implementations used in machine learning. One exemplary type of neural network is the feedforward network, as previously described.

A second exemplary type of neural network is the Convolutional Neural Network (CNN). A CNN is a specialized feedforward neural network for processing data having a known, grid-like topology, such as image data. Accordingly, CNNs are commonly used for compute vision and image recognition applications, but they also may be used for other types of pattern recognition such as speech and language processing. The nodes in the CNN input layer are organized into a set of "filters" (feature detectors inspired by the receptive fields found in the retina), and the output of each set of filters is propagated to nodes in successive layers of the network. The computations for a CNN include applying the convolution mathematical operation to each filter to produce the output of that filter. Convolution is a specialized kind of mathematical operation performed by two functions to produce a third function that is a modified version of one of the two original functions. In convolutional network terminology, the first function to the convolution can be referred to as the input, while the second function can be referred to as the convolution kernel. The output may be referred to as the feature map. For example, the input to a convolution layer can be a multidimensional array of data that defines the various color components of an input image. The convolution kernel can be a multidimensional array of parameters, where the parameters are adapted by the training process for the neural network.

Recurrent neural networks (RNNs) are a family of feedforward neural networks that include feedback connections between layers. RNNs enable modeling of sequential data by sharing parameter data across different parts of the neural network. The architecture for a RNN includes cycles. The cycles represent the influence of a present value of a variable on its own value at a future time, as at least a portion of the output data from the RNN is used as feedback for processing subsequent input in a sequence. This feature makes RNNs particularly useful for language processing due to the variable nature in which language data can be composed.

The figures described below present exemplary feedforward, CNN, and RNN networks, as well as describe a general process for respectively training and deploying each of those types of networks. It will be understood that these descriptions are exemplary and non-limiting as to any specific embodiment described herein and the concepts illustrated can be applied generally to deep neural networks and machine learning techniques in general.

The exemplary neural networks described above can be used to perform deep learning. Deep learning is machine learning using deep neural networks. The deep neural networks used in deep learning are artificial neural networks composed of multiple hidden layers, as opposed to shallow neural networks that include only a single hidden layer. Deeper neural networks are generally more computationally intensive to train. However, the additional hidden layers of the network enable multistep pattern recognition that results in reduced output error relative to shallow machine learning techniques.

Deep neural networks used in deep learning typically include a front-end network to perform feature recognition coupled to a back-end network which represents a mathematical model that can perform operations (e.g., object classification, speech recognition, etc.) based on the feature representation provided to the model. Deep learning enables machine learning to be performed without requiring hand crafted feature engineering to be performed for the model. Instead, deep neural networks can learn features based on statistical structure or correlation within the input data. The learned features can be provided to a mathematical model that can map detected features to an output. The mathematical model used by the network is generally specialized for the specific task to be performed, and different models will be used to perform different task.

Once the neural network is structured, a learning model can be applied to the network to train the network to perform specific tasks. The learning model describes how to adjust the weights within the model to reduce the output error of the network. Backpropagation of errors is a common method used to train neural networks. An input vector is presented to the network for processing. The output of the network is compared to the desired output using a loss function and an error value is calculated for each of the neurons in the output layer. The error values are then propagated backwards until each neuron has an associated error value which roughly represents its contribution to the original output. The network can then learn from those errors using an algorithm, such as the stochastic gradient descent algorithm, to update the weights of the of the neural network.

Figure 9A:
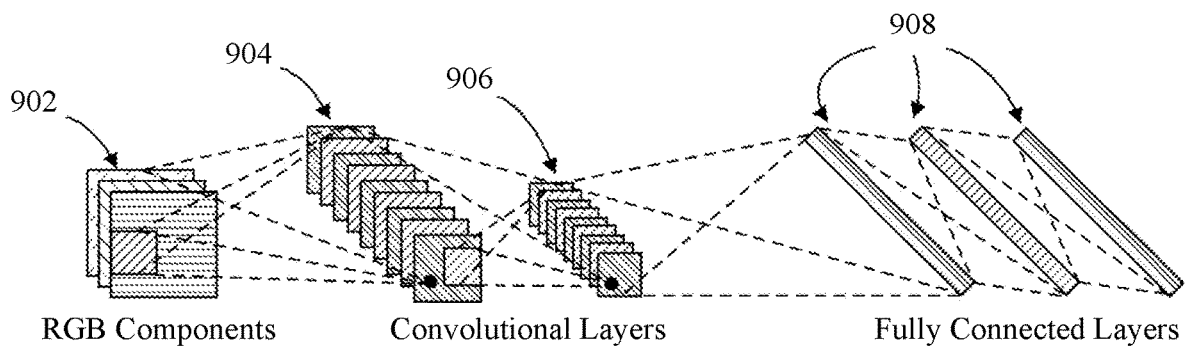
FIG. 9A-9B illustrate layers of exemplary deep neural networks.
Figure 9B:
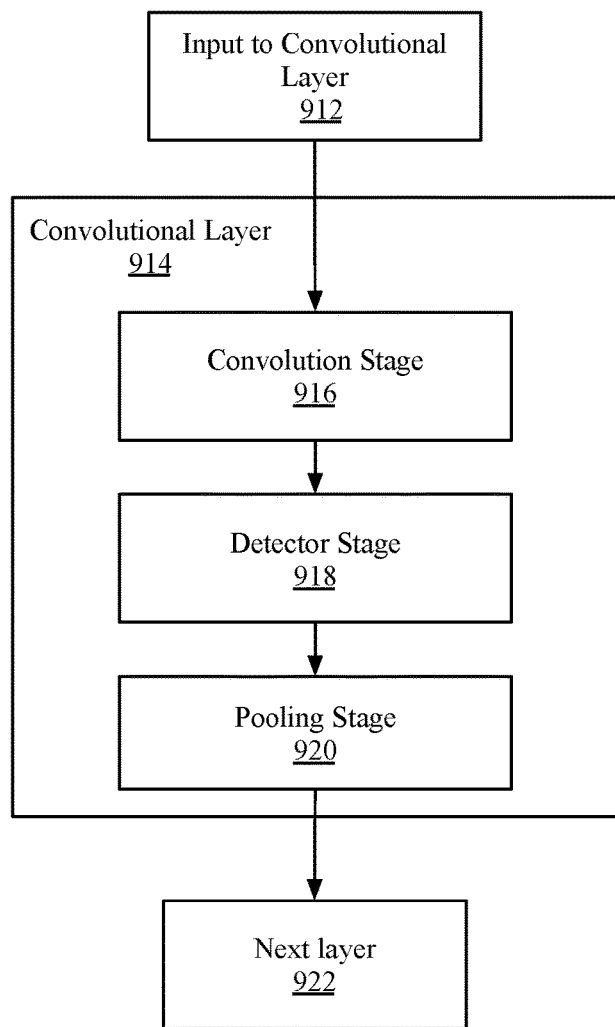

FIG. 9A-B illustrate an exemplary convolutional neural network. FIG. 9A illustrates various layers within a CNN. As shown in FIG. 9A, an exemplary CNN used to model image processing can receive input 902 describing the red, green, and blue (RGB) components of an input image. The input 902 can be processed by multiple convolutional layers (e.g., first convolutional layer 904, second convolutional layer 906). The output from the multiple convolutional layers may optionally be processed by a set of fully connected layers 908. Neurons in a fully connected layer have full connections to all activations in the previous layer, as previously described for a feedforward network. The output from the fully connected layers 908 can be used to generate an output result from the network. The activations within the fully connected layers 908 can be computed using matrix multiplication instead of convolution. Not all CNN implementations are configured to make use of fully connected layers 908. For example, in some implementations the convolutional layer 906 can generate output for the CNN.

The convolutional layers are sparsely connected, which differs from traditional neural network configuration found in the fully connected layers 908. Traditional neural network layers are fully connected, such that every output unit interacts with every input unit. However, the convolutional layers are sparsely connected because the output of the convolution of a field is input (instead of the respective state value of each of the nodes in the field) to the nodes of the subsequent layer, as illustrated. The kernels associated with the convolutional layers perform convolution operations, the output of which is sent to the next layer. The dimensionality reduction performed within the convolutional layers is one aspect that enables the CNN to scale to process large images.

FIG. 9B illustrates exemplary computation stages within a convolutional layer of a CNN. Input to a convolutional layer 912 of a CNN can be processed in three stages of a convolutional layer 914. The three stages can include a convolution stage 916, a detector stage 918, and a pooling stage 920. The convolutional layer 914 can then output data to a successive convolutional layer. The final convolutional layer of the network can generate output feature map data or provide input to a fully connected layer, for example, to generate a classification value for the input to the CNN.

In the convolution stage 916 performs several convolutions in parallel to produce a set of linear activations. The convolution stage 916 can include an affine transformation, which is any transformation that can be specified as a linear transformation plus a translation. Affine transformations include rotations, translations, scaling, and combinations of these transformations. The convolution stage computes the output of functions (e.g., neurons) that are connected to specific regions in the input, which can be determined as the local region associated with the neuron. The neurons compute a dot product between the weights of the neurons and the region in the local input to which the neurons are connected. The output from the convolution stage 916 defines a set of linear activations that are processed by successive stages of the convolutional layer 914.

The linear activations can be processed by a detector stage 918. In the detector stage 918, each linear activation is processed by a non-linear activation function. The non-linear activation function increases the nonlinear properties of the overall network without affecting the receptive fields of the convolutional layer. Several types of non-linear activation functions may be used. One particular type is the rectified linear unit (ReLU), which uses an activation function defined as $f(x)=\max(0, x)$, such that the activation is thresholded at zero.

The pooling stage 920 uses a pooling function that replaces the output of the convolutional layer 906 with a summary statistic of the nearby outputs. The pooling function can be used to introduce translation invariance into the neural network, such that small translations to the input do not change the pooled outputs. Invariance to local translation can be useful in scenarios where the presence of a feature in the input data is more important than the precise location of the feature. Various types of pooling functions can be used during the pooling stage 920, including max pooling, average pooling, and l2-norm pooling. Additionally, some CNN implementations do not include a pooling stage. Instead, such implementations substitute and additional convolution stage having an increased stride relative to previous convolution stages.

The output from the convolutional layer 914 can then be processed by the next layer 922. The next layer 922 can be an additional convolutional layer or one of the fully connected layers 908. For example, the first convolutional layer 904 of FIG. 9A can output to the second convolutional layer 906, while the second convolutional layer can output to a first layer of the fully connected layers 908.

Figure 10:
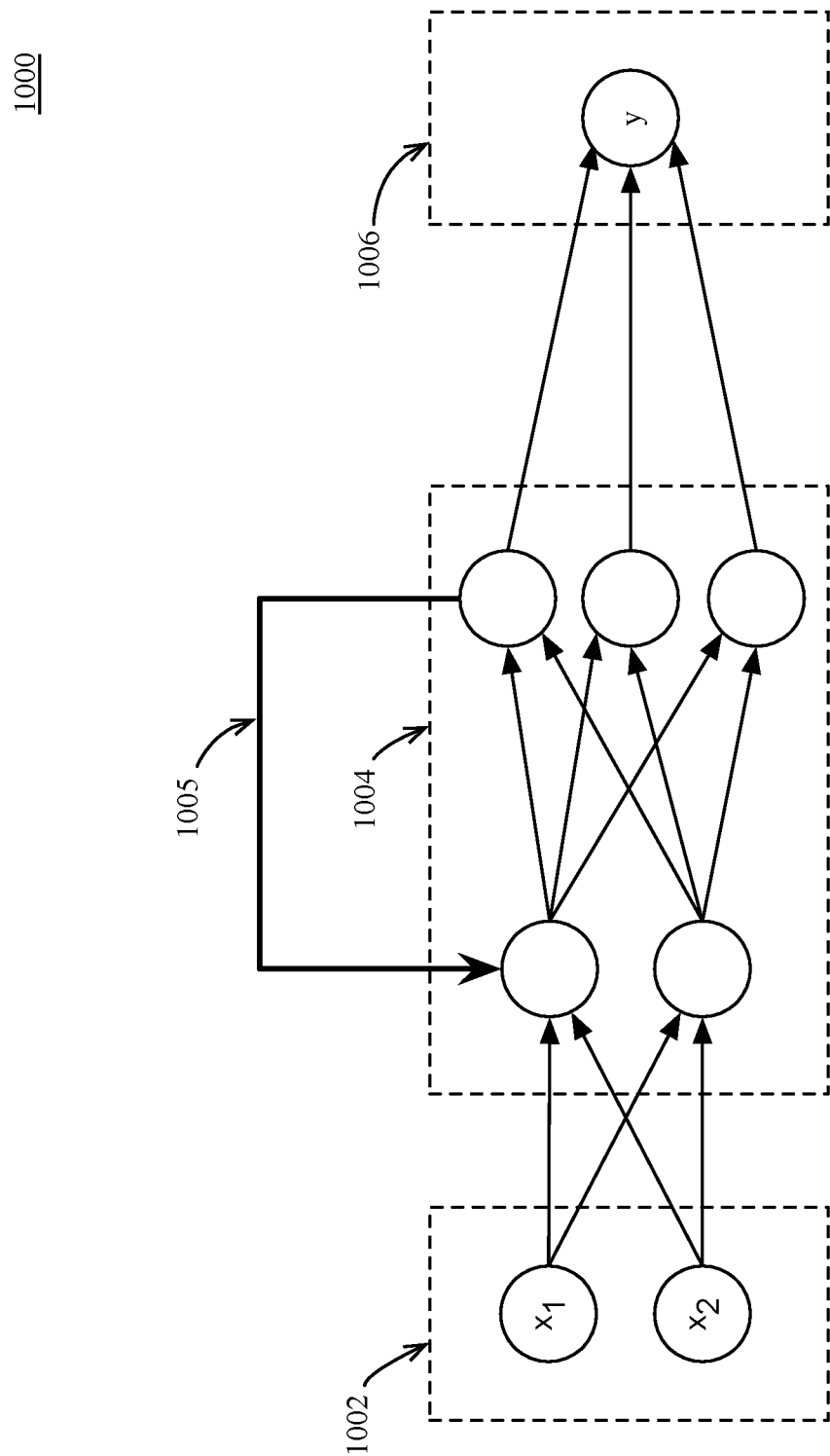
FIG. 10 illustrates an exemplary recurrent neural network.

FIG. 10 illustrates an exemplary recurrent neural network 1000. In a recurrent neural network (RNN), the previous state of the network influences the output of the current state of the network. RNNs can be built in a variety of ways using a variety of functions. The use of RNNs generally revolves around using mathematical models to predict the future based on a prior sequence of inputs. For example, an RNN may be used to perform statistical language modeling to predict an upcoming word given a previous sequence of words. The illustrated RNN 1000 can be described has having an input layer 1002 that receives an input vector, hidden layers 1004 to implement a recurrent function, a feedback mechanism 1005 to enable a 'memory' of previous states, and an output layer 1006 to output a result. The RNN 1000 operates based on time-steps. The state of the RNN at a given time step is influenced based on the previous time step via the feedback mechanism 1005. For a given time step, the state of the hidden layers 1004 is defined by the previous state and the input at the current time step. An initial input ($x_1$) at a first time step can be processed by the hidden layer 1004. A second input ($x_2$) can be processed by the hidden layer 1004 using state information that is determined during the processing of the initial input ($x_1$). A given state can be computed as $s_t = f(Ux_t + Ws_{t-1})$, where U and W are parameter matrices. The function $f$ is generally a non-linearity, such as the hyperbolic tangent function (Tanh) or a variant of the rectifier function $f(x) = \max(0, x)$. However, the specific mathematical function used in the hidden layers 1004 can vary depending on the specific implementation details of the RNN 1000.

In addition to the basic CNN and RNN networks described, variations on those networks may be enabled. One example RNN variant is the long short term memory (LSTM) RNN. LSTM RNNs are capable of learning long-term dependencies that may be necessary for processing longer sequences of language. A variant on the CNN is a convolutional deep belief network, which has a structure similar to a CNN and is trained in a manner similar to a deep belief network. A deep belief network (DBN) is a generative neural network that is composed of multiple layers of stochastic (random) variables. DBNs can be trained layer-by-layer using greedy unsupervised learning. The learned weights of the DBN can then be used to provide pre-train neural networks by determining an optimal initial set of weights for the neural network.

Figure 11:
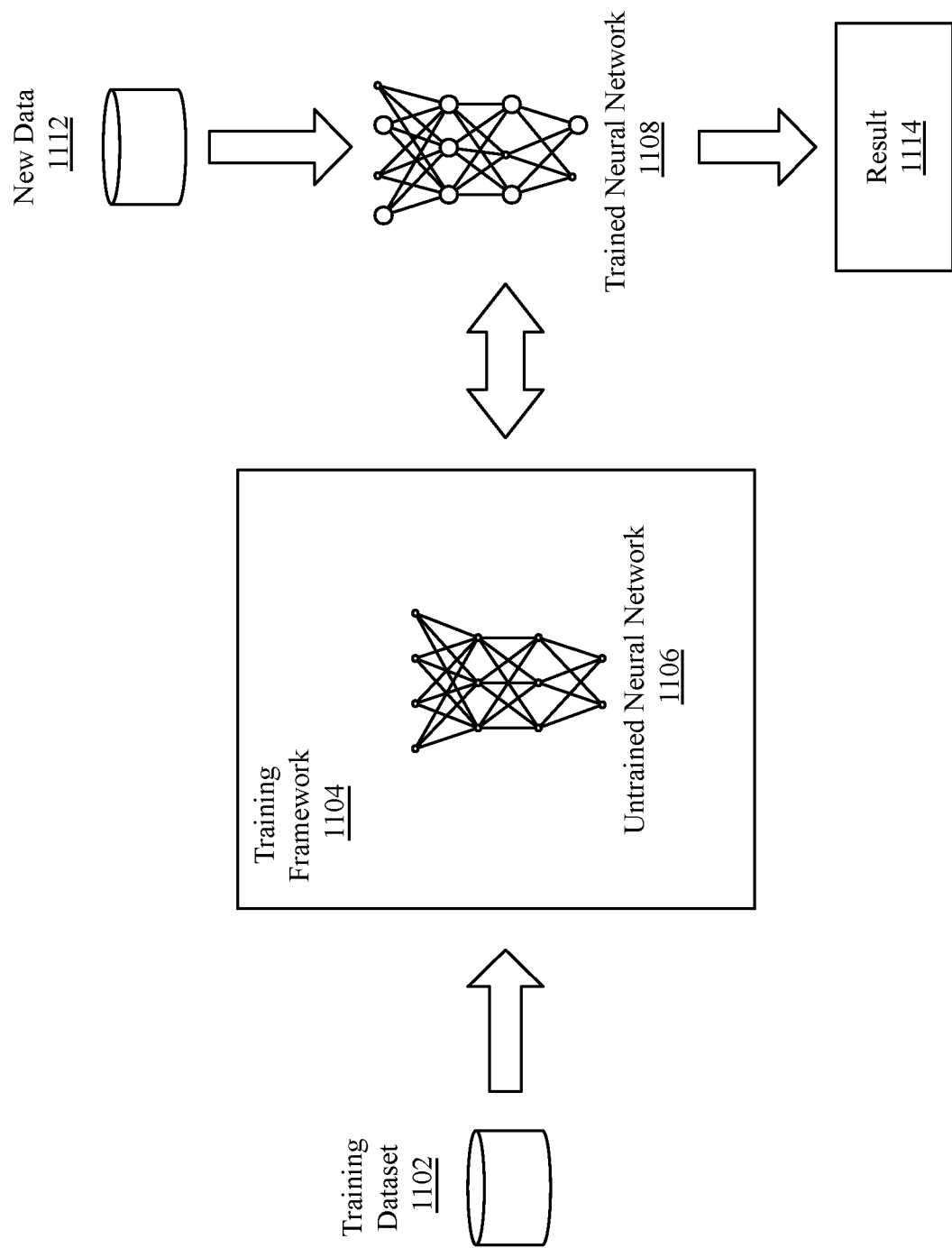
FIG. 11 illustrates training and deployment of a deep neural network.

FIG. 11 illustrates training and deployment of a deep neural network. Once a given network has been structured for a task the neural network is trained using a training dataset 1102. Various training frameworks 1104 have been developed to enable hardware acceleration of the training process. For example, the machine learning framework 604 of FIG. 6 may be configured as a training framework 1104. The training framework 1104 can hook into an untrained neural network 1106 and enable the untrained neural net to be trained using the parallel processing resources described herein to generate a trained neural network 1108.

To start the training process the initial weights may be chosen randomly or by pre-training using a deep belief network. The training cycle then be performed in either a supervised or unsupervised manner.

Supervised learning is a learning method in which training is performed as a mediated operation, such as when the training dataset 1102 includes input paired with the desired output for the input, or where the training dataset includes input having known output and the output of the neural network is manually graded. The network processes the inputs and compares the resulting outputs against a set of expected or desired outputs. Errors are then propagated back through the system. The training framework 1104 can adjust to adjust the weights that control the untrained neural network 1106. The training framework 1104 can provide tools to monitor how well the untrained neural network 1106 is converging towards a model suitable to generating correct answers based on known input data. The training process occurs repeatedly as the weights of the network are adjusted to refine the output generated by the neural network. The training process can continue until the neural network reaches a statistically desired accuracy associated with a trained neural network 1108. The trained neural network 1108 can then be deployed to implement any number of machine learning operations, for example, to generate a result 1114 based on inference or classification operations performed on new data 1112.

Unsupervised learning is a learning method in which the network attempts to train itself using unlabeled data. Thus, for unsupervised learning the training dataset 1102 will include input data without any associated output data. The untrained neural network 1106 can learn groupings within the unlabeled input and can determine how individual inputs are related to the overall dataset. Unsupervised training can be used to generate a self-organizing map, which is a type of trained neural network 1108 capable of performing operations useful in reducing the dimensionality of data. Unsupervised training can also be used to perform anomaly detection, which allows the identification of data points in an input dataset that deviate from the normal patterns of the data.

Variations on supervised and unsupervised training may also be employed. Semi-supervised learning is a technique in which in the training dataset 1102 includes a mix of labeled and unlabeled data of the same distribution. Incremental learning is a variant of supervised learning in which input data is continuously used to further train the model. Incremental learning enables the trained neural network 1108 to adapt to the new data 1112 without forgetting the knowledge instilled within the network during initial training.

Whether supervised or unsupervised, the training process for particularly deep neural networks may be too computationally intensive for a single compute node. Instead of using a single compute node, a distributed network of computational nodes can be used to accelerate the training process.

Figure 12:
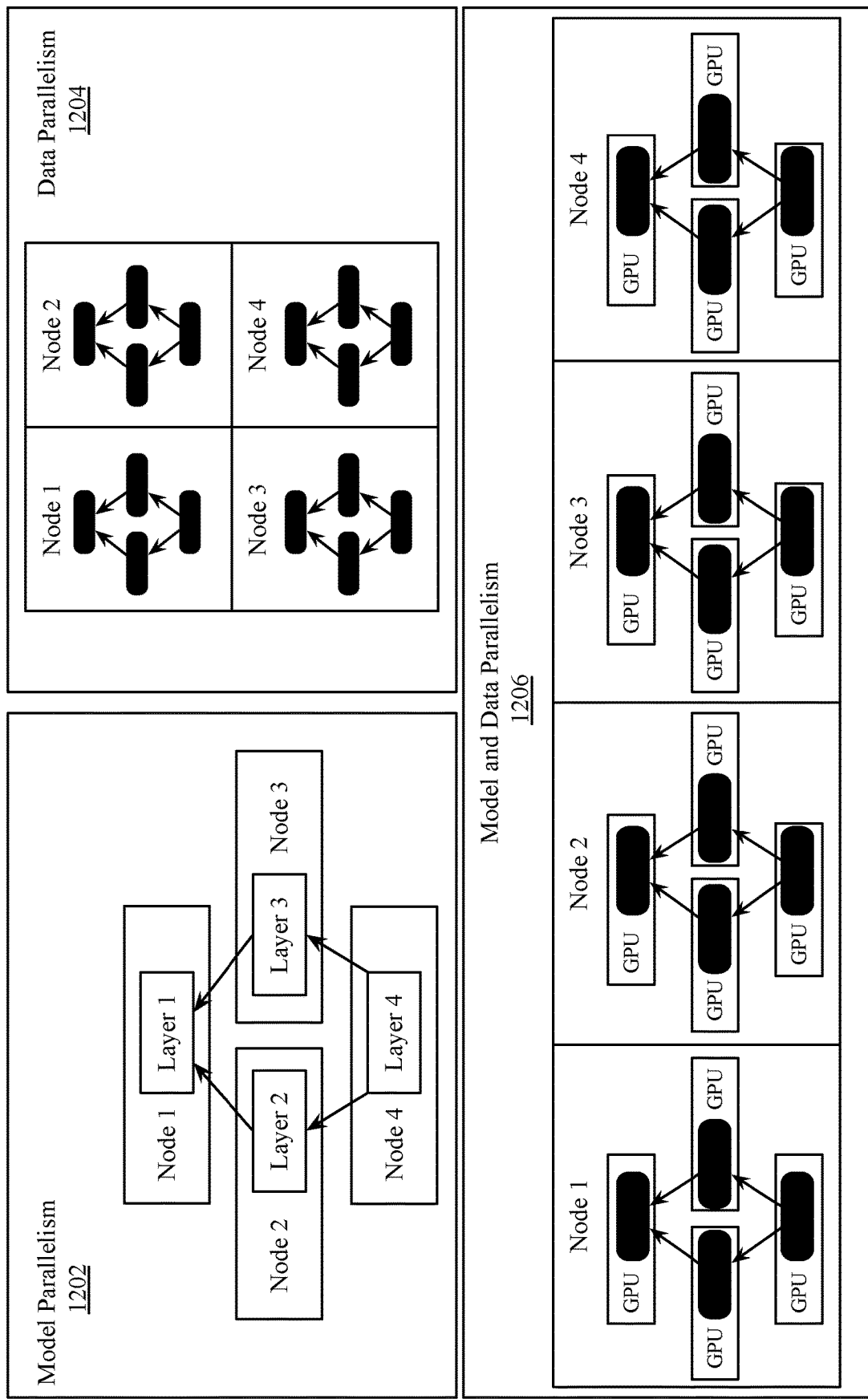
FIG. 12 is a block diagram illustrating distributed learning.

FIG. 12 is a block diagram illustrating distributed learning. Distributed learning is a training model that uses multiple distributed computing nodes to perform supervised or unsupervised training of a neural network. The distributed computational nodes can each include one or more host processors and one or more of the general-purpose processing nodes, such as the highly-parallel general-purpose graphics processing unit 700 as in FIG. 7. As illustrated, distributed learning can be performed model parallelism 1202, data parallelism 1204, or combined model and data parallelism 1206.

In model parallelism 1202, different computational nodes in a distributed system can perform training computations for different parts of a single network. For example, each layer of a neural network can be trained by a different processing node of the distributed system. The benefits of model parallelism include the ability to scale to particularly large models. Splitting the computations associated with different layers of the neural network enables the training of very large neural networks in which the weights of all layers would not fit into the memory of a single computational node. In some instances, model parallelism can be particularly useful in performing unsupervised training of large neural networks.

In data parallelism 1204, the different nodes of the distributed network have a complete instance of the model and each node receives a different portion of the data. The results from the different nodes are then combined. While different approaches to data parallelism are possible, data parallel training approaches all require a technique of combining results and synchronizing the model parameters between each node. Exemplary approaches to combining data include parameter averaging and update based data parallelism. Parameter averaging trains each node on a subset of the training data and sets the global parameters (e.g., weights, biases) to the average of the parameters from each node. Parameter averaging uses a central parameter server that maintains the parameter data. Update based data parallelism is similar to parameter averaging except that instead of transferring parameters from the nodes to the parameter server, the updates to the model are transferred. Additionally, update based data parallelism can be performed in a decentralized manner, where the updates are compressed and transferred between nodes.

Combined model and data parallelism 1206 can be implemented, for example, in a distributed system in which each computational node includes multiple GPUs. Each node can have a complete instance of the model with separate GPUs within each node are used to train different portions of the model.

Distributed training has increased overhead relative to training on a single machine. However, the parallel processors and GPGPUs described herein can each implement various techniques to reduce the overhead of distributed training, including techniques to enable high bandwidth GPU-to-GPU data transfer and accelerated remote data synchronization.

Exemplary Machine Learning Applications

Machine learning can be applied to solve a variety of technological problems, including but not limited to computer vision, autonomous driving and navigation, speech recognition, and language processing. Computer vision has traditionally been one of the most active research areas for machine learning applications. Applications of computer vision range from reproducing human visual abilities, such as recognizing faces, to creating new categories of visual abilities. For example, computer vision applications can be configured to recognize sound waves from the vibrations induced in objects visible in a video. Parallel processor accelerated machine learning enables computer vision applications to be trained using significantly larger training dataset than previously feasible and enables inferencing systems to be deployed using low power parallel processors.

Parallel processor accelerated machine learning has autonomous driving applications including lane and road sign recognition, obstacle avoidance, navigation, and driving control. Accelerated machine learning techniques can be used to train driving models based on datasets that define the appropriate responses to specific training input. The parallel processors described herein can enable rapid training of the increasingly complex neural networks used for autonomous driving solutions and enables the deployment of low power inferencing processors in a mobile platform suitable for integration into autonomous vehicles.

Parallel processor accelerated deep neural networks have enabled machine learning approaches to automatic speech recognition (ASR). ASR includes the creation of a function that computes the most probable linguistic sequence given an input acoustic sequence. Accelerated machine learning using deep neural networks have enabled the replacement of the hidden Markov models (HMMs) and Gaussian mixture models (GMMs) previously used for ASR.

Parallel processor accelerated machine learning can also be used to accelerate natural language processing. Automatic learning procedures can make use of statistical inference algorithms to produce models that are robust to erroneous or unfamiliar input. Exemplary natural language processor applications include automatic machine translation between human languages.

The parallel processing platforms used for machine learning can be divided into training platforms and deployment platforms. Training platforms are generally highly parallel and include optimizations to accelerate multi-GPU single node training and multi-node, multi-GPU training. Exemplary parallel processors suited for training include the highly-parallel general-purpose graphics processing unit 700 of FIG. 7 and the multi-GPU computing system 800 of FIG. 8. On the contrary, deployed machine learning platforms generally include lower power parallel processors suitable for use in products such as cameras, autonomous robots, and autonomous vehicles.

Figure 13:
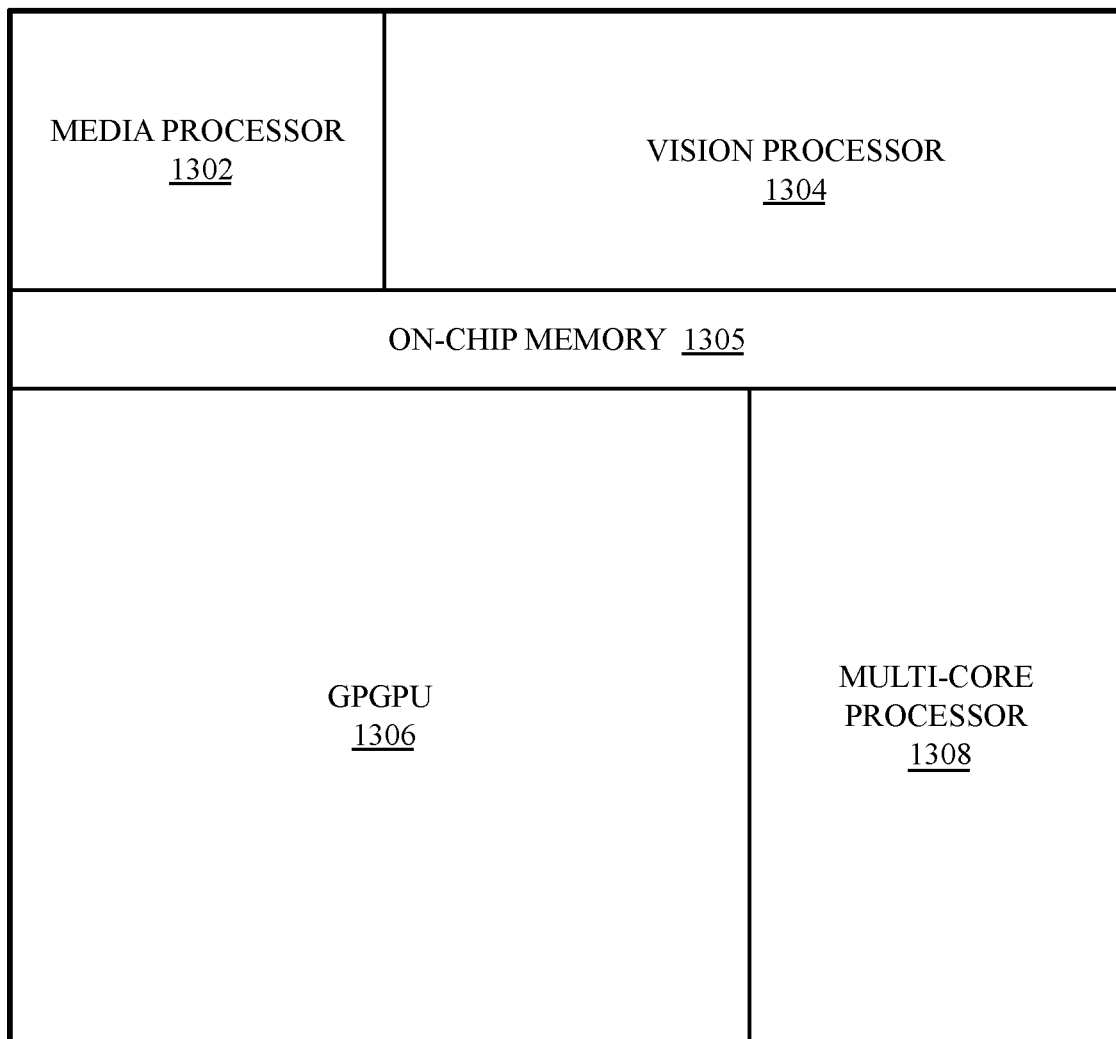
FIG. 13 illustrates an exemplary inferencing system on a chip (SOC) suitable for performing inferencing using a trained model.

FIG. 13 illustrates an exemplary inferencing system on a chip (SOC) 1300 suitable for performing inferencing using a trained model. The SOC 1300 can integrate processing components including a media processor 1302, a vision processor 1304, a GPGPU 1306 and a multi-core processor 1308. The SOC 1300 can additionally include on-chip memory 1305 that can enable a shared on-chip data pool that is accessible by each of the processing components. The processing components can be optimized for low power operation to enable deployment to a variety of machine learning platforms, including autonomous vehicles and autonomous robots. For example, one implementation of the SOC 1300 can be used as a portion of the main control system for an autonomous vehicle. Where the SOC 1300 is configured for use in autonomous vehicles the SOC is designed and configured for compliance with the relevant functional safety standards of the deployment jurisdiction.

During operation, the media processor 1302 and vision processor 1304 can work in concert to accelerate computer vision operations. The media processor 1302 can enable low latency decode of multiple high-resolution (e.g., 4K, 8K) video streams. The decoded video streams can be written to a buffer in the on-chip memory 1305. The vision processor 1304 can then parse the decoded video and perform preliminary processing operations on the frames of the decoded video in preparation of processing the frames using a trained image recognition model. For example, the vision processor 1304 can accelerate convolution operations for a CNN that is used to perform image recognition on the high-resolution video data, while back end model computations are performed by the GPGPU 1306.

The multi-core processor 1308 can include control logic to assist with sequencing and synchronization of data transfers and shared memory operations performed by the media processor 1302 and the vision processor 1304. The multi-core processor 1308 can also function as an application processor to execute software applications that can make use of the inferencing compute capability of the GPGPU 1306. For example, at least a portion of the navigation and driving logic can be implemented in software executing on the multi-core processor 1308. Such software can directly issue computational workloads to the GPGPU 1306 or the computational workloads can be issued to the multi-core processor 1308, which can offload at least a portion of those operations to the GPGPU 1306.

The GPGPU 1306 can include compute clusters such as a low power configuration of the compute clusters 706A-706H within the highly-parallel general-purpose graphics processing unit 700. The compute clusters within the GPGPU 1306 can support instruction that are specifically optimized to perform inferencing computations on a trained neural network. For example, the GPGPU 1306 can support instructions to perform low precision computations such as 8-bit and 4-bit integer vector operations.

Autonomous Vehicle Advanced Sensing and Response

Advanced vehicle systems can be coupled with machine learning techniques to enable semi-autonomous and autonomous driving within mainstream vehicles. To enhance the capabilities of autonomous vehicles, embodiments described herein provide multiple advanced sensing and compute functionality. One embodiment provides for autonomous post-collision response vehicle collisions. One embodiment enables assisted search capabilities using automobile sensing capabilities. One embodiment provides for techniques to minimize accident damage for autonomous vehicles via internal vehicle sensors. One embodiment enables inference data sharing across autonomous vehicles. The embodiments described herein can each make use one or more nearby vehicles for computations before, during, and after autonomous driving sessions.

Autonomous driving systems must perform a considerable amount of computation to, for example, plan routes, recognize and avoid pedestrians and obstacles, detect, and understand traffic lights, crosswalks, and signs, and determine motion of objects. These tasks are not only compute-intensive, but often must be performed under real-time constraints. Embodiments described herein provide techniques to enable an autonomous vehicle to make use of nearby vehicles within an autonomous vehicle network. Such techniques can be performed as a lower latency or higher reliability alternative to cloud-based compute techniques.

Vehicle to vehicle communication technology is available to enable vehicles to report information such as speed, position, and roadway incident to nearby vehicles over an ad-hoc wireless network. Embodiments described herein extend this communication capability to enable nearby vehicles to perform distributed computing operations to obtain faster or more reliable results than what would be possible with the compute resources within a single vehicle. In one embodiment, to perform particularly compute intense operations in the presence of a sufficiently fast wireless network, an autonomous vehicle can offload a subset of the compute operations to a cloud-based compute system. However, if a sufficiently fast wide area wireless network is unavailable or an urgent compute response is required, the vehicle can attempt to connect wirelessly with surrounding vehicles to temporarily establish a distribute compute network.

The Car-to-X consortium of automobile manufacturers has developed a vehicle communications standard that enables vehicles and fixed roadside devices to exchange information and warnings over ad-hoc wireless networks to improve driving safety. Embodiments described herein extend communication standards under Car-to-X to enable distributed functionality for autonomous vehicles having an established trust relationship.

In one embodiment, autonomous vehicles having a trust relationship can be configured to share compute resources when needed. A baseline level of compute capability is present in every autonomous vehicle. However, circumstances may arise in which a vehicle's autonomous driving system determines that computational resources may be required that exceed the current computational resources of the vehicle or the computational resources of the vehicle cannot produce the desired results within a reasonable period. These circumstances may arise, for example, where an autonomous vehicle can generally rely on cloud-based compute resources but those resources are temporarily unavailable due to poor mobile wireless network reception. The techniques for computation offload described herein builds on existing technology for car-to-car communication. The security and privacy of those communication techniques are addressed at the underlying communication layer. Thus, the existence of a secure wireless communication protocol and a method for determining a trust status for a neighboring is assumed throughout.

In one embodiment, autonomous vehicles that are connected to a local or cloud-based network can be configured to use external sensors to assist with distributed search functions. For example, network connected vehicles can be configured to receive data from a child abduction alert system or a similar emergency broadcast system. The network connected vehicles can then use onboard cameras and sensors used for autonomous driving to passively search for identified vehicles.

In one embodiment inference data generated by one network connected vehicle can be shared with other nearby connected vehicles. For example, a lead vehicle in a group of multiple autonomous vehicles can share inference determinations with other vehicles that may not have access to the sensor field of view of the lead vehicle. If the lead vehicle determines that an obstacle is present or a dangerous event is has occurred, the vehicle can share such determinations with nearby connected vehicles.

While autonomous vehicles can contain array of sensors and navigational logic to avoid collisions, under some circumstances collisions between autonomous vehicles may be unavoidable. One embodiment described herein can leverage external and internal sensors on an autonomous vehicle to attempt to minimize harm to passengers within the vehicle. In one embodiment, connected vehicles can share internal sensor data and attempt to perform multi-lateral harm minimization once one or more of the vehicles determines that an unavoidable collision is imminent.

In one embodiment, autonomous vehicles that have been involved in a collision can be configured to perform an autonomous response to one or more post collision scenarios. The post-collision response can be configured based on internal and external sensor data that is gathered before, during, and after the collision. A damage and injury assessment can be performed based on the gathered sensor data and a machine learning model can be trained to select from a variety of possible post collision responses.

Use of Multiple Vehicles for Computation and Sensing for Autonomous Driving

Figure 14:
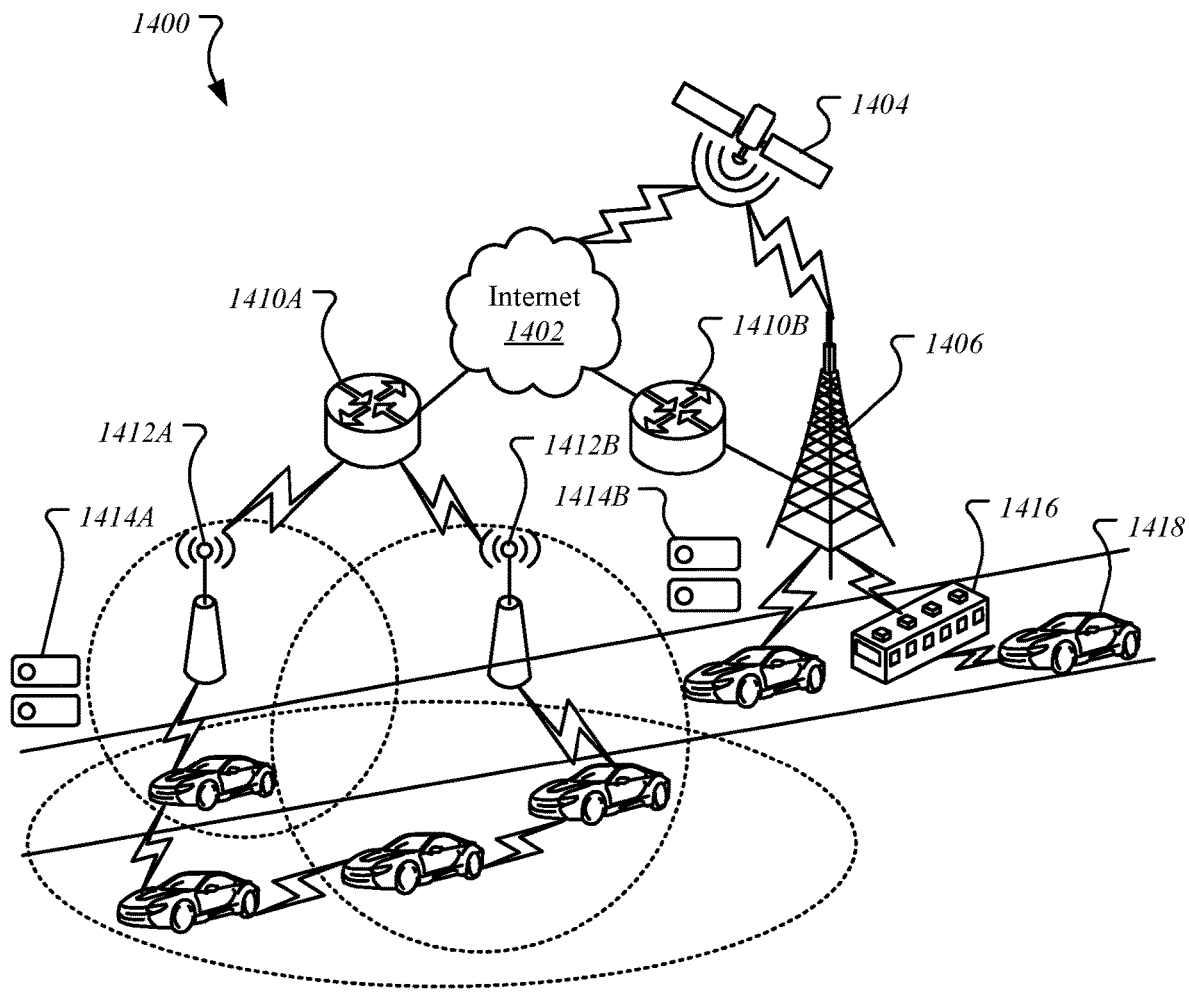
FIG. 14 illustrates a vehicle communications network usable by embodiments described herein.

FIG. 14 illustrates a vehicle communications network 1400 usable by embodiments described herein. Multiple autonomous vehicles, including mass transit vehicles 1416 and passenger vehicles 1418, can connect to a network (e.g., Internet 1402) via multiple access points, including a satellite based access 1404 and/or a mobile wireless radio base station 1406. The mass transit vehicles 1416 and passenger vehicles 1418 each include wireless network devices that are configurable to connect to wide area networks as well as local area networks within range of the vehicles. Access may also be available be one or more roadside wireless access points 1412A-1412B. The roadside wireless access points 1412A-1412B and the mobile wireless radio base station 1406 can connect with access routers 1410A-1410B that enable access to the Internet 1402 or another wide area network. Additionally vehicle-to-Infrastructure (V2I) communication may be available. The V2I system includes multiple stationary roadside compute nodes 1414A-1414B connected to network and power grid infrastructure. The V2I system can participate in compute offload in a similar manner as nearby autonomous vehicles.

Embodiments described herein provide benefits over and beyond conventional vehicle-to-vehicle and compute offload systems by leveraging the ability of autonomous vehicles to coordinate autonomous driving and navigation functionality. For example, where vehicle-to-vehicle compute offload is desired, part of the process of selecting among possible remote compute client is the ability for autonomous vehicles to coordinate navigation and destination data. When multiple autonomous vehicles share a common route, the compute management logic associated with the vehicles can coordinate and determine the amount of time that the vehicles will be within wireless communication range. Furthermore vehicles having a trusted compute arrangement can autonomously maneuver into a formation that better enables wireless data sharing, as long as such maneuvering does not cause a deviation from previously determined pathing and navigation routes.

Figure 15:
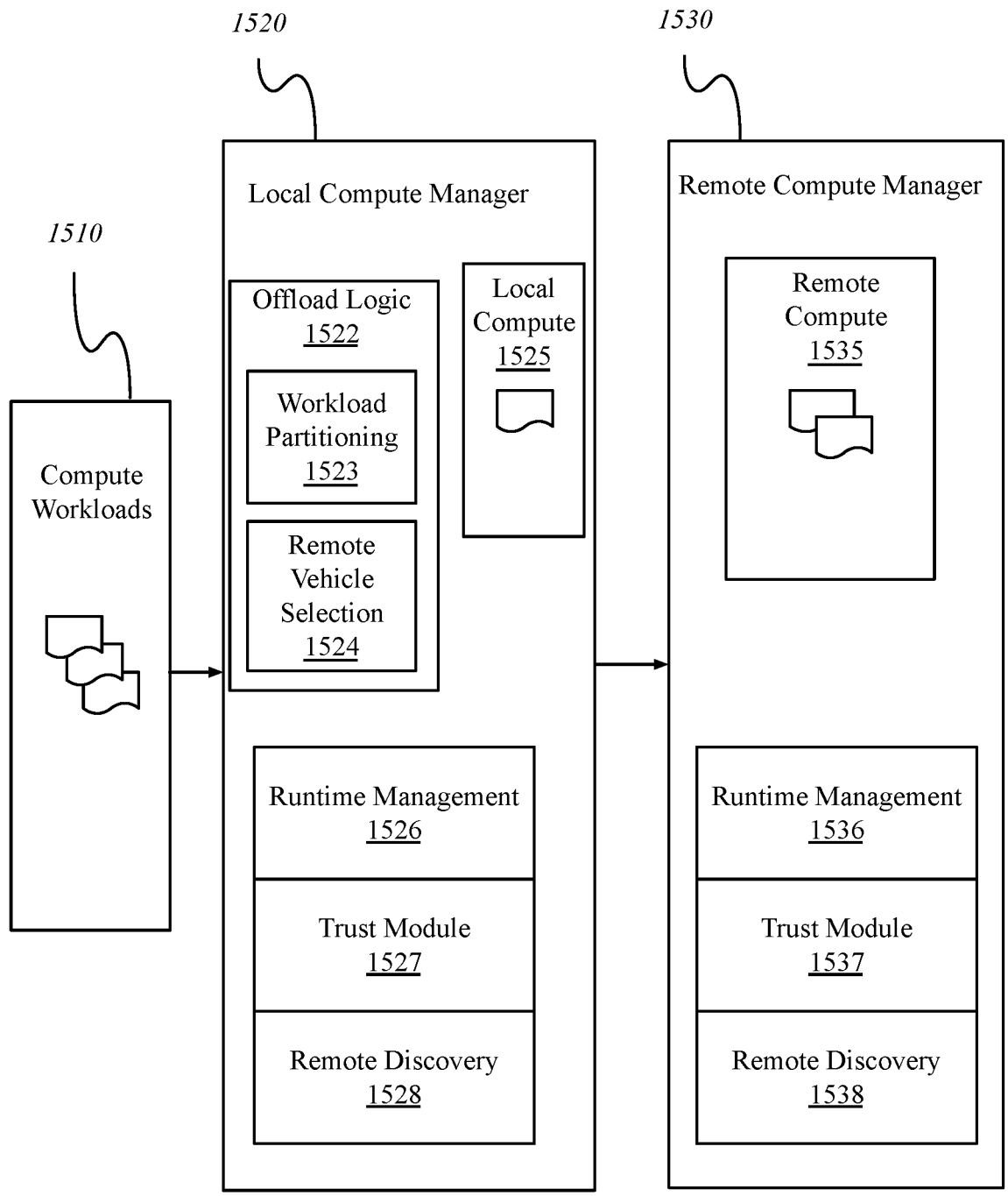
FIG. 15 illustrates a distributed compute management system, according to an embodiment.

FIG. 15 illustrates a distributed compute management system 1500, according to an embodiment. In one embodiment a set of compute workloads 1510 for an autonomous vehicle can be processed in part by a local compute manager 1520 and in part by a remote compute manager 1530. The local compute manager 1520 is a compute manager that executes on a compute infrastructure of an autonomous vehicle, for example, via the compute system that performs inferencing operations for the machine learning model that enables autonomous driving and navigation. The compute units that execute the compute workload described herein can be any of the compute clusters, compute units, compute blocks, streaming multiprocessors, graphics multiprocessors, or general-purpose processing logic as described herein. The local compute manager 1520 can facilitate local compute operations 1525 for a portion of the compute workloads 1510, while distributing a portion of the compute workloads 1510 to a remote compute system 1535 managed by a remote compute manager 1530 of a nearby trusted autonomous vehicle.

The local compute manager 1520 and the remote compute manager 1530 can include a common or compatible compute infrastructures. The local compute manager 1520 includes a runtime management unit 1526, a trust module 1527, and a remote discovery unit 1528. The remote compute manager 1530 includes modules that are similar to or compatible with the modules of the local compute manager, including a runtime management unit 1526, a trust module 1537, a remote discovery unit 1538, or equivalent units. The runtime management units 1526, 1536 track executing compute workloads 1510 and are responsible for loading and offloading compute workloads onto associated local or remote compute units. The trust modules 1527, 1537 maintain identity tokens and certificates that are used to verify the authenticity of the compute environments of the local and remote autonomous vehicles. The trust module 1527 can also include keys or certificates that are used to sign or encrypt secure data transmitted between the local compute manager 1520 and the remote compute manager 1530. The remote discovery units 1528, 1538 are used to discover and locate autonomous vehicles within wireless range that can participate in trusted compute sharing. The discovery tasks include determining which autonomous vehicles can accept offload of compute workloads and determining the set of autonomous vehicles from which compute workloads will be accepted.

The local compute manager 1520 can execute offload logic 1522 that includes a workload partitioning unit 1523 and a remote vehicle selection unit 1524. The execute offload logic 1522 is configured to offload any of the compute workloads 1510 that are available for offloading to remote compute resources in response to an indication that the number of compute workloads exceeds the local compute capacity. The workload partitioning unit 1523 can examine the compute workloads 1510 to determine if any of the workloads are dependent upon the output of any of the other workloads within the compute workloads 1510. Workloads having dependencies can be scheduled as a unit for local or remote execution. The remote vehicle selection unit 1524 is used to determine which of one or more trusted autonomous vehicles that are within wireless network range have available compute resources and whether the latency to those vehicles is acceptable for the compute workloads to be scheduled. The remote vehicle selection unit 1524 can receive periodic updates from the remote discovery unit 1528 and, based on various criteria, can select one or more available remote vehicles to offload compute workloads. In one embodiment a determination of acceptable latency can be performed by measuring the communication latency to local autonomous vehicles determining whether the latency is below an objective threshold that is selected based on the type of computational offload to be performed. For example, latency sensitive compute operations such as computations based on real-time sensory data will have a lower latency threshold relative to compute operations that are less latency sensitive, such as speculatively performing alternate route calculations based on updated traffic information.

The remote vehicle selection unit 1524 can use one or more of multiple vehicle selection techniques to select a remote vehicle to which compute workloads are to be offloaded. In various embodiments, remote vehicles can be selected based on a random selection strategy, a compute capacity based selection strategy, a distance-based selection strategy, or a multi-element selection strategy that makes use multiple selection strategies. The random selection strategy selects a vehicle node randomly then calculates the number of compute workloads that can be performed. If the selected node will be able to complete one or more workloads, then one or more workloads will be offloaded to the node. If the randomly selected node cannot perform at least one workload, then a different random node will be evaluated. A similar strategy can be performed for the compute capacity or distance-based selection strategy, excepting that initial and subsequent selection of neighboring vehicles is performed based on the vehicles that have the greatest available compute capacity or that are nearest in distance to the local autonomous vehicle. The multi-element selection strategy selects a vehicle node for offload by considering multiple parameters of the surrogate vehicle nodes.

In addition to the selection techniques described above, one embodiment described herein enables a navigation-based selection strategy. The navigation-based selection strategy considers the set of neighboring trusted autonomous vehicles and ranks the set of vehicles based on a common navigation destination or common navigation route. Neighboring autonomous vehicles having a trust relationship can securely exchange navigation route and destination data. Should one or more neighboring autonomous vehicles share a common destination or will be travelling along a common route for a period, the autonomous vehicles can establish a distributed compute relationship and mutually offload compute workloads for the duration of the common route. Navigation-based selection strategy adds an additional element of predictability to the relative motions of the autonomous vehicles within the trusted network, such that each local and remote vehicle can estimate when other vehicles will enter and exit local wireless communication range.

Connected autonomous vehicles capable of connecting to cloud-based datacenters have access to a vast array of compute capability at the expense of some degree of latency due to the broadband wireless or satellite-based communication network over which the connected autonomous vehicle communicates with the datacenter. For workloads that have high computational demand, connected autonomous vehicles can offload a portion of those workloads to the datacenter via the communications network. However, circumstances may arise in which an autonomous vehicle cannot access a cloud-based datacenter. Under such circumstances the ability to establish a trusted distributed compute connection to neighboring autonomous vehicles may be particularly optimal.

Figure 16:
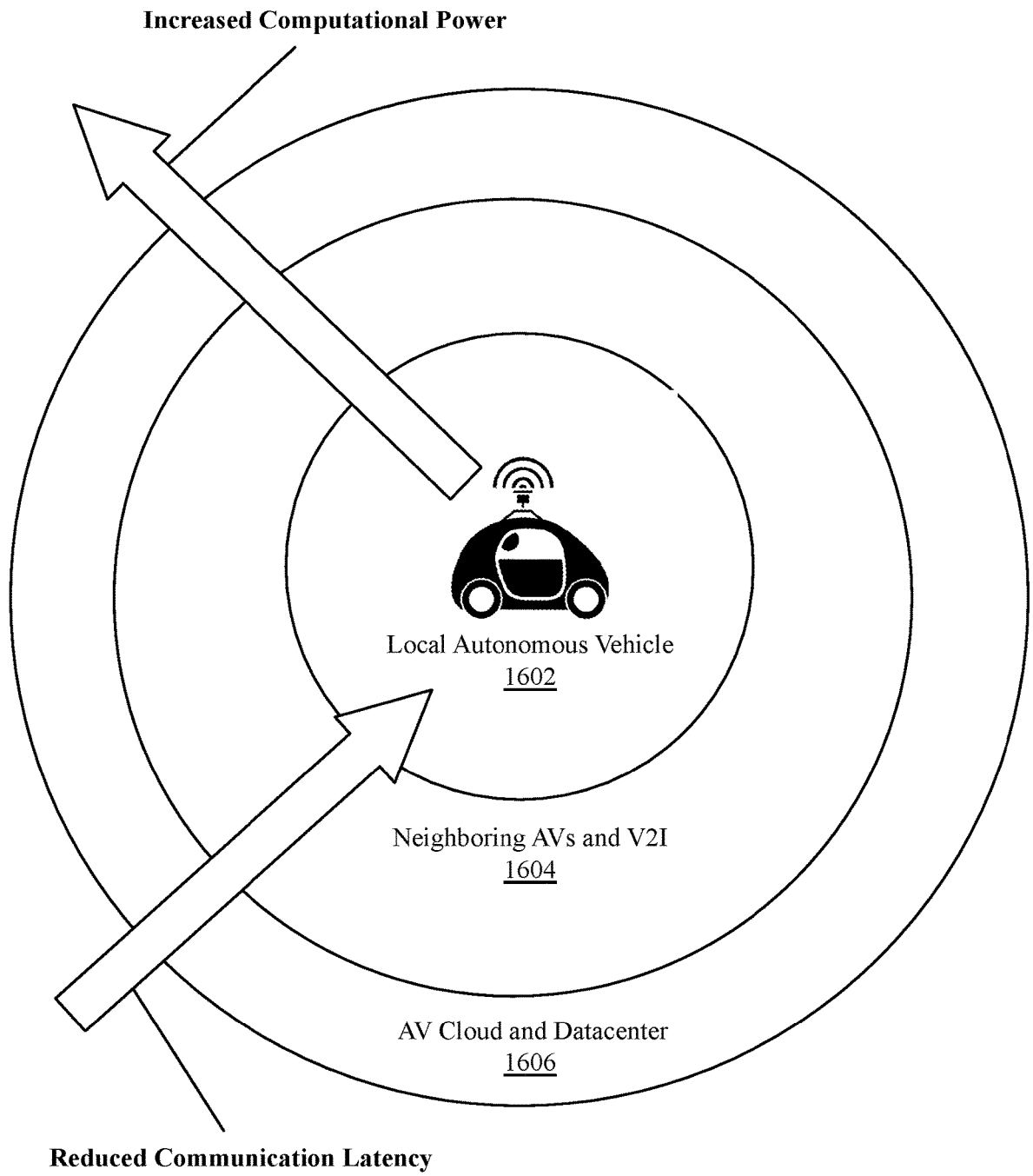
FIG. 16 illustrates a relationship between computational power and communication latency in a local autonomous vehicle as described herein.

FIG. 16 illustrates a relationship 1600 between computational power and communication latency in a local autonomous vehicle 1602 as described herein. In one embodiment the local autonomous vehicle 1602 can connect to an autonomous vehicle cloud and datacenter 1606 via a wide area communications network, such as a mobile wireless or satellite based communication network. Such connections enable the local autonomous vehicle 1602 to access increased computational power at the expense of increased communication latency. Alternatively, the local autonomous vehicle 1602 can access compute resources of neighboring autonomous vehicles and roadside V2I compute nodes at reduced latency, although those compute resources will have reduced computational power relative to the autonomous vehicle cloud and datacenter 1606.

In one embodiment the computation offload techniques are primarily optimized for use in situations in which on-vehicle computation resources are insufficient and cloud communication latency is too great. The decision to offload computation to either to neighboring trusted vehicles or to the cloud considers numerous factors including the amount of computation to be performed and the communication latencies from the local autonomous vehicle 1602 to neighboring AVs and V2I nodes 1604 or to an autonomous vehicle cloud and datacenter 1606.

Communication with neighboring AVs and V2I nodes 1604 may use emerging technologies such as Dedicated Short Range Communications (DSRC), which enables very high data transmission at short to medium range. DSRC can be used for data communication in the 5.725 GHz to 5.875 GHz Industrial, Scientific and Medical (ISM) radio band. DSRC systems consist of road side units and on-board units with transceivers and transponders. The on-board units are located within autonomous vehicles, robots, and/or other machines that can communicate via a DSRC network.

Using technologies such as DSRC, car-to-car and V2I communication latency may often provide higher bandwidth and/or lower latency communications relative to the communication link with a cloud datacenter, particularly under conditions where cloud connectivity is poor. For instance, while heavy rain may stop or slow a satellite Internet connection, DSRC is unaffected by extreme weather conditions. Furthermore, such conditions may be those in which the ability to offload computation is most helpful, as extreme weather can make autonomous driving tasks more challenging.

Figure 17:
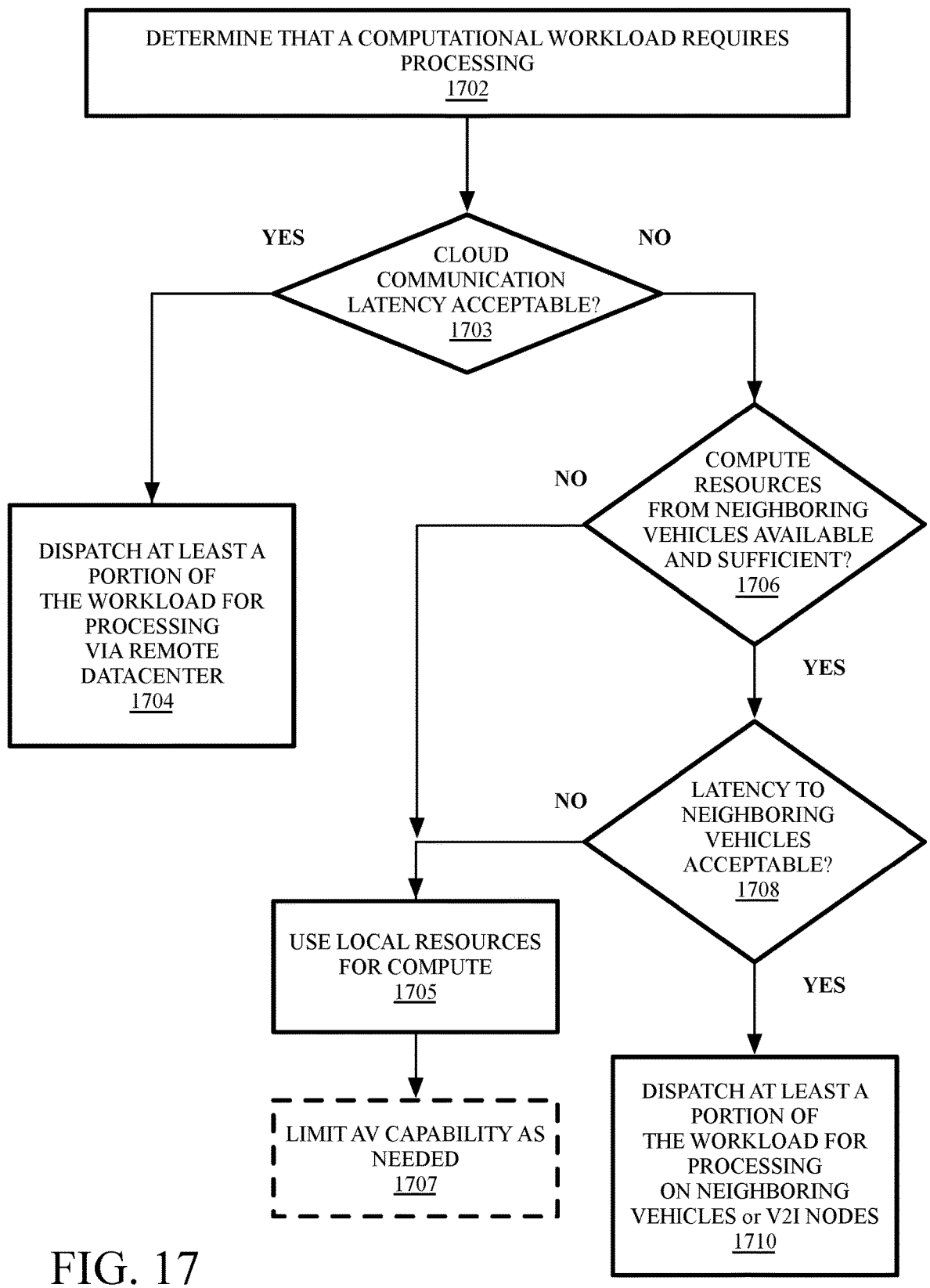
FIG. 17 is a flow diagram illustrating autonomous vehicle compute offload logic, according to an embodiment.

FIG. 17 is a flow diagram illustrating autonomous vehicle compute offload logic 1700, according to an embodiment. The autonomous vehicle compute offload logic 1700 is be enabled, in one embodiment, by offload logic 1522 as in FIG. 15. In one embodiment the autonomous vehicle compute offload logic 1700 can determine that a computational workload is to be processed as shown at block 1702. The autonomous vehicle compute offload logic 1700 can then determine if the current cloud communication latency is acceptable or within an acceptable range, as shown at block 1703. When the current cloud communication latency is acceptable, the autonomous vehicle offload logic can dispatch at least a portion of the workload for processing via a remote datacenter, as shown at block 1704. However, if cloud communication latency is not acceptable at block 1703, the autonomous vehicle compute offload logic 1700 can determine if compute resources from neighboring vehicles available and sufficient at block 1706. If compute resources from neighboring vehicles are not sufficient, the autonomous vehicle compute offload logic 1700 can use local resources to perform the compute operations, as shown at block 1705. If compute resources from neighboring vehicles are available and sufficient at block 1706, but the communication latency to those vehicles is unacceptable at block 1708, the autonomous vehicle compute offload logic 1700 can use local resources for compute at block 1705. If communication latency is acceptable at block 1708, the autonomous vehicle compute offload logic 1700 can dispatch at least a portion of the workload for processing on neighboring autonomous vehicles or V2I nodes, as shown at block 1710. If only local resources are used for compute at block 1705, some autonomous vehicle capability may be limited or reduced, as shown at block 1707. For example, a maximum speed at which the autonomous vehicle can travel in fully autonomous mode may be reduced. Alternatively, the speed at which an autonomous vehicle can select alternative routes based on dynamic traffic conditions may be reduced.

In one embodiment, autonomous vehicles that are connected to a local or cloud-based network can be configured to use external sensors to assist with distributed search functions. For example, network connected vehicles can be configured to receive data from a child abduction alert system or a similar emergency broadcast system. The network connected vehicles can then use onboard cameras and sensors used for autonomous driving to passively search for identified vehicles.

Figure 18:
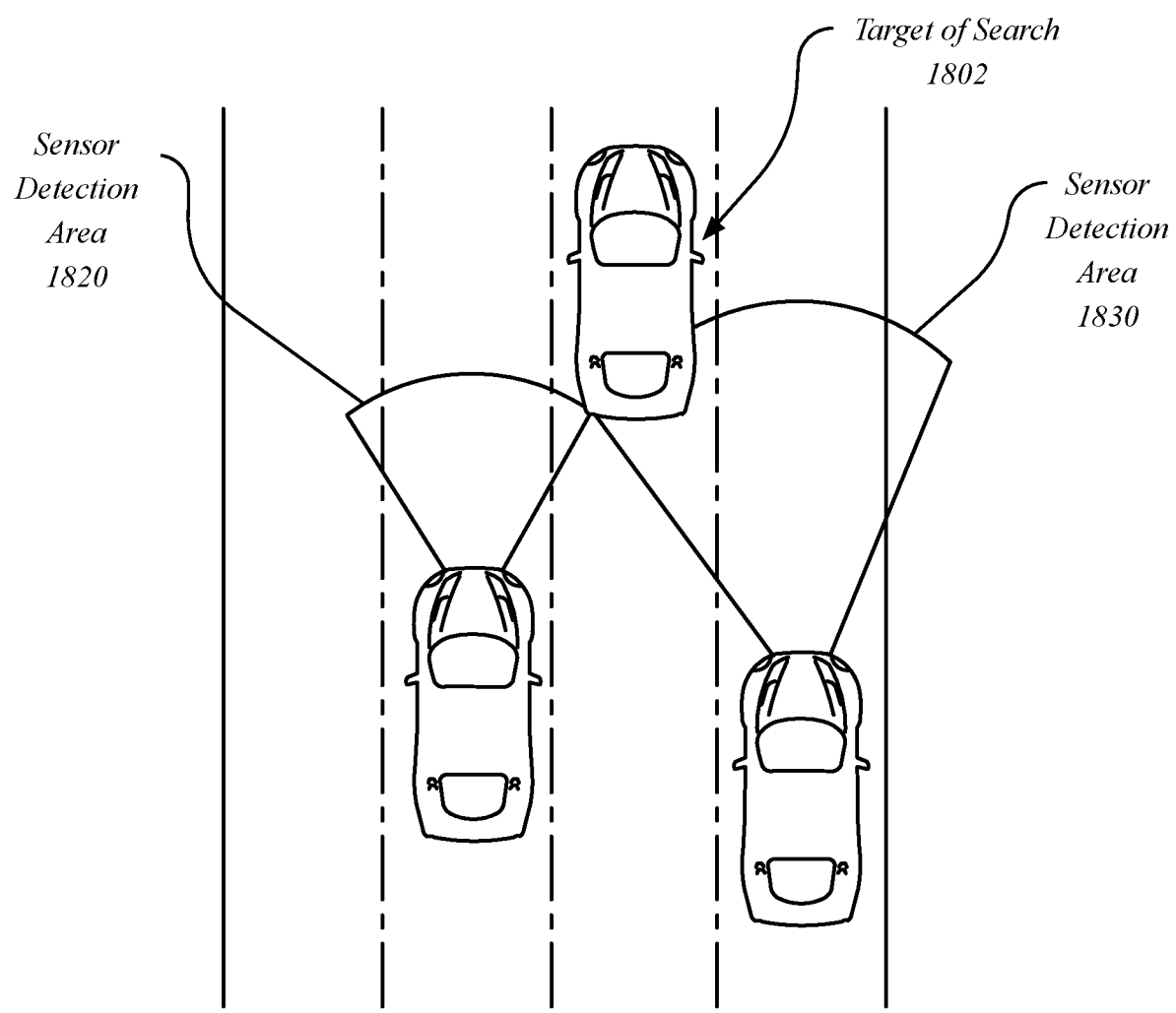
FIG. 18 illustrates use of autonomous vehicle sensors to assist in a distributed search.

FIG. 18 illustrates use of autonomous vehicle sensors to assist in a distributed search. In one embodiment, one or more autonomous vehicles can receive a descriptor or via a cloud-based, V2I, and/or neighboring autonomous vehicle network. The descriptor identifies a target of search 1802. Autonomous vehicles that receive the descriptor can enable a background search work item that passively analyzes sensor data received via external sensors used to enable autonomous driving tasks (e.g., cameras, Radar, Lidar, etc.). Any object that tends the sensor detection area 1820, 1830 of autonomous vehicles that are executing the search task can be classified to determine if the object matches the details provided for the target of search 1802. For example, a search descriptor can indicate that the target of search has a specific license plate type or license plate number. Alternatively, the descriptor for the target of search 1802 can be a more general description of a vehicle, such as a vehicle make, model, and color. Should a vehicle identified by the target of search descriptor pass into the sensor detection area 1820, 1830 of a connected autonomous vehicle, the vehicle can send information such as camera and sensor data back to the originator of the search. In one embodiment, a more general search can be enabled for the target of search 1802. For example, the autonomous vehicles can be configured to search for vehicles that are exhibiting aberrant driving behavior, such as repeated unsafe lane changes or rapid changes in speed. This data can be transmitted to the relevant safety authorities for the region in which the autonomous vehicles ae travelling. This data can also be transmitted to nearby vehicles that do not have the target of search 1802 within the relevant sensor detection area for the vehicle.

Figure 19:
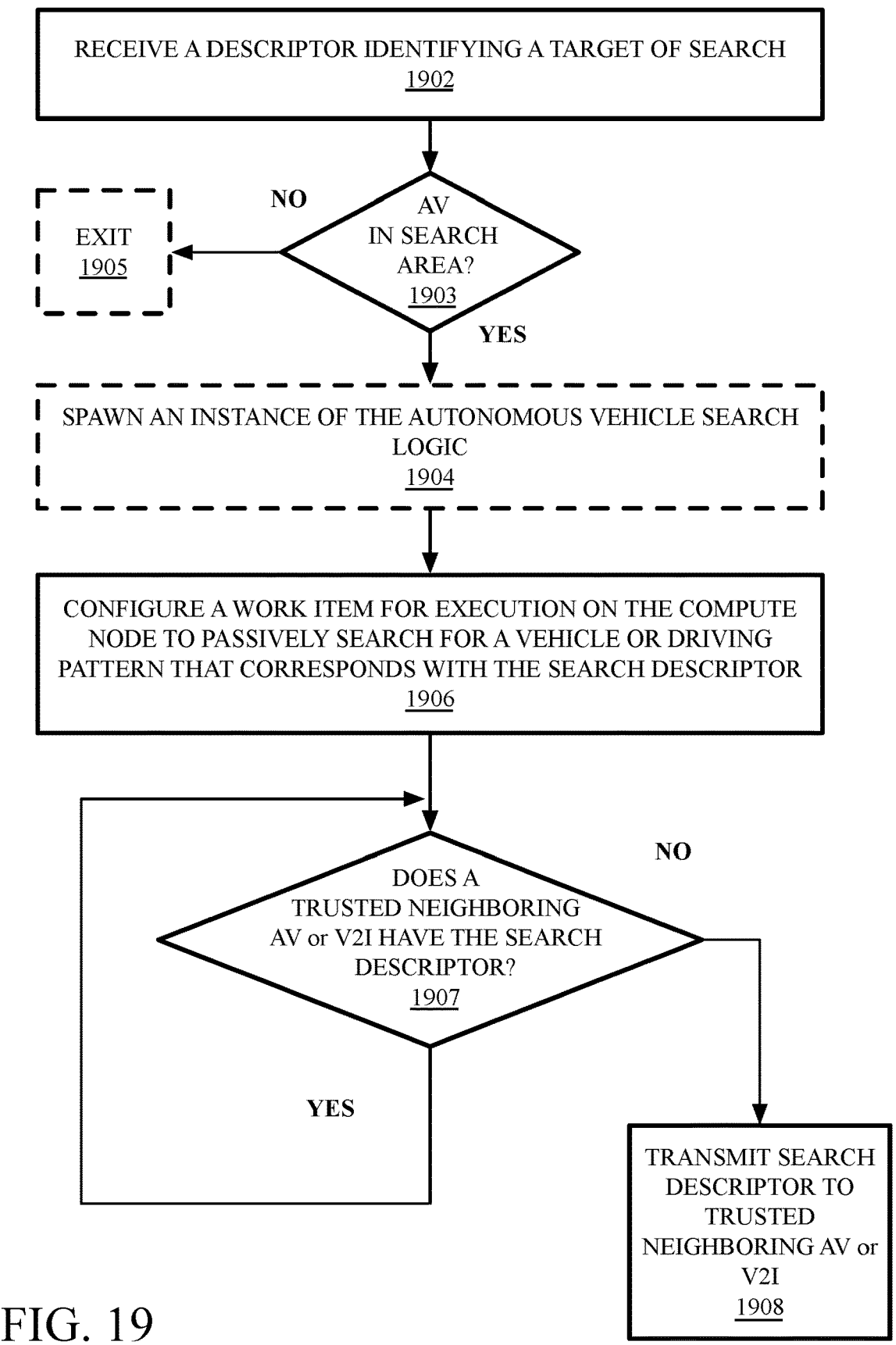
FIG. 19 illustrates distributed autonomous vehicle search logic, according to an embodiment.

FIG. 19 illustrates distributed autonomous vehicle search logic 1900, according to an embodiment. In one embodiment the autonomous vehicle search logic 1900 can execute as one of the compute workloads 1510 on the compute resources of a local autonomous vehicle, as shown in FIG. 15. The search data and/or search workload can also be distributed to neighboring autonomous vehicles over a short range wireless network.

In one embodiment a compute node on an autonomous vehicle can receive a descriptor identifying a target of search, as shown at block 1902. The descriptor can identify one or more of a make, model, color, or a specific numerical identifier associated with the vehicle. The specific numerical identifier of the vehicle can include but is not limited to a license plate number or a different identifier number, such as a public service vehicle identification number, a public transit vehicle number, or a private transit vehicle identification number. In one embodiment the descriptor can identify a behavior pattern instead of a specific vehicle. For example, the search descriptor can specify a general search for erratic driving behavior. In one embodiment the descriptor is received from a connected vehicle network. One embodiment is also configured to receive search descriptors from an emergency broadcast system such as the wireless emergency alert system.

In one embodiment the descriptor can identify a search area in which the target of the search is expected to be located. In such embodiment the compute node can reference location data to determine if the autonomous vehicle is within the defined search area at block 1903. If the autonomous vehicle is not in the search area, the compute node can simply exit at block 1905. Alternatively, search related logic of the compute node can enter a sleep state until a new descriptor is received at block 1902.

In one embodiment, if the autonomous vehicle is in the identified search area the compute node can spawn an instance of the autonomous vehicle search logic 1900 in response to receipt of the descriptor, as shown at block 1904. However, in some embodiments the autonomous vehicle search logic 1900 is spawned and initialized during compute node startup and enter a sleep state until a descriptor is received. The autonomous vehicle search logic 1900 can then configure a work item for execution on the compute node to passively search for a vehicle or driving pattern that corresponds with the search descriptor, as shown at 1906. The configured work item can signal the autonomous vehicle search logic 1900 if a search candidate matching the search descriptor is located.

In one embodiment the autonomous vehicle search logic 1900 can propagate the search data to any trusted neighboring autonomous vehicles or vehicle to infrastructure nodes that do not have the search descriptor. If a trusted autonomous vehicle or V2I node enters local wireless range, the autonomous vehicle search logic 1900 can determine if a neighboring autonomous vehicle or V2I node does not have the search descriptor data at block 1907. The autonomous vehicle search logic 1900 can then transmit a search descriptor to the trusted neighboring autonomous vehicle or V2I node at block 1908 of the vehicle or node does not have the search descriptor data.

In one embodiment connected vehicles described herein can generally share inference data with neighboring connected vehicles within certain physical proximity. Inference sharing can be performed via a trusted short range wireless radio connection as described herein, including but not limited to a DSRC connection. Inference sharing can also be extended beyond autonomous vehicles to autonomous drones, autonomous transport robots, or any other machine capable of autonomous navigation via a machine learning model. In one embodiment, inference determinations performed based on real-time input is securely transmitted to neighboring autonomous vehicles as information notices. Autonomous vehicles and/or machines within local wireless range can use the transmitted inferencing information to augment local inferencing determinations based on local sensors. Such information sharing can allow vehicles or machines to observe or have notice of surrounding hazards or conditions that cannot be directly detected by local sensors on those vehicles or machines.

Figure 20:
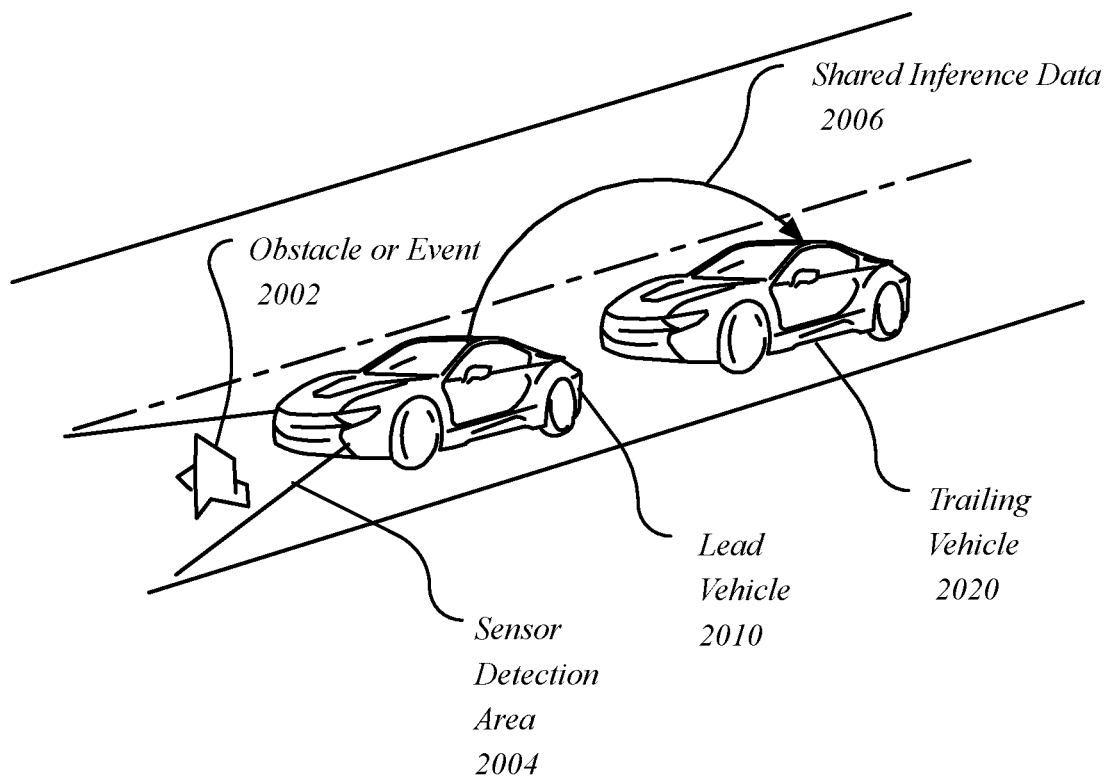
FIG. 20 illustrates inference data sharing between autonomous vehicles, according to an embodiment.

FIG. 20 illustrates inference data sharing between autonomous vehicles, according to an embodiment. In one embodiment a set of multiple autonomous vehicles can include a lead vehicle 2010 and a trailing vehicle 2020, although the set of vehicles can include more than two vehicles. One embodiment enables the set of multiple autonomous vehicles to connect via a secure wireless communication system such as a Wi-Fi or DSRC connection. The lead vehicle 2010 has a sensor detection area 2004 that includes areas that may not be detectible by the trailing vehicle 2020. When the inferencing module of the lead vehicle 2010 detects that an obstacle or dangerous event 2002 is present along a common path of the set of multiple autonomous vehicles, the inferencing determination can be shared with all vehicles in the set of multiple autonomous vehicles, including the trailing vehicle 2020.

Figure 21:
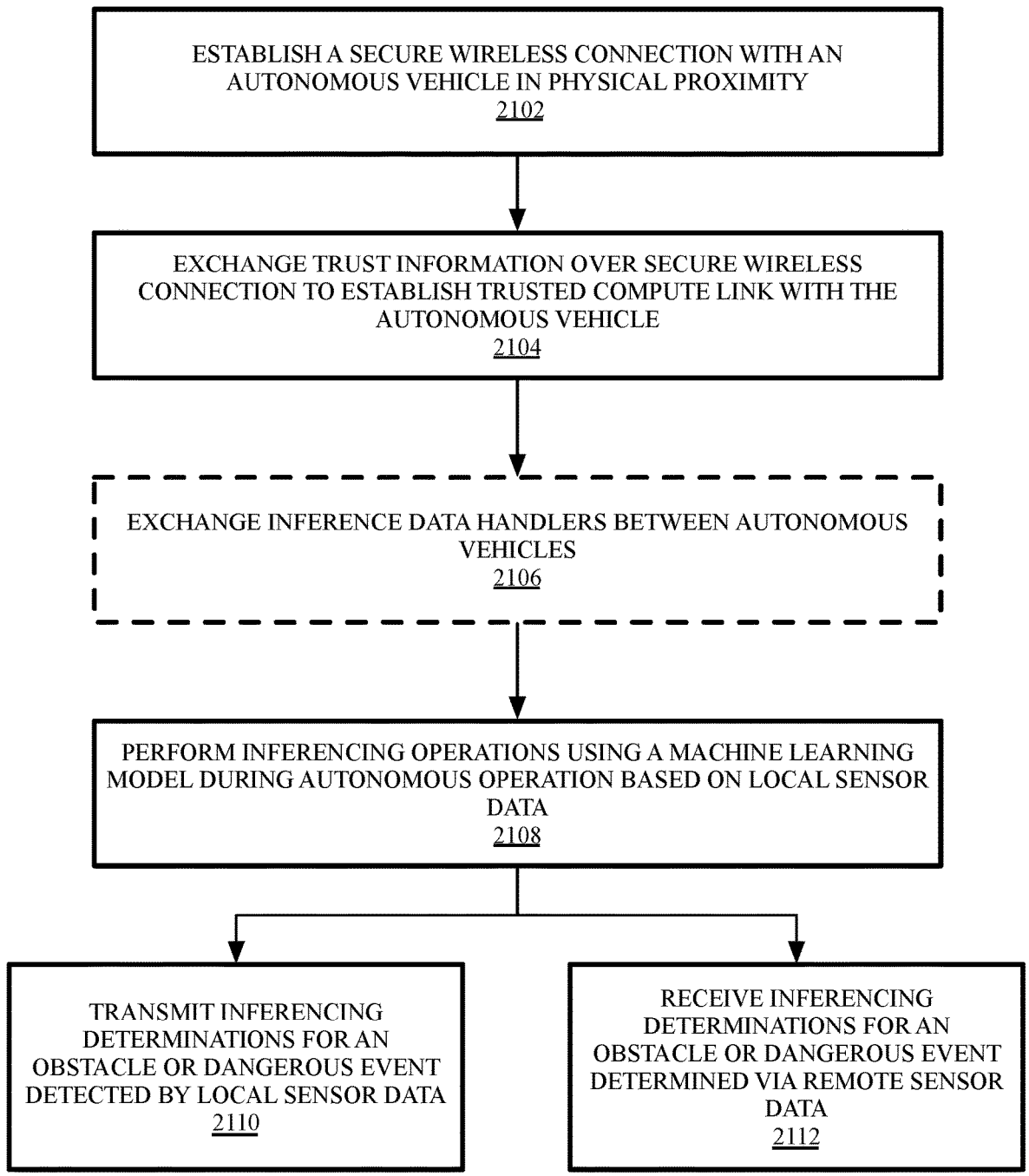
FIG. 21 is a flow diagram that illustrates inference sharing logic, according to an embodiment.

FIG. 21 is a flow diagram that illustrates inference sharing logic 2100, according to an embodiment. In one embodiment the inference sharing logic 2100 can be one of the compute workloads 1510 executed on a local compute manager 1520, as in FIG. 15, and can transmit inferencing information to compute workloads managed by a remote compute manager 1530. For example and in one embodiment, inference sharing is performed between autonomous vehicles by a mutual offload of compute workloads that are configured to exchange inferencing data that is determined by respective local compute models used for autonomous driving.

In one embodiment the inference sharing logic 2100 can establish a secure wireless connection with an autonomous vehicle in physical proximity, as shown at block 2102. The inference sharing logic 2100 can then exchange trust information over secure wireless connection to establish trusted compute link with the autonomous vehicle, as shown at block 2104. The trust information can be identity tokens and certificates that are used to verify the authenticity of the compute environments of the local and remote autonomous vehicle and can be maintained by a trust module within each vehicle (e.g., trust module 1527 and trust module 1537 as in FIG. 15). The trust information can enable the vehicles to establish a trusted distributed compute environment to enable data and workloads to be transferred between the compute environments of the vehicles. In one embodiment, after establishing the trusted compute link within autonomous vehicles the vehicles, the inference sharing logic 2100 can exchange inference data handlers between autonomous vehicles, as shown at block 2106. Exchanging inference data handlers can facilitate any data precision or format translations that may be required during the exchange of inferencing information, for example, if the data models used by the various vehicles are not strictly compatible. Exchanging inference data handlers between autonomous vehicles can be performed in a manner similar to offloading a compute task between the various vehicles. However, in one embodiment inferencing data exchange may be performed without requiring an exchange of inference data handlers.

The inference sharing logic 2100 can then continue to perform general inferencing operations using a machine learning model during autonomous operations based on local sensor data, as shown at block 2108. In parallel, the inference sharing logic 2100 can then transmit inferencing determinations for an obstacle or dangerous event detected by local sensor data at block 2110 and/or receive inferencing determinations for an obstacle or dangerous event determined via remote sensor data at block 2112.

Minimizing Autonomous Vehicle Accident Damage via Internal Sensors

Autonomous vehicles, at least during autonomous operation, have full situational awareness of the vehicles surrounding to the extent that that local or remote sensors can see or otherwise perceive the environment of the autonomous vehicle and the position, speed, acceleration, and orientation of other nearby vehicles. In conventional autonomous vehicles that capability is used to autonomously navigate between locations and to avoid collisions during the navigation. However, if a scenario arises in which a machine learning model within an autonomous vehicle determines that a collision cannot be avoided, the vehicle can autonomously maneuver to minimize the amount of human damage (e.g., injury) that will result from the collision. If the autonomous vehicle determines that a collision is unavoidable, the vehicle can, within the allowed pre-collision timeframe, adjust the position and orientation of the vehicle to reduce the amount of force that will be applied to passengers. For example and in one embodiment, should the autonomous vehicle determine that a head-on collision is unavoidable, the vehicle can perform last minute maneuvers to perform harm minimization by adjusting the angle at which the collision will occur. In one embodiment the vehicle can autonomously perform one or more pre-collision activities, such as pre-inflating one or more airbags within the passenger cabin of the vehicle, preparing one or more damage control mechanisms within the frame of the vehicle, and/or pre-inflating one or more external airbags of the autonomous vehicle. In one embodiment the vehicle can leverage internal sensors to determine the position and orientation of vehicle occupants. With knowledge of the position and orientation of vehicle occupants, the autonomous vehicle can determine an ideal impact area for a collision that minimized potential harm to vehicle occupants.

Figure 22:
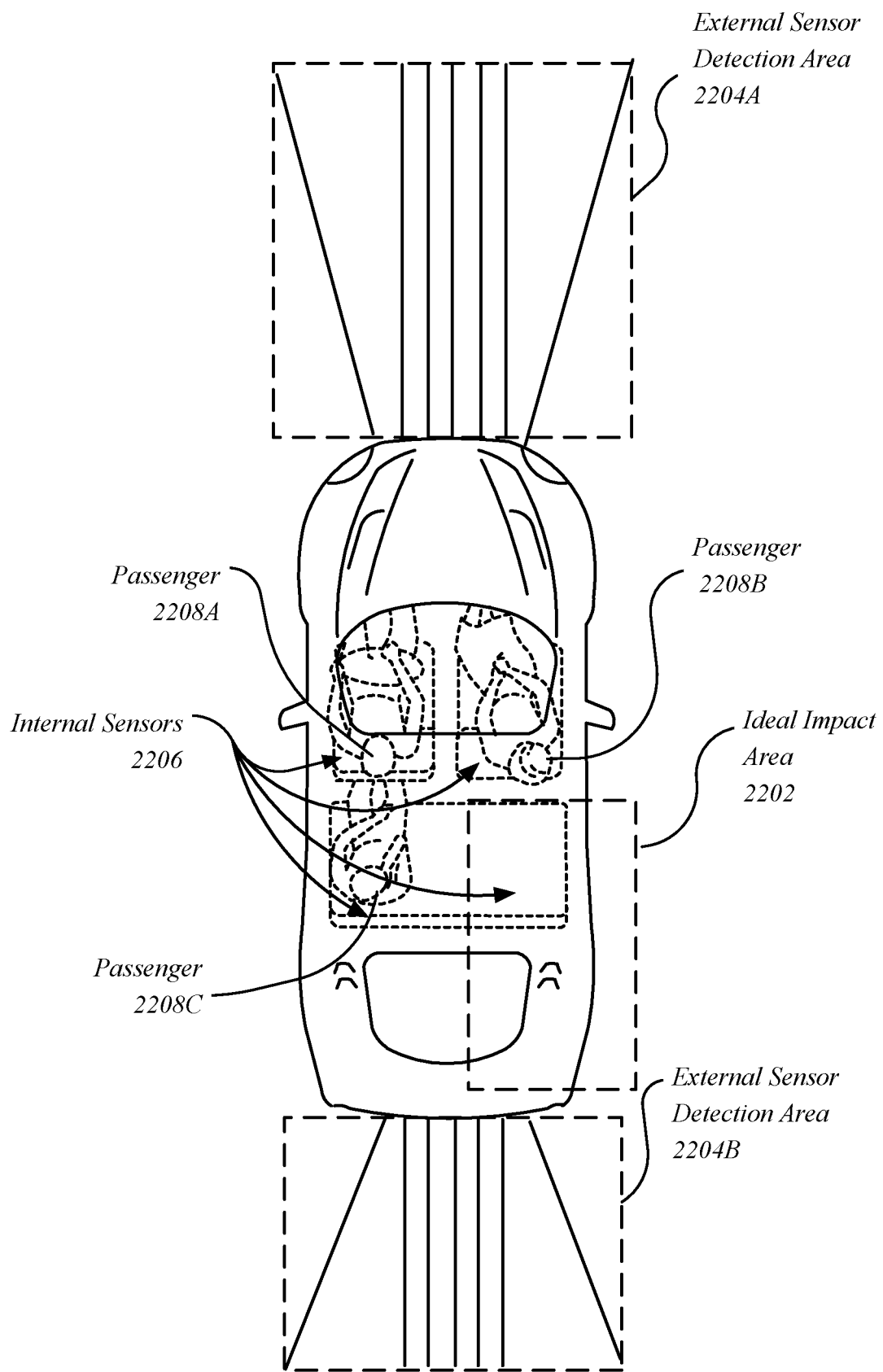
FIG. 22 illustrates an autonomous vehicle configured to minimize autonomous vehicle accident damage via internal sensors, according to an embodiment.

FIG. 22 illustrates an autonomous vehicle 2200 configured to minimize autonomous vehicle accident damage via internal sensors, according to an embodiment. In one embodiment the autonomous vehicle 2200 includes front and read external sensor detection areas 2204A-2204B to detect other vehicles, obstacles, road signs, road markings, and other information that is useful for autonomous navigation. The autonomous vehicle 2200 can also include side sensor detection areas (not shown) to detect the presence of other vehicles or obstacles (e.g., guardrails, etc.) that are located to either side of the vehicle. The autonomous vehicle 2200 includes a set of internal sensors 2206 that are used to determine the position of each vehicle occupant. The internal sensors 2206 can include a variety of sensors, including proximity sensors and/or seat sensors that can be used to determine which seats within the vehicle are occupied. Based on this sensor data, the autonomous vehicle 2200 can maintain a map of occupied positions within the vehicle. The vehicle can periodically update this map if passengers move around within the vehicle during autonomous driving mode. Using the internal sensors 2206, the autonomous vehicle 2200 can determine an ideal impact area 2202 for the vehicle such that, should a collision occur, the least amount of injury to the occupants will occur. The ideal impact area 2202, for example, can be an unoccupied area of the vehicle. While the autonomous vehicle 2200 will attempt to avoid collisions with other vehicles or objects, should the vehicle determine that a collision is unavoidable, for example, due to actions of other vehicles or an uncontrollable loss of traction, the vehicle can autonomously maneuver into a position to accept the collision in the ideal impact area 2202.

In addition to maneuvering or attempting to maneuver to receive an unavoidable collision in the ideal impact area 2202, the autonomous vehicle 2200 can initiate one or more collision mitigation mechanisms. The collision mitigation mechanism can include internal and/or external airbags that are pre-inflated prior to the collision, activation of seat belt pre-tensioners, and enabling any structural damage mitigation systems that may be present within the vehicle.

Figure 23:
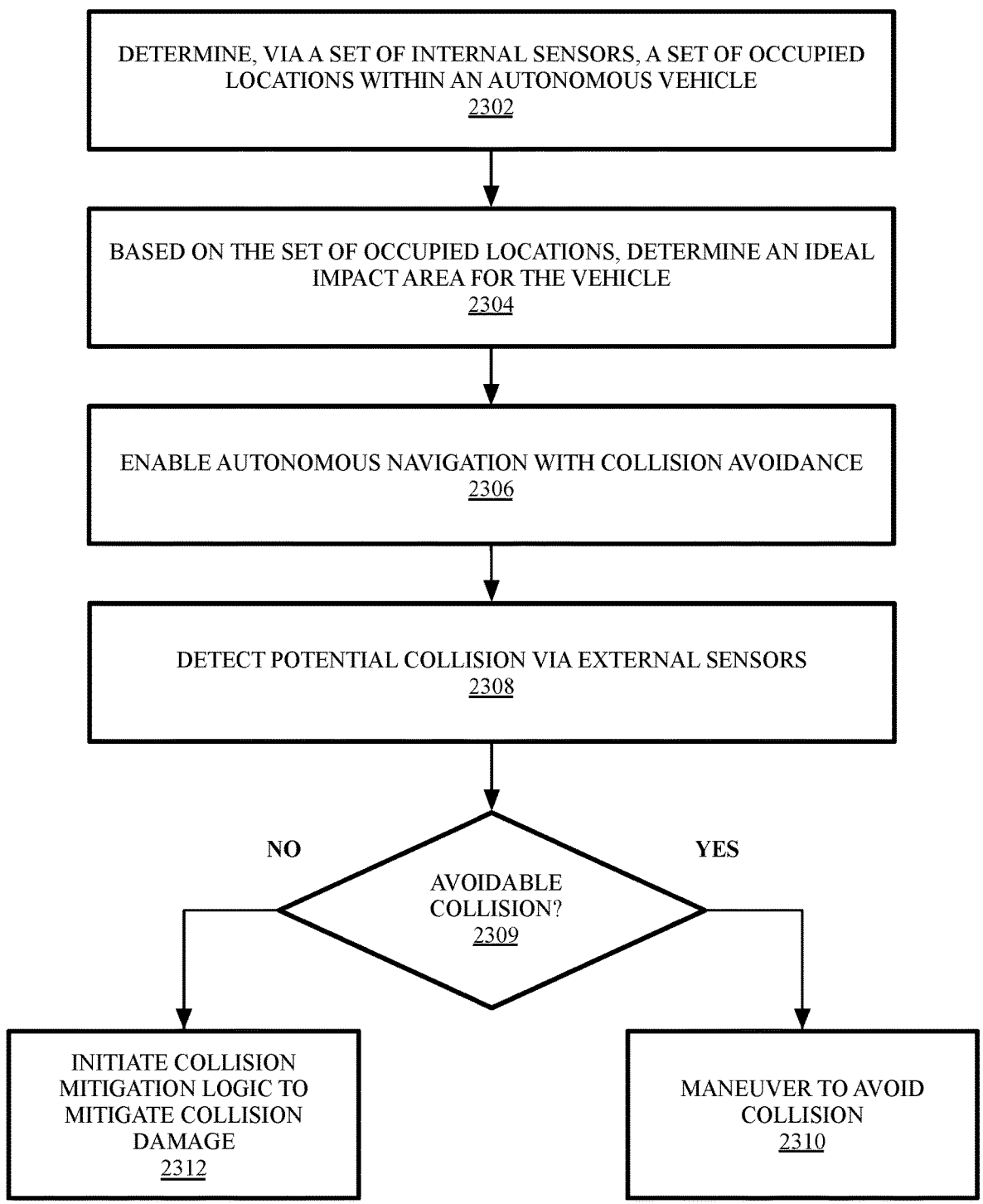
FIG. 23 is a flow diagram illustrating collision avoidance and mitigation logic, according to an embodiment.

FIG. 23 is a flow diagram illustrating collision avoidance and mitigation logic 2300, according to an embodiment. In one embodiment the collision avoidance and mitigation logic 2300 can determine, via set of internal sensors, a set of occupied locations within an autonomous vehicle, as shown at block 2302. Based on the set of occupied locations, the collision avoidance and mitigation logic 2300 can determine an ideal impact area for the vehicle, as shown at block 2304. In one embodiment the ideal impact location is a location within the vehicle that is not occupied by a passenger. The collision avoidance and mitigation logic 2300 can then enable autonomous navigation with collision avoidance, as shown at block 2306. In one embodiment the collision avoidance and mitigation logic 2300 can periodically update an assessment of occupied locations within the autonomous vehicle. The collision avoidance and mitigation logic 2300 can also update the assessment of occupied locations in response to detecting movement within the vehicle. Should the collision avoidance and mitigation logic 2300 detect a potential collision via external sensors at block 2308, the collision avoidance and mitigation logic 2300 can determine if the collision is an avoidable collision at block 2903. If the collision is an avoidable collision, the collision avoidance and mitigation logic 2300 can cause the autonomous vehicle to maneuver to avoid the collision at block 2310. If the collision is not avoidable, the collision avoidance and mitigation logic 2300 can initiate collision mitigation logic at block 2312. The collision mitigation logic can cause the vehicle to perform operations including adjusting the orientation of the vehicle such that the collision area is within the ideal impact area and/or enabling any or all damage mitigation techniques described herein.

Autonomous Response to Post Collision Scenario

In one embodiment, autonomous vehicles that have been involved in a collision can be configured to perform an autonomous response to one or more post collision scenarios. The post-collision response can be configured based on internal and external sensor data that is gathered before, during, and after the collision. A damage and injury assessment can be performed based on the gathered sensor data and a machine learning model can be trained to select from a variety of possible post collision responses.

Figure 24:
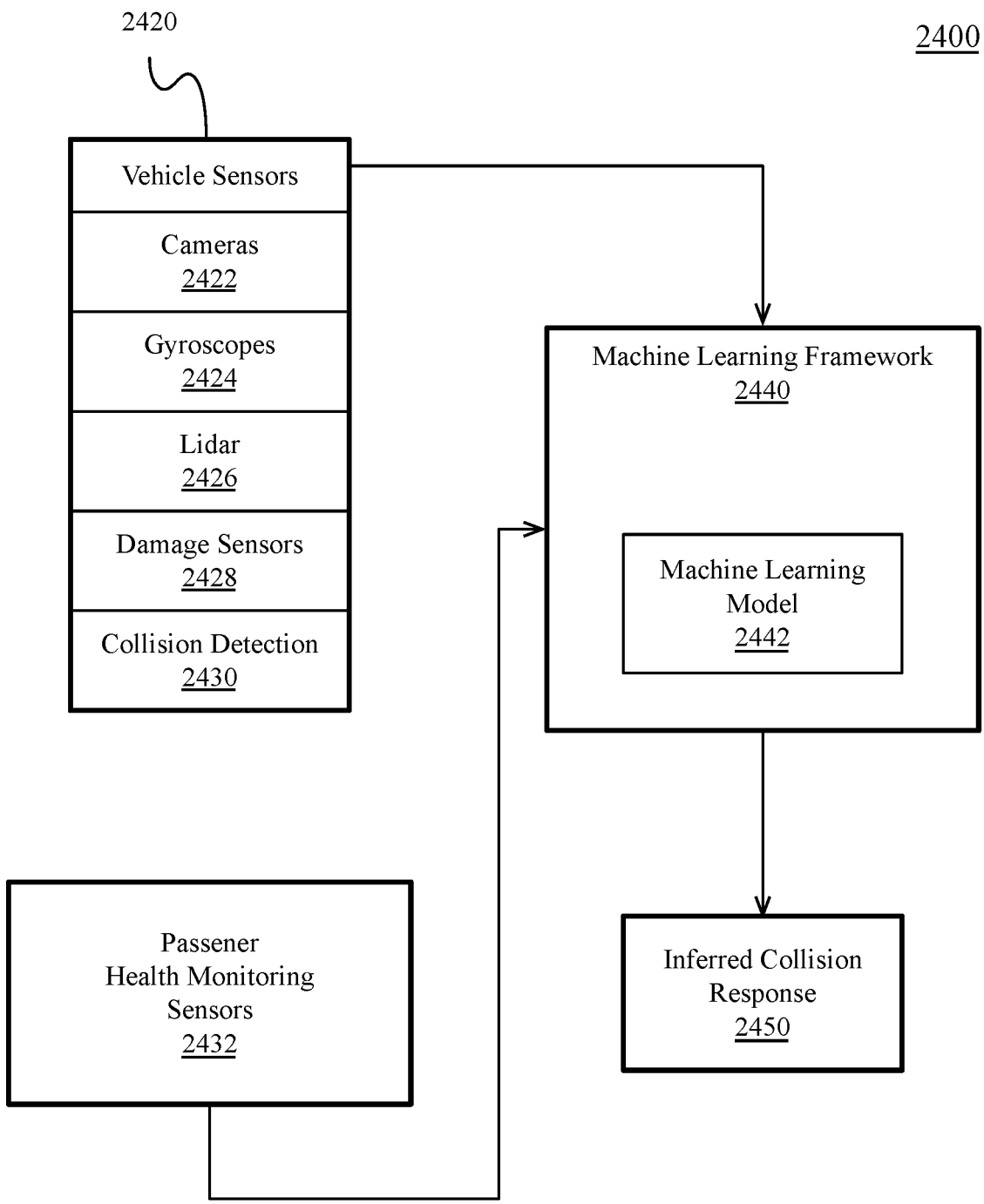
FIG. 24 illustrates an autonomous post collision system, according to an embodiment.

FIG. 24 illustrates an autonomous post collision system 2400, according to an embodiment. The autonomous post collision system 2400 includes a set of vehicle sensors 2420 to assess the condition of the vehicle after a collision. In one embodiment the vehicle sensors 2420 include but are not limited to one or more cameras 2422, gyroscopes 2424, and Lidar 2426 that can be used to determine a vehicle location, position, orientation, and local environment. The vehicle sensors 2420 can also include damage sensors 2428 and collision detection sensors 2430 and/or collision detection logic that can be activated in response to the detection of rapid deceleration by the vehicle in concert with a physical shock detected by the gyroscopes 2424. The autonomous post collision system 2400 can also include a set of passenger health monitoring sensors 2432, including internal cameras or sensors than can gather data that is used to assess passenger health in a post collision scenario. For example and in one embodiment the autonomous post collision system 2400 includes one or more internal infrared cameras that can be used to detect markers of physiological distress among passengers of an autonomous vehicle after a vehicle collision.

The data from the vehicle sensors 2420 and the passenger health monitoring sensors 2432 can be provided to a machine learning framework 2440 that is executing on compute resources within the autonomous vehicle. The machine learning framework can provide the input data to a machine learning model 2442 that can output an inferred collision response 2450. The inferred collision response 2450 can include a set of actions that, if possible, the autonomous vehicle will automatically perform in response to the current post collision scenario.

In one embodiment, based on passenger health and vehicle capabilities, the inferred collision response 2450 includes to transmit an incident report to the relevant authorities, which can include state and/or local police organization, insurance companies, and/or vehicle manufacturers. The incident report can be transmitted via a connected a vehicle communications network 1400 as in FIG. 14. The incident report can include vehicle telemetry immediately before, during, and after the collision, as well as any information that can be determined for other vehicles involved in the collision. For example, information regarding any other vehicles involved in the collision can be determined based on data gathered by vehicle sensors 2420. Additionally, the incident report can include the GPS coordinates or map location in which the incident occurred. Should the passenger health monitoring sensors detect a serious injury to a passenger, an automated message can be sent to emergency services with a passenger injury status and the location of the incident. In one embodiment the autonomous post collision system 2400 can attempt to query the passengers for a verbal injury report after a collision. The verbal injury report or an indication of a non-response by a passenger can also be transmitted to emergency services. In one embodiment additional components of an inferred collision response 2450 can includes collecting and transmitting sensor data with respect to the immediate environment of the vehicle, including sensor images of environmental hazards such as a roadway obstruction that may have contributed to the collision. In one embodiment the inferred collision response 2450 can also include automatically contacting any emergency contacts that may be configured for occupants of the vehicle.

Figure 25:
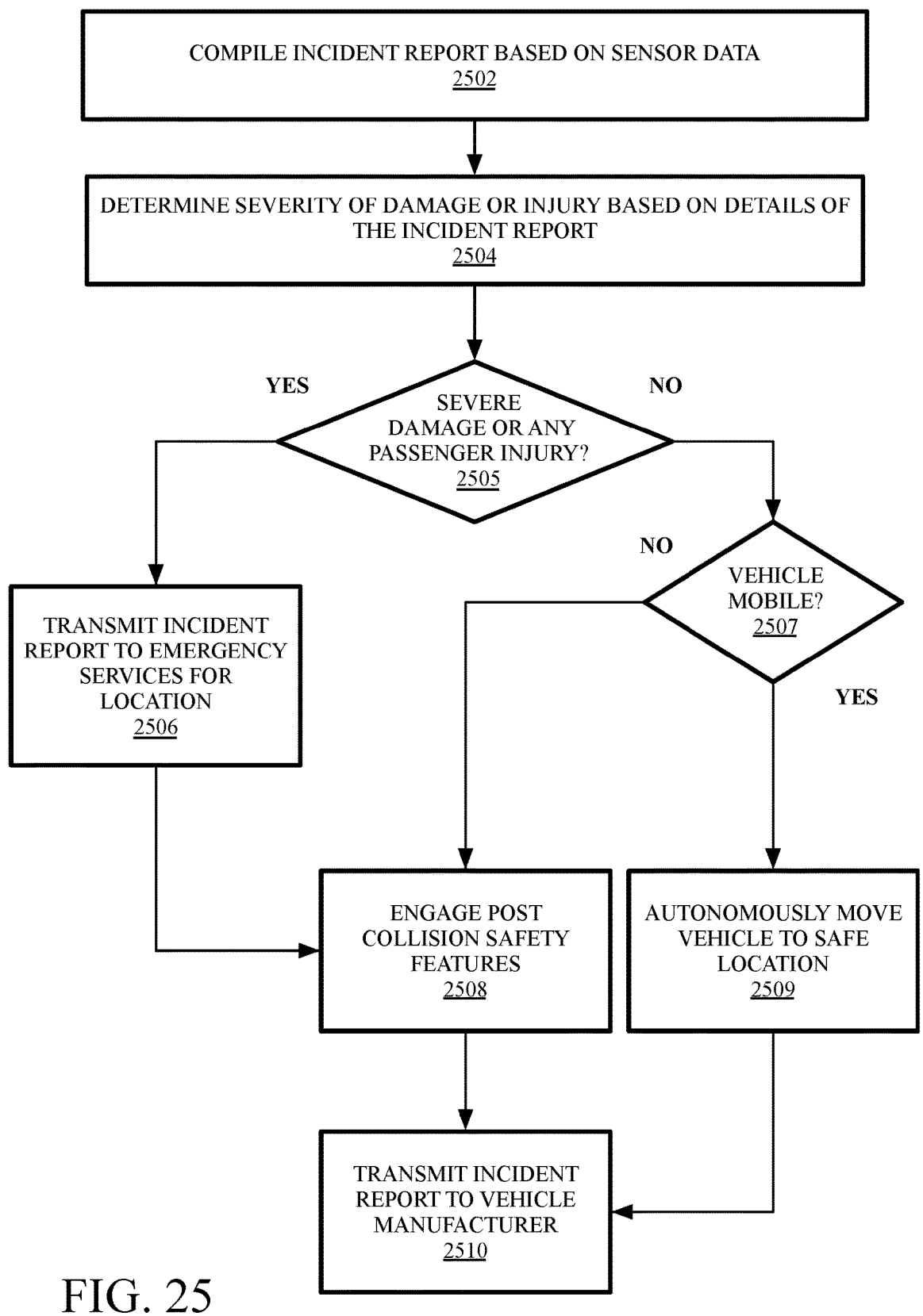
FIG. 25 illustrates details of autonomous post collision logic, according to an embodiment.

FIG. 25 illustrates details of autonomous post collision logic 2500, according to an embodiment. The autonomous post collision logic 2500 can execute on compute resources described herein and can be initiated response to a detected collision. In response to a detected collision the autonomous post collision logic 2500 can compile an incident report based on sensor data, as shown at block 2502. In one embodiment the degree of damage detected by the autonomous post collision logic 2500 determines the degree of response. The autonomous post collision logic 2500 can determine the severity of damage or injury based on the details of the injury report at block 2504. In one embodiment the incident report also includes information gathered via a request for verbal status from any passengers that may have been inside the vehicle during the collision. However, in some embodiments the autonomous post collision logic 2500 can be implemented after a collision of an unoccupied autonomous freight transport vehicle. In such system, no passenger injury will be anticipated.

If the autonomous post collision logic 2500, at block 2505, determines that severe vehicle damage or any passenger injury has occurred, the autonomous post collision logic 2500 can transmit the incident report to the appropriate emergency services for the location, as shown at block 2506. The incident report can be transmitted via the vehicle network described herein or via conventional mobile wireless communication techniques. Once the incident report has been transmitted the autonomous post collision logic 2500 can engage any available post collision safety features at block 2508. The post collision safety features can include as hazard or warning lights. In one embodiment the autonomous post collision logic 2500 can also disengage main vehicle power while maintaining auxiliary power for compute resources. For electric vehicles this may include disengaging power to the primary electric drive motors. For autonomous internal combustion vehicles, the primary internal combustion engine can be automatically disabled. In one embodiment, one or more vehicle doors can be automatically unlocked.

In one embodiment the autonomous post collision logic 2500 can bypass transmission of the incident report to emergency services if the logic determines at block 2505 that severe vehicle damage or passenger injury has not occurred. Instead, the autonomous post collision logic 2500 can determine at block 2507 whether the vehicle is mobile after the collision. The vehicle mobility determination can be performed based on damage sensors within the vehicle which can determine an operational status for the vehicle. If the autonomous post collision logic 2500 determines that the vehicle is mobile at block 2507, the logic can autonomously maneuver the vehicle to a nearby safe location at block 2509. For example, the autonomous post collision logic 2500 can autonomously maneuver the vehicle to the side of the road and out of the flow of traffic. In one embodiment the vehicle is autonomously maneuvered only of the maneuver can be performed without causing passenger injury or injury to nearby pedestrians or bystanders. If the autonomous post collision logic 2500 determines that the vehicle is not mobile (e.g., immobile) at block 2507, the logic can engage the post collision safety features described herein at block 2508. In each scenario, in one embodiment the autonomous post collision logic 2500 can transmit the incident report to the vehicle manufacturer, as shown at block 2510. In one embodiment the incident report that is transmitted to the vehicle manufacturer is primarily vehicle centric and is focused pre and post collision telemetry. Such report may be scrubbed of specific personal information before transmission.

Additional Exemplary Graphics Processing System

Details of the embodiments described above can be incorporated within graphics processing systems and devices described below. The graphics processing system and devices of FIG. 26-39 illustrate alternative systems and graphics processing hardware that can implement any and all of the techniques described above.

Additional Exemplary Graphics Processing System Overview

Figure 26:
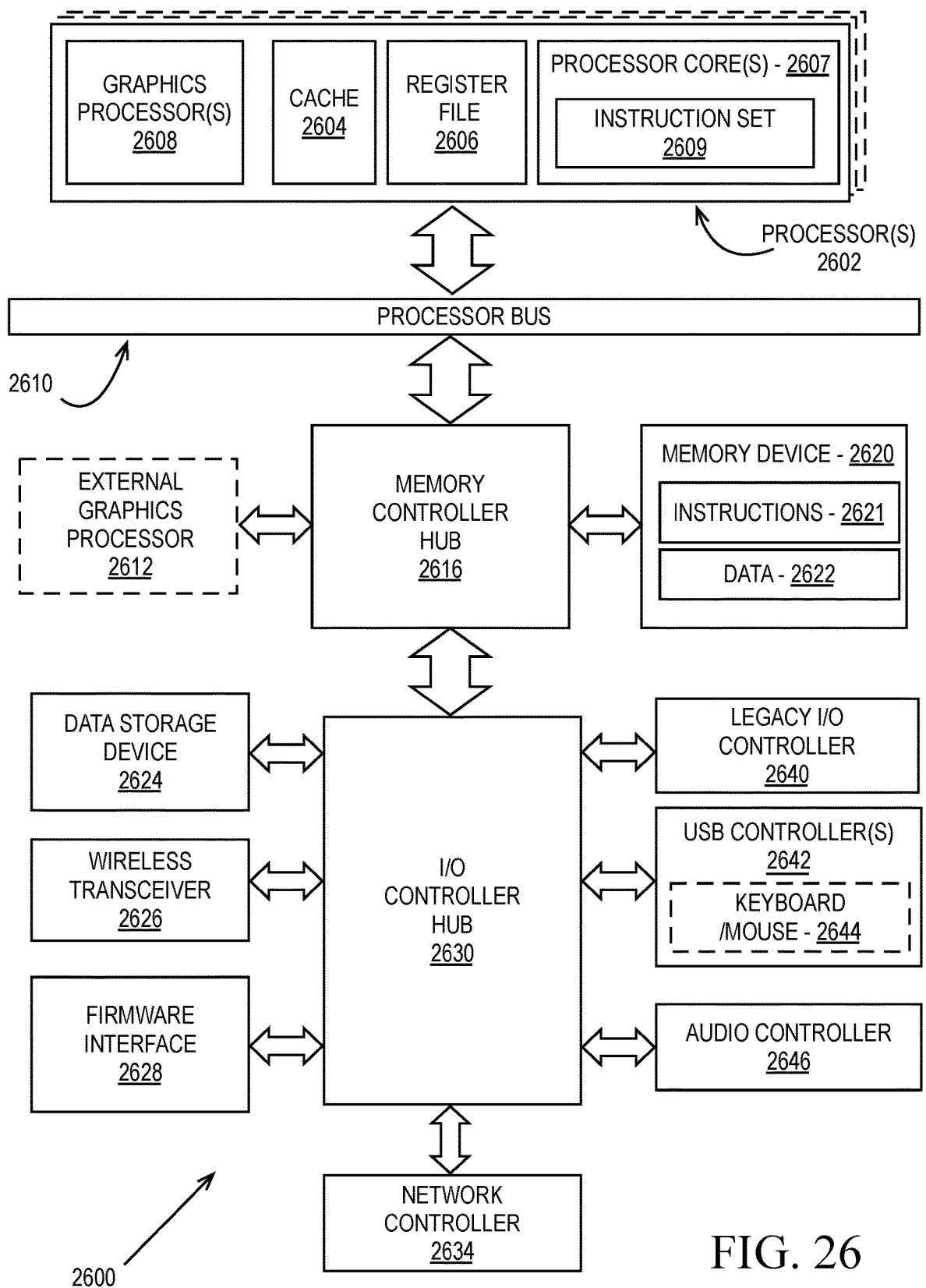
FIG. 26 is a block diagram of a processing system, according to an embodiment.

FIG. 26 is a block diagram of a processing system 2600, according to an embodiment. In various embodiments the system 2600 includes one or more processors 2602 and one or more graphics processors 2608, and may be a single processor desktop system, a multiprocessor workstation system, or a server system having a large number of processors 2602 or processor cores 2607. In one embodiment, the system 2600 is a processing platform incorporated within a system-on-a-chip (SoC) integrated circuit for use in mobile, handheld, or embedded devices.

An embodiment of system 2600 can include, or be incorporated within a server-based gaming platform, a game console, including a game and media console, a mobile gaming console, a handheld game console, or an online game console. In some embodiments system 2600 is a mobile phone, smart phone, tablet computing device or mobile Internet device. Data processing system 2600 can also include, couple with, or be integrated within a wearable device, such as a smart watch wearable device, smart eyewear device, augmented reality device, or virtual reality device. In some embodiments, data processing system 2600 is a television or set top box device having one or more processors 2602 and a graphical interface generated by one or more graphics processors 2608.

In some embodiments, the one or more processors 2602 each include one or more processor cores 2607 to process instructions which, when executed, perform operations for system and user software. In some embodiments, each of the one or more processor cores 2607 is configured to process a specific instruction set 2609. In some embodiments, instruction set 2609 may facilitate Complex Instruction Set Computing (CISC), Reduced Instruction Set Computing (RISC), or computing via a Very Long Instruction Word (VLIW). Multiple processor cores 2607 may each process a different instruction set 2609, which may include instructions to facilitate the emulation of other instruction sets. Processor core 2607 may also include other processing devices, such a Digital Signal Processor (DSP).

In some embodiments, the processor 2602 includes cache memory 2604. Depending on the architecture, the processor 2602 can have a single internal cache or multiple levels of internal cache. In some embodiments, the cache memory is shared among various components of the processor 2602. In some embodiments, the processor 2602 also uses an external cache (e.g., a Level-3 (L3) cache or Last Level Cache (LLC)) (not shown), which may be shared among processor cores 2607 using known cache coherency techniques. A register file 2606 is additionally included in processor 2602 which may include different types of registers for storing different types of data (e.g., integer registers, floating point registers, status registers, and an instruction pointer register). Some registers may be general-purpose registers, while other registers may be specific to the design of the processor 2602.

In some embodiments, processor 2602 is coupled with a processor bus 2610 to transmit communication signals such as address, data, or control signals between processor 2602 and other components in system 2600. In one embodiment the system 2600 uses an exemplary 'hub' system architecture, including a memory controller hub 2616 and an Input Output (I/O) controller hub 2630. A memory controller hub 2616 facilitates communication between a memory device and other components of system 2600, while an I/O Controller Hub (ICH) 2630 provides connections to I/O devices via a local I/O bus. In one embodiment, the logic of the memory controller hub 2616 is integrated within the processor.

Memory device 2620 can be a dynamic random access memory (DRAM) device, a static random access memory (SRAM) device, flash memory device, phase-change memory device, or some other memory device having suitable performance to serve as process memory. In one embodiment the memory device 2620 can operate as system memory for the system 2600, to store data 2622 and instructions 2621 for use when the one or more processors 2602 executes an application or process. Memory controller hub 2616 also couples with an optional external graphics processor 2612, which may communicate with the one or more graphics processors 2608 in processors 2602 to perform graphics and media operations.

In some embodiments, ICH 2630 enables peripherals to connect to memory device 2620 and processor 2602 via a high-speed I/O bus. The I/O peripherals include, but are not limited to, an audio controller 2646, a firmware interface 2628, a wireless transceiver 2626 (e.g., Wi-Fi, Bluetooth), a data storage device 2624 (e.g., hard disk drive, flash memory, etc.), and a legacy I/O controller 2640 for coupling legacy (e.g., Personal System 2 (PS/2)) devices to the system. One or more Universal Serial Bus (USB) controllers 2642 connect input devices, such as keyboard and mouse 2644 combinations. A network controller 2634 may also couple with ICH 2630. In some embodiments, a high-performance network controller (not shown) couples with processor bus 2610. It will be appreciated that the system 2600 shown is exemplary and not limiting, as other types of data processing systems that are differently configured may also be used. For example, the I/O controller hub 2630 may be integrated within the one or more processor 2602, or the memory controller hub 2616 and I/O controller hub 2630 may be integrated into a discreet external graphics processor, such as the external graphics processor 2612.

Figure 27:
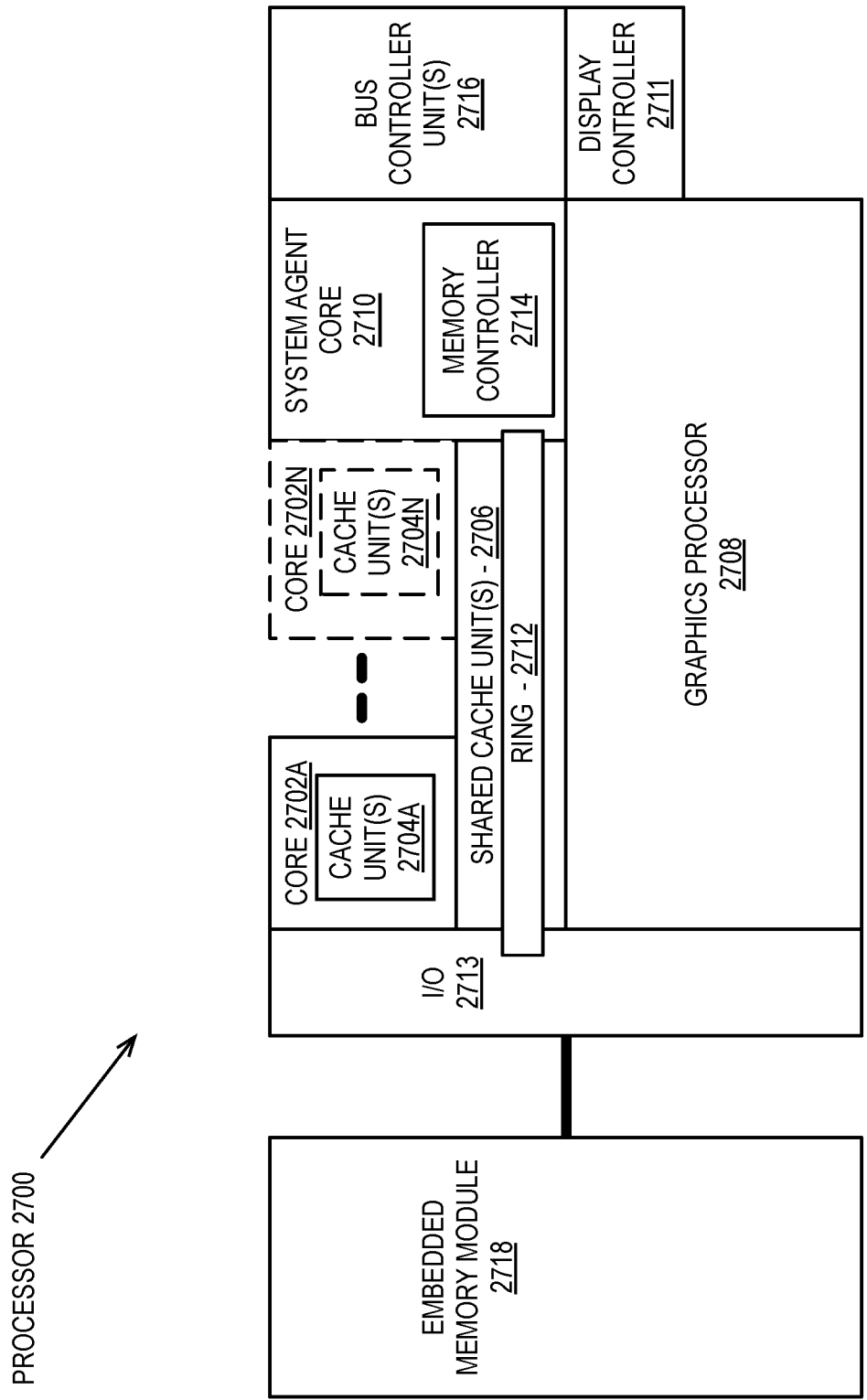
FIG. 27 is a block diagram of an embodiment of a processor having one or more processor cores, an integrated memory controller, and an integrated graphics processor.

FIG. 27 is a block diagram of an embodiment of a processor 2700 having one or more processor cores 2702A-2702N, an integrated memory controller 2714, and an integrated graphics processor 2708. Those elements of FIG. 27 having the same reference numbers (or names) as the elements of any other figure herein can operate or function in any manner similar to that described elsewhere herein, but are not limited to such. Processor 2700 can include additional cores up to and including additional core 2702N represented by the dashed lined boxes. Each of processor cores 2702A-2702N includes one or more internal cache units 2704A-2704N. In some embodiments each processor core also has access to one or more shared cached units 2706.

The internal cache units 2704A-2704N and shared cache units 2706 represent a cache memory hierarchy within the processor 2700. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 2706 and 2704A-2704N.

In some embodiments, processor 2700 may also include a set of one or more bus controller units 2716 and a system agent core 2710. The one or more bus controller units 2716 manage a set of peripheral buses, such as one or more Peripheral Component Interconnect buses (e.g., PCI, PCI Express). System agent core 2710 provides management functionality for the various processor components. In some embodiments, system agent core 2710 includes one or more integrated memory controllers 2714 to manage access to various external memory devices (not shown).

In some embodiments, one or more of the processor cores 2702A-2702N include support for simultaneous multi-threading. In such embodiment, the system agent core 2710 includes components for coordinating and operating cores 2702A-2702N during multi-threaded processing. System agent core 2710 may additionally include a power control unit (PCU), which includes logic and components to regulate the power state of processor cores 2702A-2702N and graphics processor 2708.

In some embodiments, processor 2700 additionally includes graphics processor 2708 to execute graphics processing operations. In some embodiments, the graphics processor 2708 couples with the set of shared cache units 2706, and the system agent core 2710, including the one or more integrated memory controllers 2714. In some embodiments, a display controller 2711 is coupled with the graphics processor 2708 to drive graphics processor output to one or more coupled displays. In some embodiments, display controller 2711 may be a separate module coupled with the graphics processor via at least one interconnect, or may be integrated within the graphics processor 2708 or system agent core 2710.

In some embodiments, a ring-based interconnect 2712 is used to couple the internal components of the processor 2700. However, an alternative interconnect unit may be used, such as a point-to-point interconnect, a switched interconnect, or other techniques, including techniques well known in the art. In some embodiments, graphics processor 2708 couples with the ring-based interconnect 2712 via an I/O link 2713.

The exemplary I/O link 2713 represents at least one of multiple varieties of I/O interconnects, including an on-package I/O interconnect which facilitates communication between various processor components and a high-performance embedded memory module 2718, such as an eDRAM module. In some embodiments, each of the processor cores 2702A-2702N and graphics processor 2708 use embedded memory modules 2718 as a shared Last Level Cache.

In some embodiments, processor cores 2702A-2702N are homogenous cores executing the same instruction set architecture. In another embodiment, processor cores 2702A-2702N are heterogeneous in terms of instruction set architecture (ISA), where one or more of processor cores 2702A-2702N execute a first instruction set, while at least one of the other cores executes a subset of the first instruction set or a different instruction set. In one embodiment processor cores 2702A-2702N are heterogeneous in terms of microarchitecture, where one or more cores having a relatively higher power consumption couple with one or more power cores having a lower power consumption. Additionally, processor 2700 can be implemented on one or more chips or as an SoC integrated circuit having the illustrated components, in addition to other components.

Figure 28:
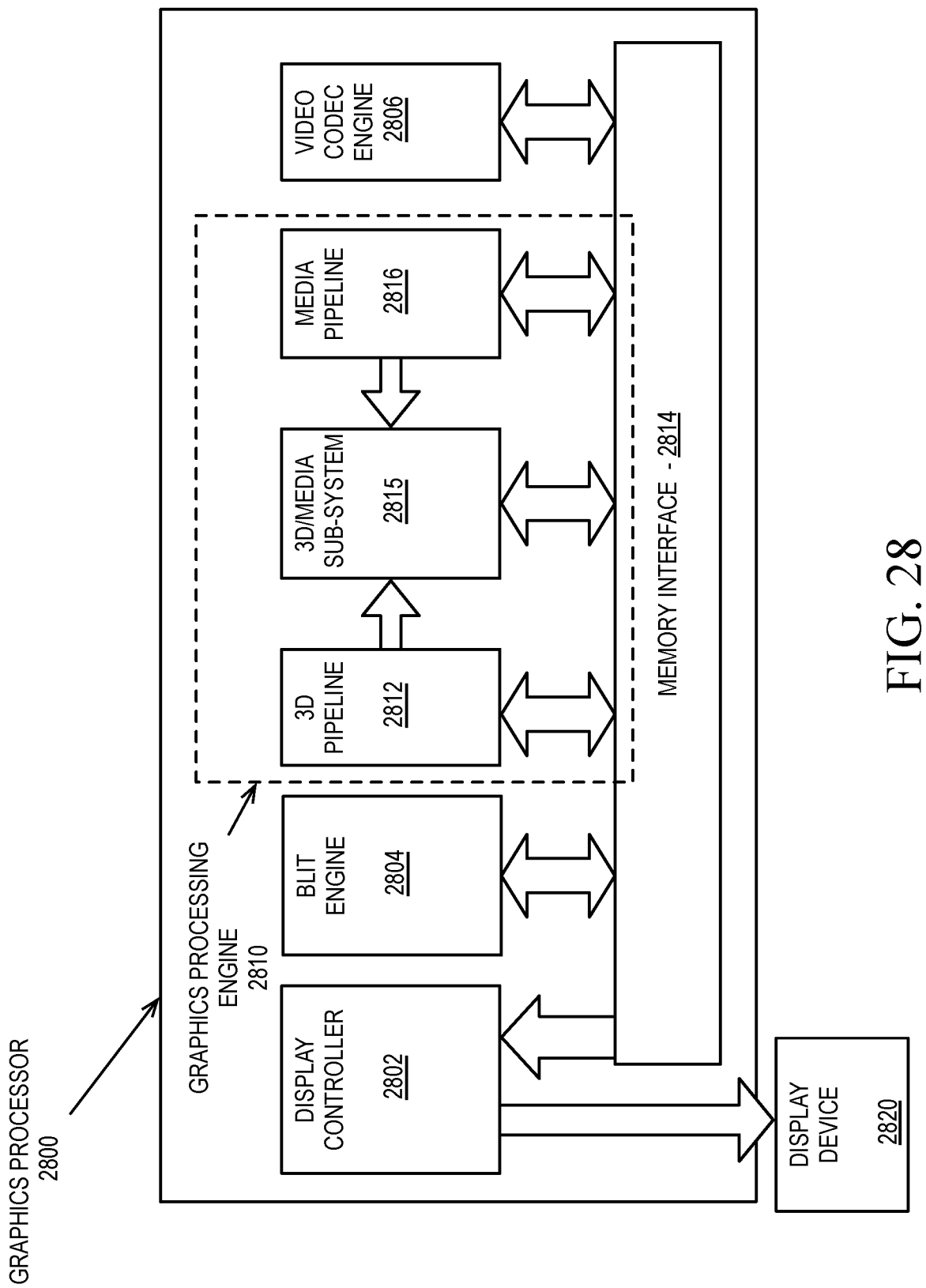
FIG. 28 is a block diagram of a graphics processor, which may be a discrete graphics processing unit, or may be a graphics processor integrated with a plurality of processing cores.

FIG. 28 is a block diagram of a graphics processor 2800, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 2800 includes a memory interface 2814 to access memory. Memory interface 2814 can be an interface to local memory, one or more internal caches, one or more shared external caches, and/or to system memory.

In some embodiments, graphics processor 2800 also includes a display controller 2802 to drive display output data to a display device 2820. Display controller 2802 includes hardware for one or more overlay planes for the display and composition of multiple layers of video or user interface elements. In some embodiments, graphics processor 2800 includes a video codec engine 2806 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 2800 includes a block image transfer (BLIT) engine 2804 to perform two-dimensional (2D) rasterizer operations including, for example, bit-boundary block transfers. However, in one embodiment, 2D graphics operations are performed using one or more components of graphics processing engine (GPE) 2810. In some embodiments, GPE 2810 is a compute engine for performing graphics operations, including three-dimensional (3D) graphics operations and media operations.

In some embodiments, GPE 3810 includes a 3D pipeline 2812 for performing 3D operations, such as rendering three-dimensional images and scenes using processing functions that act upon 3D primitive shapes (e.g., rectangle, triangle, etc.). The 3D pipeline 2812 includes programmable and fixed function elements that perform various tasks within the element and/or spawn execution threads to a 3D/Media sub-system 2815. While 3D pipeline 2812 can be used to perform media operations, an embodiment of GPE 2810 also includes a media pipeline 2816 that is specifically used to perform media operations, such as video post-processing and image enhancement.

In some embodiments, media pipeline 2816 includes fixed function or programmable logic units to perform one or more specialized media operations, such as video decode acceleration, video de-interlacing, and video encode acceleration in place of, or on behalf of video codec engine 2806. In some embodiments, media pipeline 2816 additionally includes a thread spawning unit to spawn threads for execution on 3D/Media sub-system 2815. The spawned threads perform computations for the media operations on one or more graphics execution units included in 3D/Media sub-system 2815.

In some embodiments, 3D/Media sub-system 2815 includes logic for executing threads spawned by 3D pipeline 2812 and media pipeline 2816. In one embodiment, the pipelines send thread execution requests to 3D/Media sub-system 2815, which includes thread dispatch logic for arbitrating and dispatching the various requests to available thread execution resources. The execution resources include an array of graphics execution units to process the 3D and media threads. In some embodiments, 3D/Media sub-system 2815 includes one or more internal caches for thread instructions and data. In some embodiments, the subsystem also includes shared memory, including registers and addressable memory, to share data between threads and to store output data.

Exemplary Additional Graphics Processing Engine

Figure 29:
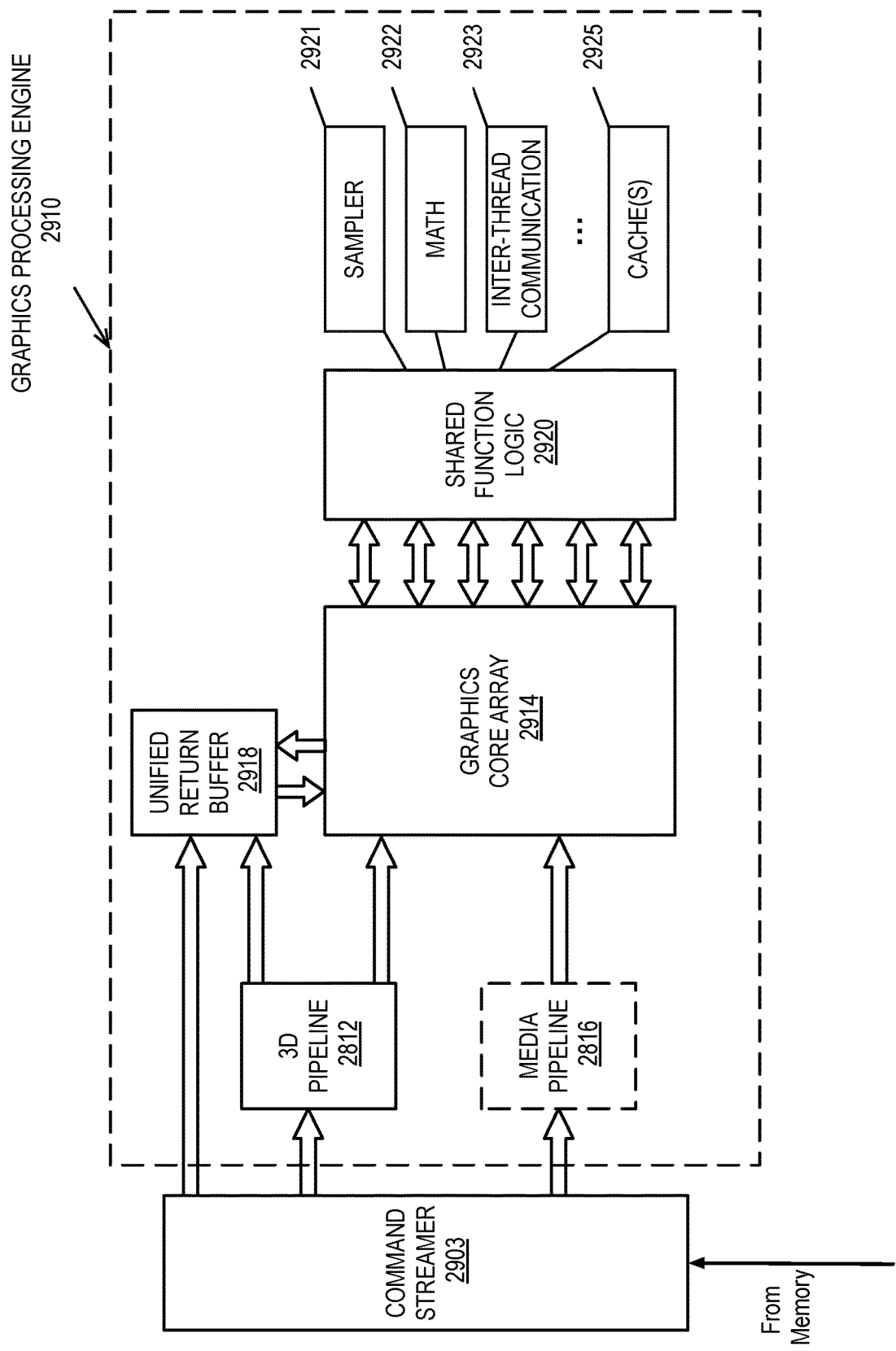
FIG. 29 is a block diagram of a graphics processing engine of a graphics processor in accordance with some embodiments.

FIG. 29 is a block diagram of a graphics processing engine 2910 of a graphics processor in accordance with some embodiments. In one embodiment, the graphics processing engine (GPE) 2910 is a version of the GPE 2810 shown in FIG. 28. Elements of FIG. 29 having the same reference numbers (or names) as the elements of any other figure herein can operate or function in any manner similar to that described elsewhere herein, but are not limited to such. For example, the 3D pipeline 2812 and media pipeline 2816 of FIG. 28 are illustrated. The media pipeline 2816 is optional in some embodiments of the GPE 2910 and may not be explicitly included within the GPE 2910. For example and in at least one embodiment, a separate media and/or image processor is coupled to the GPE 2910.

In some embodiments, GPE 2910 couples with or includes a command streamer 2903, which provides a command stream to the 3D pipeline 2812 and/or media pipelines 2816. In some embodiments, command streamer 2903 is coupled with memory, which can be system memory, or one or more of internal cache memory and shared cache memory. In some embodiments, command streamer 2903 receives commands from the memory and sends the commands to 3D pipeline 2812 and/or media pipeline 2816. The commands are directives fetched from a ring buffer, which stores commands for the 3D pipeline 2812 and media pipeline 2816. In one embodiment, the ring buffer can additionally include batch command buffers storing batches of multiple commands. The commands for the 3D pipeline 2812 can also include references to data stored in memory, such as but not limited to vertex and geometry data for the 3D pipeline 2812 and/or image data and memory objects for the media pipeline 2816. The 3D pipeline 2812 and media pipeline 2816 process the commands and data by performing operations via logic within the respective pipelines or by dispatching one or more execution threads to a graphics core array 2914.

In various embodiments the 3D pipeline 2812 can execute one or more shader programs, such as vertex shaders, geometry shaders, pixel shaders, fragment shaders, compute shaders, or other shader programs, by processing the instructions and dispatching execution threads to the graphics core array 2914. The graphics core array 2914 provides a unified block of execution resources. Multi-purpose execution logic (e.g., execution units) within the graphics core array 2914 includes support for various 3D API shader languages and can execute multiple simultaneous execution threads associated with multiple shaders.

In some embodiments the graphics core array 2914 also includes execution logic to perform media functions, such as video and/or image processing. In one embodiment, the execution units additionally include general-purpose logic that is programmable to perform parallel general purpose computational operations, in addition to graphics processing operations. The general purpose logic can perform processing operations in parallel or in conjunction with general purpose logic within the processor core(s) 2607 of FIG. 26 or core 2702A-2702N as in FIG. 27.

Output data generated by threads executing on the graphics core array 2914 can output data to memory in a unified return buffer (URB) 2918. The URB 2918 can store data for multiple threads. In some embodiments the URB 2918 may be used to send data between different threads executing on the graphics core array 2914. In some embodiments the URB 2918 may additionally be used for synchronization between threads on the graphics core array and fixed function logic within the shared function logic 2920.

In some embodiments, graphics core array 2914 is scalable, such that the array includes a variable number of graphics cores, each having a variable number of execution units based on the target power and performance level of GPE 2910. In one embodiment the execution resources are dynamically scalable, such that execution resources may be enabled or disabled as needed.

The graphics core array 2914 couples with shared function logic 2920 that includes multiple resources that are shared between the graphics cores in the graphics core array. The shared functions within the shared function logic 2920 are hardware logic units that provide specialized supplemental functionality to the graphics core array 2914. In various embodiments, shared function logic 2920 includes but is not limited to sampler 2921, math 2922, and inter-thread communication (ITC) 2923 logic. Additionally, some embodiments implement one or more cache(s) 2925 within the shared function logic 2920. A shared function is implemented where the demand for a given specialized function is insufficient for inclusion within the graphics core array 2914. Instead a single instantiation of that specialized function is implemented as a stand-alone entity in the shared function logic 2920 and shared among the execution resources within the graphics core array 2914. The precise set of functions that are shared between the graphics core array 2914 and included within the graphics core array 2914 varies between embodiments.

Figure 30:
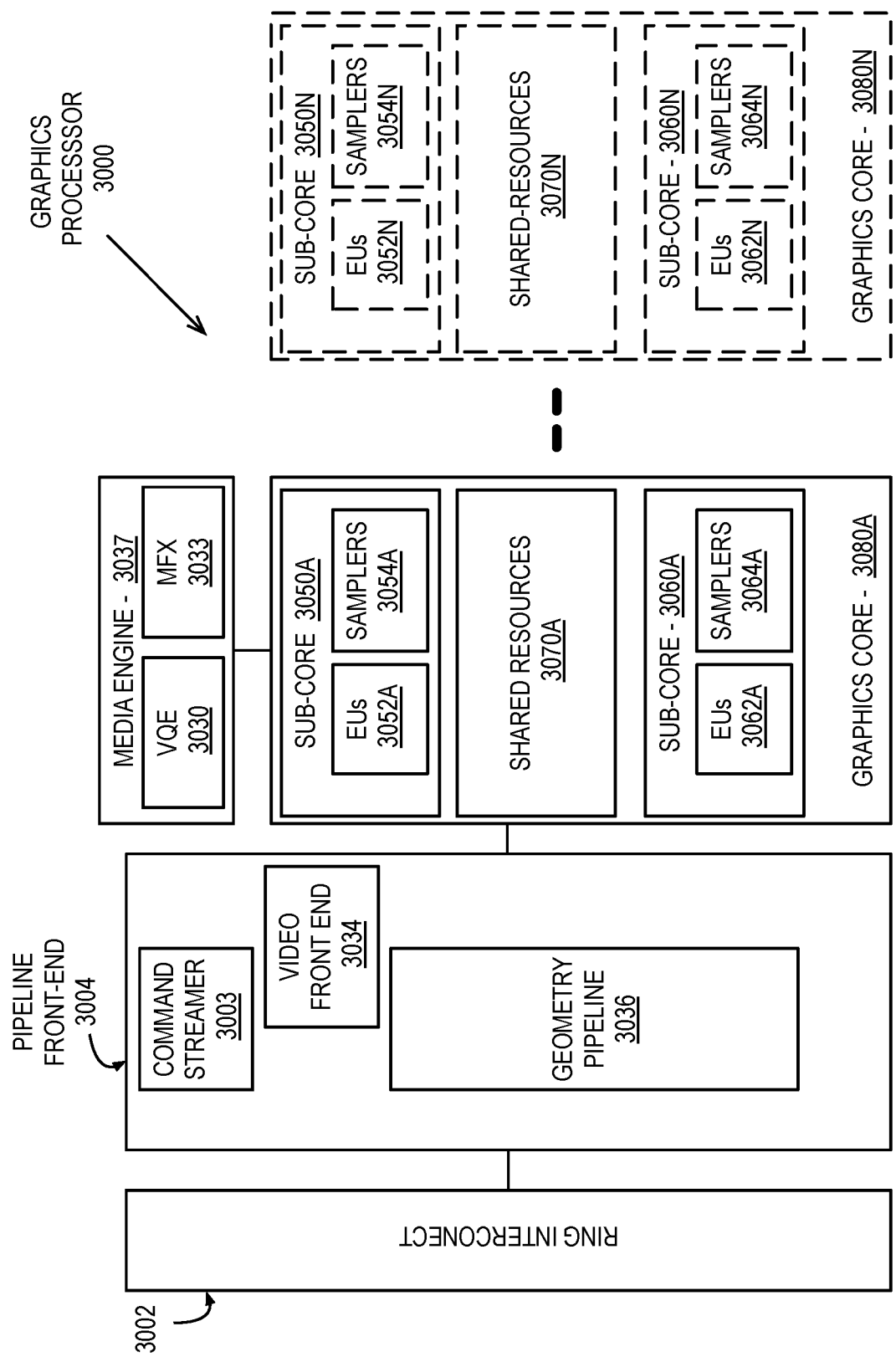
FIG. 30 is a block diagram of a graphics processor provided by an additional embodiment.

FIG. 30 is a block diagram of another embodiment of a graphics processor 3000. Elements of FIG. 30 having the same reference numbers (or names) as the elements of any other figure herein can operate or function in any manner similar to that described elsewhere herein, but are not limited to such.

In some embodiments, graphics processor 3000 includes a ring interconnect 3002, a pipeline front-end 3004, a media engine 3037, and graphics cores 3080A-3080N. In some embodiments, ring interconnect 3002 couples the graphics processor to other processing units, including other graphics processors or one or more general-purpose processor cores. In some embodiments, the graphics processor is one of many processors integrated within a multi-core processing system.

In some embodiments, graphics processor 3000 receives batches of commands via ring interconnect 3002. The incoming commands are interpreted by a command streamer 3003 in the pipeline front-end 3004. In some embodiments, graphics processor 3000 includes scalable execution logic to perform 3D geometry processing and media processing via the graphics core(s) 3080A-3080N. For 3D geometry processing commands, command streamer 3003 supplies commands to geometry pipeline 3036. For at least some media processing commands, command streamer 3003 supplies the commands to a video front end 3034, which couples with a media engine 3037. In some embodiments, media engine 3037 includes a Video Quality Engine (VQE) 3030 for video and image post-processing and a multi-format encode/decode (MFX) 3033 engine to provide hardware-accelerated media data encode and decode. In some embodiments, geometry pipeline 3036 and media engine 3037 each generate execution threads for the thread execution resources provided by at least one graphics core 3080A.

In some embodiments, graphics processor 3000 includes scalable thread execution resources featuring modular cores 3080A-3080N (sometimes referred to as core slices), each having multiple sub-cores 3050A-550N, 3060A-3060N (sometimes referred to as core sub-slices). In some embodiments, graphics processor 3000 can have any number of graphics cores 3080A through 3080N. In some embodiments, graphics processor 3000 includes a graphics core 3080A having at least a first sub-core 3050A and a second sub-core 3060A. In other embodiments, the graphics processor is a low power processor with a single sub-core (e.g., 3050A). In some embodiments, graphics processor 3000 includes multiple graphics cores 3080A-3080N, each including a set of first sub-cores 3050A-3050N and a set of second sub-cores 3060A-3060N. Each sub-core in the set of first sub-cores 3050A-3050N includes at least a first set of execution units 3052A-3052N and media/texture samplers 3054A-3054N. Each sub-core in the set of second sub-cores 3060A-3060N includes at least a second set of execution units 3062A-3062N and samplers 3064A-3064N. In some embodiments, each sub-core 3050A-3050N, 3060A-3060N shares a set of shared resources 3070A-3070N. In some embodiments, the shared resources include shared cache memory and pixel operation logic. Other shared resources may also be included in the various embodiments of the graphics processor.

Exemplary Additional Execution Units

Figure 31:
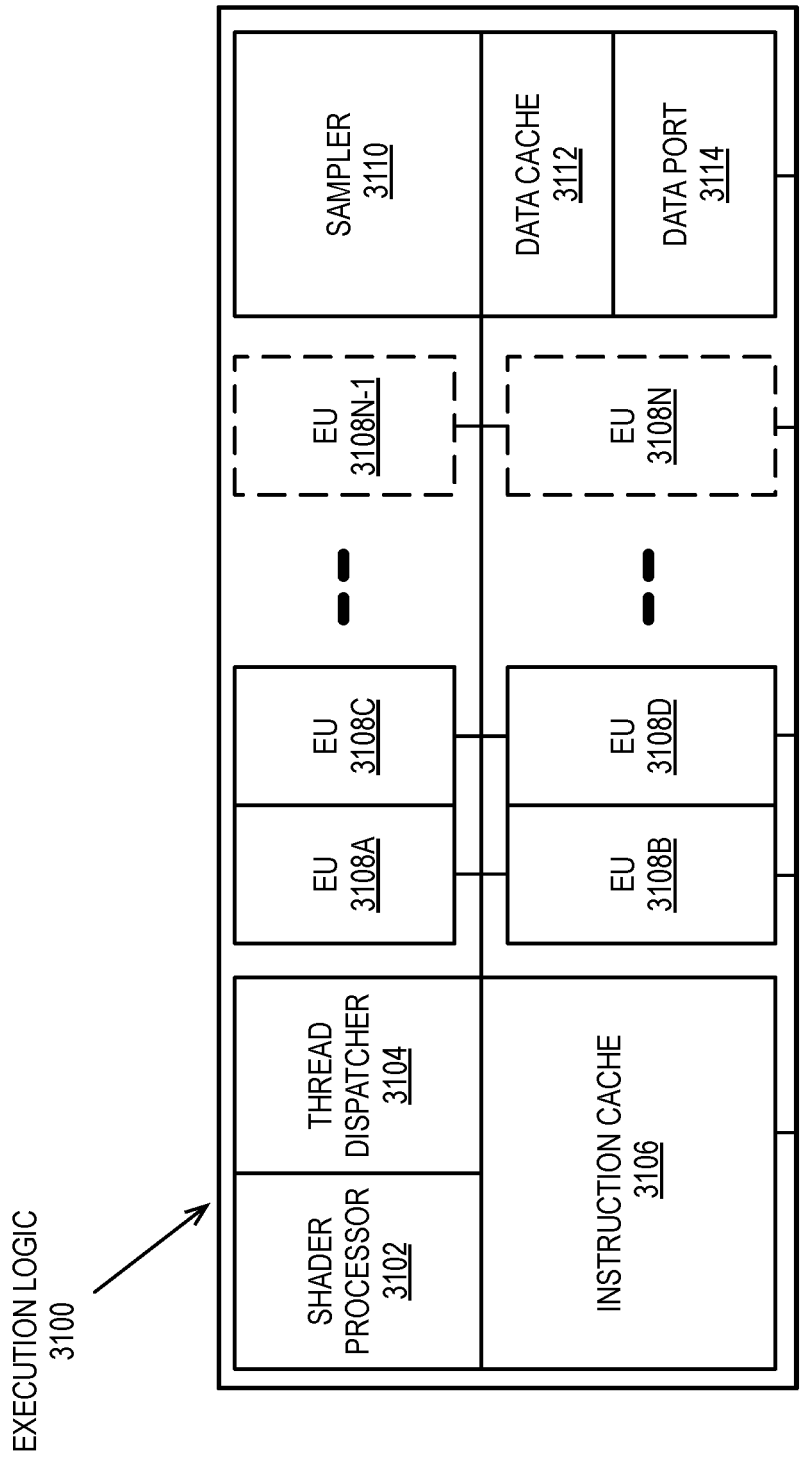
FIG. 31 illustrates thread execution logic including an array of processing elements employed in some embodiments.

FIG. 31 illustrates thread execution logic 3100 including an array of processing elements employed in some embodiments of a GPE. Elements of FIG. 31 having the same reference numbers (or names) as the elements of any other figure herein can operate or function in any manner similar to that described elsewhere herein, but are not limited to such.

In some embodiments, thread execution logic 3100 includes a shader processor 3102, a thread dispatcher 3104, instruction cache 3106, a scalable execution unit array including a plurality of execution units 3108A-3108N, a sampler 3110, a data cache 3112, and a data port 3114. In one embodiment the scalable execution unit array can dynamically scale by enabling or disabling one or more execution units (e.g., any of execution unit 3108A, 3108B, 3108C, 3108D, through 3108N-1 and 3108N) based on the computational requirements of a workload. In one embodiment the included components are interconnected via an interconnect fabric that links to each of the components. In some embodiments, thread execution logic 3100 includes one or more connections to memory, such as system memory or cache memory, through one or more of instruction cache 3106, data port 3114, sampler 3110, and execution units 3108A-3108N. In some embodiments, each execution unit (e.g., 3108A) is a stand-alone programmable general purpose computational unit that is capable of executing multiple simultaneous hardware threads while processing multiple data elements in parallel for each thread. In various embodiments, the array of execution units 3108A-3108N is scalable to include any number individual execution units.

In some embodiments, the execution units 3108A-3108N are primarily used to execute shader programs. A shader processor 3102 can process the various shader programs and dispatch execution threads associated with the shader programs via a thread dispatcher 3104. In one embodiment the thread dispatcher includes logic to arbitrate thread initiation requests from the graphics and media pipelines and instantiate the requested threads on one or more execution unit in the execution units 3108A-3108N. For example, the geometry pipeline (e.g., 3036 of FIG. 30) can dispatch vertex, tessellation, or geometry shaders to the thread execution logic 3100 (FIG. 31) for processing. In some embodiments, thread dispatcher 3104 can also process runtime thread spawning requests from the executing shader programs.

In some embodiments, the execution units 3108A-3108N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 3108A-3108N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 3108A-3108N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 3108A-3108N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 3108A-3108N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 3106) are included in the thread execution logic 3100 to cache thread instructions for the execution units. In some embodiments, one or more data caches (e.g., 3112) are included to cache thread data during thread execution. In some embodiments, a sampler 3110 is included to provide texture sampling for 3D operations and media sampling for media operations. In some embodiments, sampler 3110 includes specialized texture or media sampling functionality to process texture or media data during the sampling process before providing the sampled data to an execution unit.

During execution, the graphics and media pipelines send thread initiation requests to thread execution logic 3100 via thread spawning and dispatch logic. Once a group of geometric objects has been processed and rasterized into pixel data, pixel processor logic (e.g., pixel shader logic, fragment shader logic, etc.) within the shader processor 3102 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 3102 then executes an application programming interface (API)-supplied pixel or fragment shader program. To execute the shader program, the shader processor 3102 dispatches threads to an execution unit (e.g., 3108A) via thread dispatcher 3104. In some embodiments, shader processor 3102 uses texture sampling logic in the sampler 3110 to access texture data in texture maps stored in memory. Arithmetic operations on the texture data and the input geometry data compute pixel color data for each geometric fragment, or discards one or more pixels from further processing.

In some embodiments, the data port 3114 provides a memory access mechanism for the thread execution logic 3100 output processed data to memory for processing on a graphics processor output pipeline. In some embodiments, the data port 3114 includes or couples to one or more cache memories (e.g., data cache 3112) to cache data for memory access via the data port.

FIG. 32 is a block diagram illustrating graphics processor instruction formats 3200 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, the graphics processor instruction formats 3200 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 3210. A 64-bit compacted instruction format 3230 is available for some instructions based on the selected instruction, instruction options, and number of operands. The native 128-bit instruction format 710 provides access to all instruction options, while some options and operations are restricted in the 64-bit format 3230. The native instructions available in the 64-bit format 3230 vary by embodiment. In some embodiments, the instruction is compacted in part using a set of index values in an index field 3213. The execution unit hardware references a set of compaction tables based on the index values and uses the compaction table outputs to reconstruct a native instruction in the 128-bit instruction format 3210.

For each format, instruction opcode 3212 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 3214 enables control over certain execution options, such as channels selection (e.g., predication) and data channel order (e.g., swizzle). For instructions in the 128-bit instruction format 3210 an exec-size field 3216 limits the number of data channels that will be executed in parallel. In some embodiments, exec-size field 3216 is not available for use in the 64-bit compact instruction format 3230.

Some execution unit instructions have up to three operands including two source operands, src0 3220, src1 3222, and one destination 3218. In some embodiments, the execution units support dual destination instructions, where one of the destinations is implied. Data manipulation instructions can have a third source operand (e.g., SRC2 3224), where the instruction opcode 3212 determines the number of source operands. An instruction's last source operand can be an immediate (e.g., hard-coded) value passed with the instruction.

In some embodiments, the 128-bit instruction format 3210 includes an access/address mode field 3226 specifying, for example, whether direct register addressing mode or indirect register addressing mode is used. When direct register addressing mode is used, the register address of one or more operands is directly provided by bits in the instruction.

In some embodiments, the 128-bit instruction format 3210 includes an access/address mode field 3226, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 3226 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 3212 bit-fields to simplify Opcode decode 3240. For an 8-bit opcode, bits 4, 5, and 6 allow the execution unit to determine the type of opcode. The precise opcode grouping shown is merely an example. In some embodiments, a move and logic opcode group 3242 includes data movement and logic instructions (e.g., move (mov), compare (cmp)). In some embodiments, move and logic group 3242 shares the five most significant bits (MSB), where move (mov) instructions are in the form of 0000xxxxb and logic instructions are in the form of 0001xxxxb. A flow control instruction group 3244 (e.g., call, jump (jmp)) includes instructions in the form of 0010xxxxb (e.g., 0x20). A miscellaneous instruction group 3246 includes a mix of instructions, including synchronization instructions (e.g., wait, send) in the form of 0011xxxxb (e.g., 0x30). A parallel math instruction group 3248 includes component-wise arithmetic instructions (e.g., add, multiply (mul)) in the form of 0100xxxxb (e.g., 0x40). The parallel math group 3248 performs the arithmetic operations in parallel across data channels. The vector math group 3250 includes arithmetic instructions (e.g., dp4) in the form of 0101xxxxb (e.g., 0x50). The vector math group performs arithmetic such as dot product calculations on vector operands.

Exemplary Additional Graphics Pipeline

Figure 33:
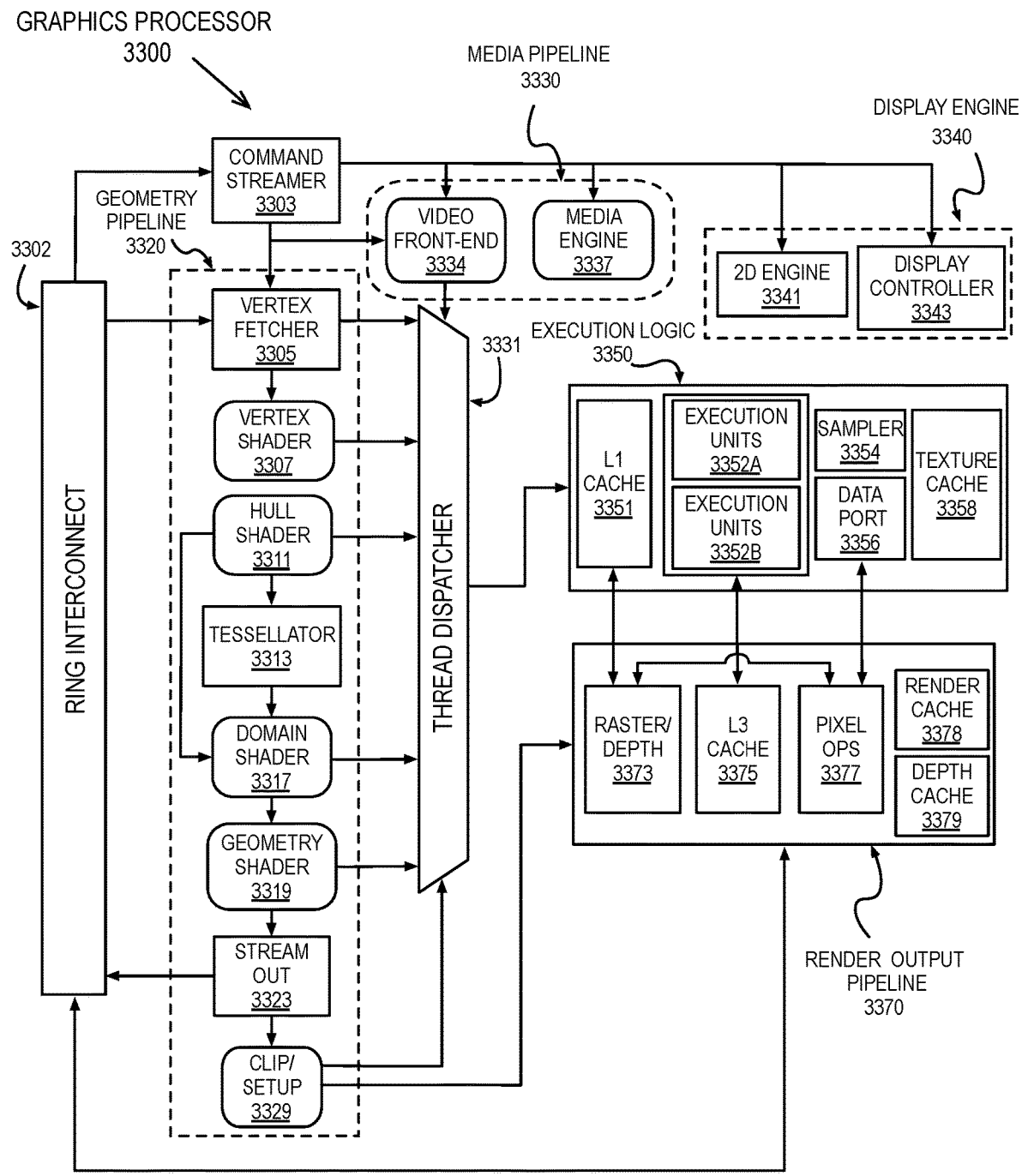
FIG. 33 is a block diagram of a graphics processor according to another embodiment.

FIG. 33 is a block diagram of another embodiment of a graphics processor 3300. Elements of FIG. 33 having the same reference numbers (or names) as the elements of any other figure herein can operate or function in any manner similar to that described elsewhere herein, but are not limited to such.

In some embodiments, graphics processor 3300 includes a graphics pipeline 3320, a media pipeline 3330, a display engine 3340, thread execution logic 3350, and a render output pipeline 3370. In some embodiments, graphics processor 3300 is a graphics processor within a multi-core processing system that includes one or more general purpose processing cores. The graphics processor is controlled by register writes to one or more control registers (not shown) or via commands issued to graphics processor 3300 via a ring interconnect 3302. In some embodiments, ring interconnect 3302 couples graphics processor 3300 to other processing components, such as other graphics processors or general-purpose processors. Commands from ring interconnect 3302 are interpreted by a command streamer 3303, which supplies instructions to individual components of graphics pipeline 3320 or media pipeline 3330.

In some embodiments, command streamer 3303 directs the operation of a vertex fetcher 3305 that reads vertex data from memory and executes vertex-processing commands provided by command streamer 3303. In some embodiments, vertex fetcher 3305 provides vertex data to a vertex shader 3307, which performs coordinate space transformation and lighting operations to each vertex. In some embodiments, vertex fetcher 3305 and vertex shader 3307 execute vertex-processing instructions by dispatching execution threads to execution units 3352A-3352B via a thread dispatcher 3331.

In some embodiments, execution units 3352A-3352B are an array of vector processors having an instruction set for performing graphics and media operations. In some embodiments, execution units 3352A-3352B have an attached L1 cache 3351 that is specific for each array or shared between the arrays. The cache can be configured as a data cache, an instruction cache, or a single cache that is partitioned to contain data and instructions in different partitions.

In some embodiments, graphics pipeline 3320 includes tessellation components to perform hardware-accelerated tessellation of 3D objects. In some embodiments, a programmable hull shader 3311 configures the tessellation operations. A programmable domain shader 3317 provides back-end evaluation of tessellation output. A tessellator 3313 operates at the direction of hull shader 3311 and contains special purpose logic to generate a set of detailed geometric objects based on a coarse geometric model that is provided as input to graphics pipeline 3320. In some embodiments, if tessellation is not used, tessellation components (e.g., hull shader 3311, tessellator 3313, and domain shader 3317) can be bypassed.

In some embodiments, complete geometric objects can be processed by a geometry shader 3319 via one or more threads dispatched to execution units 3352A-3352B, or can proceed directly to the clipper 3329. In some embodiments, the geometry shader operates on entire geometric objects, rather than vertices or patches of vertices as in previous stages of the graphics pipeline. If the tessellation is disabled the geometry shader 3319 receives input from the vertex shader 3307. In some embodiments, geometry shader 3319 is programmable by a geometry shader program to perform geometry tessellation if the tessellation units are disabled.

Before rasterization, a clipper 3329 processes vertex data. The clipper 3329 may be a fixed function clipper or a programmable clipper having clipping and geometry shader functions. In some embodiments, a rasterizer and depth test component 3373 in the render output pipeline 3370 dispatches pixel shaders to convert the geometric objects into their per pixel representations. In some embodiments, pixel shader logic is included in thread execution logic 3350. In some embodiments, an application can bypass the rasterizer and depth test component 3373 and access un-rasterized vertex data via a stream out unit 3323.

The graphics processor 3300 has an interconnect bus, interconnect fabric, or some other interconnect mechanism that allows data and message passing amongst the major components of the processor. In some embodiments, execution units 3352A-3352B and associated cache(s) 3351, texture and media sampler 3354, and texture/sampler cache 3358 interconnect via a data port 3356 to perform memory access and communicate with render output pipeline components of the processor. In some embodiments, sampler 3354, caches 3351, 3358 and execution units 3352A-3352B each have separate memory access paths.

In some embodiments, render output pipeline 3370 contains a rasterizer and depth test component 3373 that converts vertex-based objects into an associated pixel-based representation. In some embodiments, the rasterizer logic includes a windower/masker unit to perform fixed function triangle and line rasterization. An associated render cache 3378 and depth cache 3379 are also available in some embodiments. A pixel operations component 3377 performs pixel-based operations on the data, though in some instances, pixel operations associated with 2D operations (e.g. bit block image transfers with blending) are performed by the 2D engine 3341, or substituted at display time by the display controller 3343 using overlay display planes. In some embodiments, a shared L3 cache 3375 is available to all graphics components, allowing the sharing of data without the use of main system memory.

In some embodiments, graphics processor media pipeline 3330 includes a media engine 3337 and a video front-end 3334. In some embodiments, video front-end 3334 receives pipeline commands from the command streamer 3303. In some embodiments, media pipeline 3330 includes a separate command streamer. In some embodiments, video front-end 3334 processes media commands before sending the command to the media engine 3337. In some embodiments, media engine 3337 includes thread spawning functionality to spawn threads for dispatch to thread execution logic 3350 via thread dispatcher 3331.

In some embodiments, graphics processor 3300 includes a display engine 3340. In some embodiments, display engine 3340 is external to processor 3300 and couples with the graphics processor via the ring interconnect 3302, or some other interconnect bus or fabric. In some embodiments, display engine 3340 includes a 2D engine 3341 and a display controller 3343. In some embodiments, display engine 3340 contains special purpose logic capable of operating independently of the 3D pipeline. In some embodiments, display controller 3343 couples with a display device (not shown), which may be a system integrated display device, as in a laptop computer, or an external display device attached via a display device connector.

In some embodiments, graphics pipeline 3320 and media pipeline 3330 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 34A is a block diagram illustrating a graphics processor command format 3400 according to some embodiments. FIG. 34B is a block diagram illustrating a graphics processor command sequence 3410 according to an embodiment. The solid lined boxes in FIG. 34A illustrate the components that are generally included in a graphics command while the dashed lines include components that are optional or that are only included in a sub-set of the graphics commands. The exemplary graphics processor command format 3400 of FIG. 34A includes data fields to identify a target client 3402 of the command, a command operation code (opcode) 3404, and the relevant data 3406 for the command. A sub-opcode 3405 and a command size 3408 are also included in some commands.

In some embodiments, client 3402 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 3404 and, if present, sub-opcode 3405 to determine the operation to perform. The client unit performs the command using information in data field 3406. For some commands an explicit command size 3408 is expected to specify the size of the command. In some embodiments, the command parser automatically determines the size of at least some of the commands based on the command opcode. In some embodiments commands are aligned via multiples of a double word.

The flow diagram in FIG. 34B shows an exemplary graphics processor command sequence 3410. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 3410 may begin with a pipeline flush command 3412 to cause any active graphics pipeline to complete the currently pending commands for the pipeline. In some embodiments, the 3D pipeline 3422 and the media pipeline 3424 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 3412 can be used for pipeline synchronization or before placing the graphics processor into a low power state.

In some embodiments, a pipeline select command 3413 is used when a command sequence requires the graphics processor to explicitly switch between pipelines. In some embodiments, a pipeline select command 3413 is required only once within an execution context before issuing pipeline commands unless the context is to issue commands for both pipelines. In some embodiments, a pipeline flush command 3412 is required immediately before a pipeline switch via the pipeline select command 3413.

In some embodiments, a pipeline control command 3414 configures a graphics pipeline for operation and is used to program the 3D pipeline 3422 and the media pipeline 3424. In some embodiments, pipeline control command 3414 configures the pipeline state for the active pipeline. In one embodiment, the pipeline control command 3414 is used for pipeline synchronization and to clear data from one or more cache memories within the active pipeline before processing a batch of commands.

In some embodiments, return buffer state commands 3416 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 3416 includes selecting the size and number of return buffers to use for a set of pipeline operations.

The remaining commands in the command sequence differ based on the active pipeline for operations. Based on a pipeline determination 3420, the command sequence is tailored to the 3D pipeline 3422 beginning with the 3D pipeline state 3430 or the media pipeline 3424 beginning at the media pipeline state 3440.

The commands to configure the 3D pipeline state 3430 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 3430 commands are also able to selectively disable or bypass certain pipeline elements if those elements will not be used.

In some embodiments, 3D primitive 3432 command is used to submit 3D primitives to be processed by the 3D pipeline. Commands and associated parameters that are passed to the graphics processor via the 3D primitive 3432 command are forwarded to the vertex fetch function in the graphics pipeline. The vertex fetch function uses the 3D primitive 3432 command data to generate vertex data structures. The vertex data structures are stored in one or more return buffers. In some embodiments, 3D primitive 3432 command is used to perform vertex operations on 3D primitives via vertex shaders. To process vertex shaders, 3D pipeline 3422 dispatches shader execution threads to graphics processor execution units.

In some embodiments, 3D pipeline 3422 is triggered via an execute 3434 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 3410 follows the media pipeline 3424 path when performing media operations. In general, the specific use and manner of programming for the media pipeline 3424 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 3424 is configured in a similar manner as the 3D pipeline 3422. A set of commands to configure the media pipeline state 3440 are dispatched or placed into a command queue before the media object commands 3442. In some embodiments, media pipeline state commands 3440 include data to configure the media pipeline elements that will be used to process the media objects. This includes data to configure the video decode and video encode logic within the media pipeline, such as encode or decode format. In some embodiments, media pipeline state commands 3440 also support the use of one or more pointers to "indirect" state elements that contain a batch of state settings.

In some embodiments, media object commands 3442 supply pointers to media objects for processing by the media pipeline. The media objects include memory buffers containing video data to be processed. In some embodiments, all media pipeline states must be valid before issuing a media object command 3442. Once the pipeline state is configured and media object commands 3442 are queued, the media pipeline 3424 is triggered via an execute command 3444 or an equivalent execute event (e.g., register write). Output from media pipeline 3424 may then be post processed by operations provided by the 3D pipeline 3422 or the media pipeline 3424. In some embodiments, GPGPU operations are configured and executed in a similar manner as media operations.

Graphics Software Architecture

Figure 35:
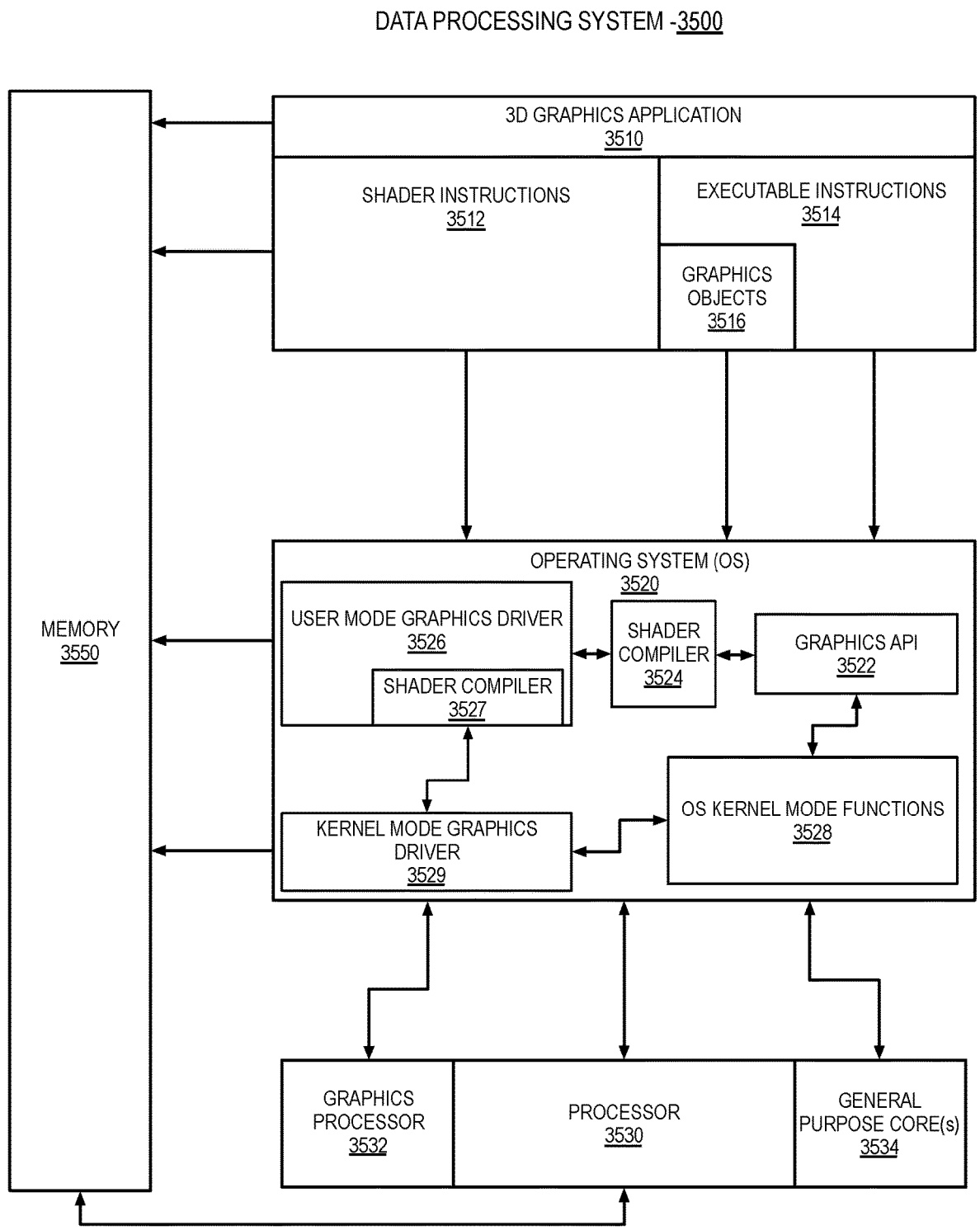
FIG. 35 illustrates exemplary graphics software architecture for a data processing system according to some embodiments.

FIG. 35 illustrates exemplary graphics software architecture for a data processing system 3500 according to some embodiments. In some embodiments, software architecture includes a 3D graphics application 3510, an operating system 3520, and at least one processor 3530. In some embodiments, processor 3530 includes a graphics processor 3532 and one or more general-purpose processor core(s) 3534. The graphics application 3510 and operating system 3520 each execute in the system memory 3550 of the data processing system.

In some embodiments, 3D graphics application 3510 contains one or more shader programs including shader instructions 3512. The shader language instructions may be in a high-level shader language, such as the High Level Shader Language (HLSL) or the OpenGL Shader Language (GLSL). The application also includes executable instructions 3514 in a machine language suitable for execution by the general-purpose processor core 3534. The application also includes graphics objects 3516 defined by vertex data.

In some embodiments, operating system 3520 is a Microsoft® Windows® operating system from the Microsoft Corporation, a proprietary UNIX-like operating system, or an open source UNIX-like operating system using a variant of the Linux kernel. The operating system 3520 can support a graphics API 3522 such as the Direct3D API, the OpenGL API, or the Vulkan API. When the Direct3D API is in use, the operating system 3520 uses a front-end shader compiler 3524 to compile any shader instructions 3512 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 3510. In some embodiments, the shader instructions 3512 are provided in an intermediate form, such as a version of the Standard Portable Intermediate Representation (SPIR) used by the Vulkan API.

In some embodiments, user mode graphics driver 3526 contains a back-end shader compiler 3527 to convert the shader instructions 3512 into a hardware specific representation. When the OpenGL API is in use, shader instructions 3512 in the GLSL high-level language are passed to a user mode graphics driver 3526 for compilation. In some embodiments, user mode graphics driver 3526 uses operating system kernel mode functions 3528 to communicate with a kernel mode graphics driver 3529. In some embodiments, kernel mode graphics driver 3529 communicates with graphics processor 3532 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 36:
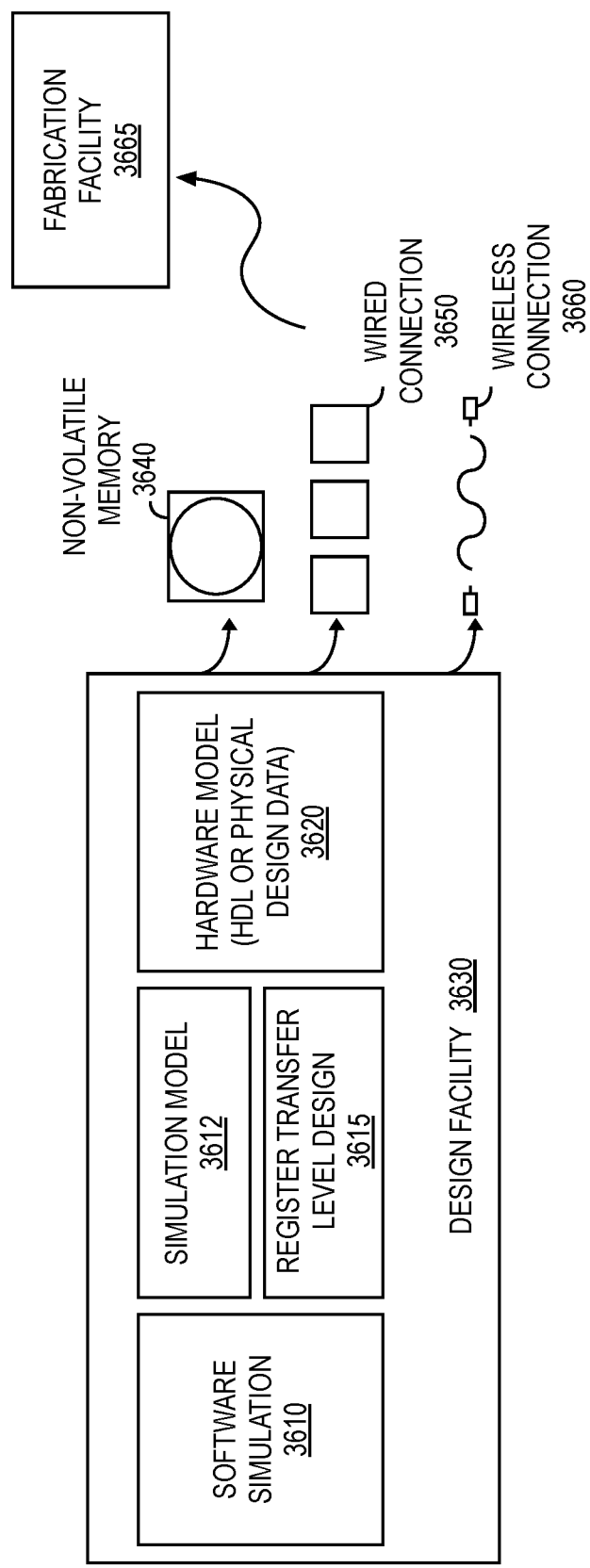
FIG. 36 is a block diagram illustrating an IP core development system, according to an embodiment.

FIG. 36 is a block diagram illustrating an IP core development system 3600 that may be used to manufacture an integrated circuit to perform operations according to an embodiment. The IP core development system 3600 may be used to generate modular, re-usable designs that can be incorporated into a larger design or used to construct an entire integrated circuit (e.g., an SOC integrated circuit). A design facility 3630 can generate a software simulation 3610 of an IP core design in a high level programming language (e.g., C/C++). The software simulation 3610 can be used to design, test, and verify the behavior of the IP core using a simulation model 3612. The simulation model 3612 may include functional, behavioral, and/or timing simulations. A register transfer level (RTL) design 3615 can then be created or synthesized from the simulation model 3612. The RTL design 3615 is an abstraction of the behavior of the integrated circuit that models the flow of digital signals between hardware registers, including the associated logic performed using the modeled digital signals. In addition to an RTL design 3615, lower-level designs at the logic level or transistor level may also be created, designed, or synthesized. Thus, the particular details of the initial design and simulation may vary.

The RTL design 3615 or equivalent may be further synthesized by the design facility into a hardware model 3620, which may be in a hardware description language (HDL), or some other representation of physical design data. The HDL may be further simulated or tested to verify the IP core design. The IP core design can be stored for delivery to a 3rd party fabrication facility 3665 using non-volatile memory 3640 (e.g., hard disk, flash memory, or any non-volatile storage medium). Alternatively, the IP core design may be transmitted (e.g., via the Internet) over a wired connection 3650 or wireless connection 3660. The fabrication facility 3665 may then fabricate an integrated circuit that is based at least in part on the IP core design. The fabricated integrated circuit can be configured to perform operations in accordance with at least one embodiment described herein.

Exemplary System on a Chip Integrated Circuit

Figure 37:
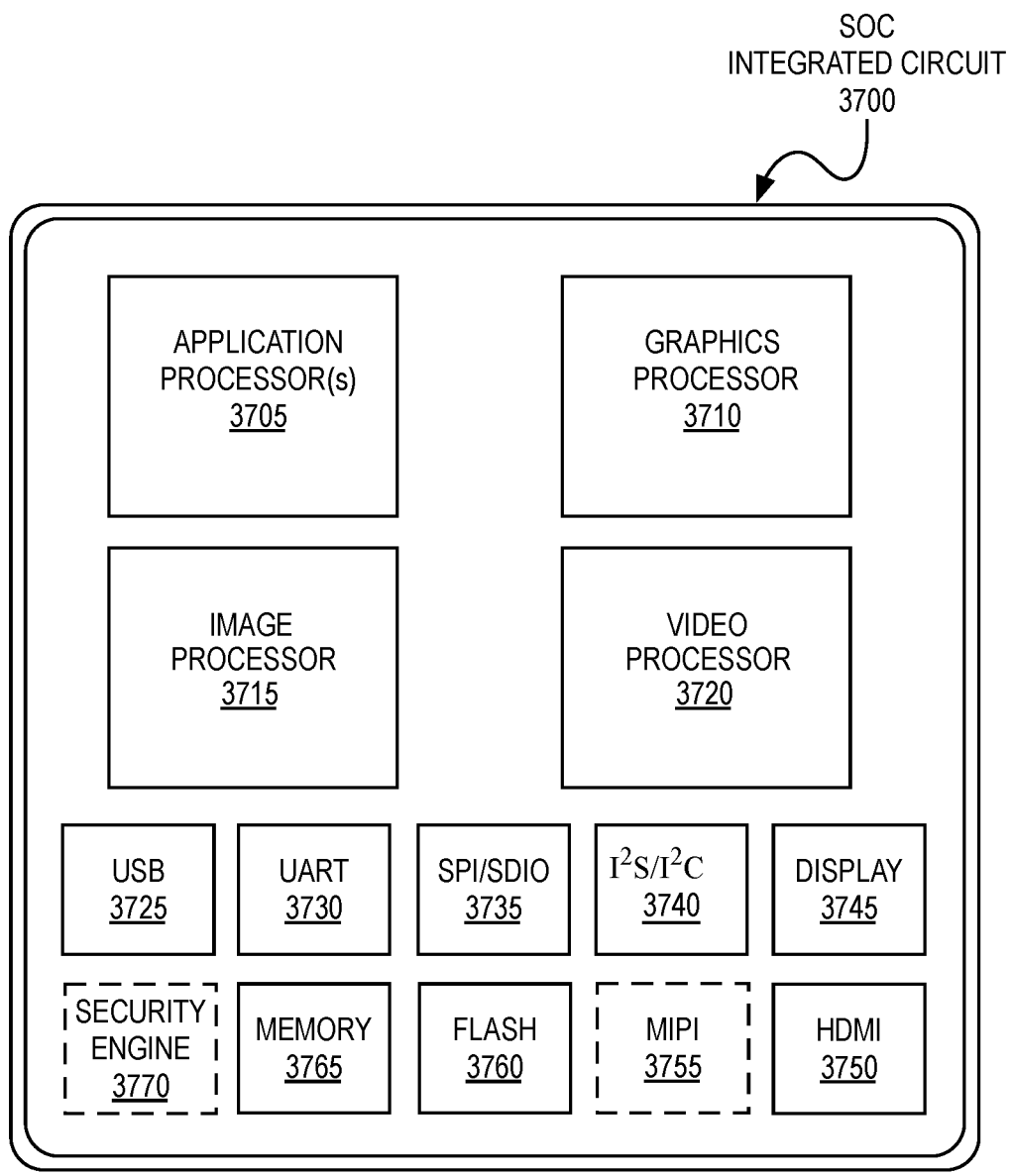
FIG. 37 is a block diagram illustrating an exemplary system on a chip integrated circuit, according to an embodiment.
Figure 38:
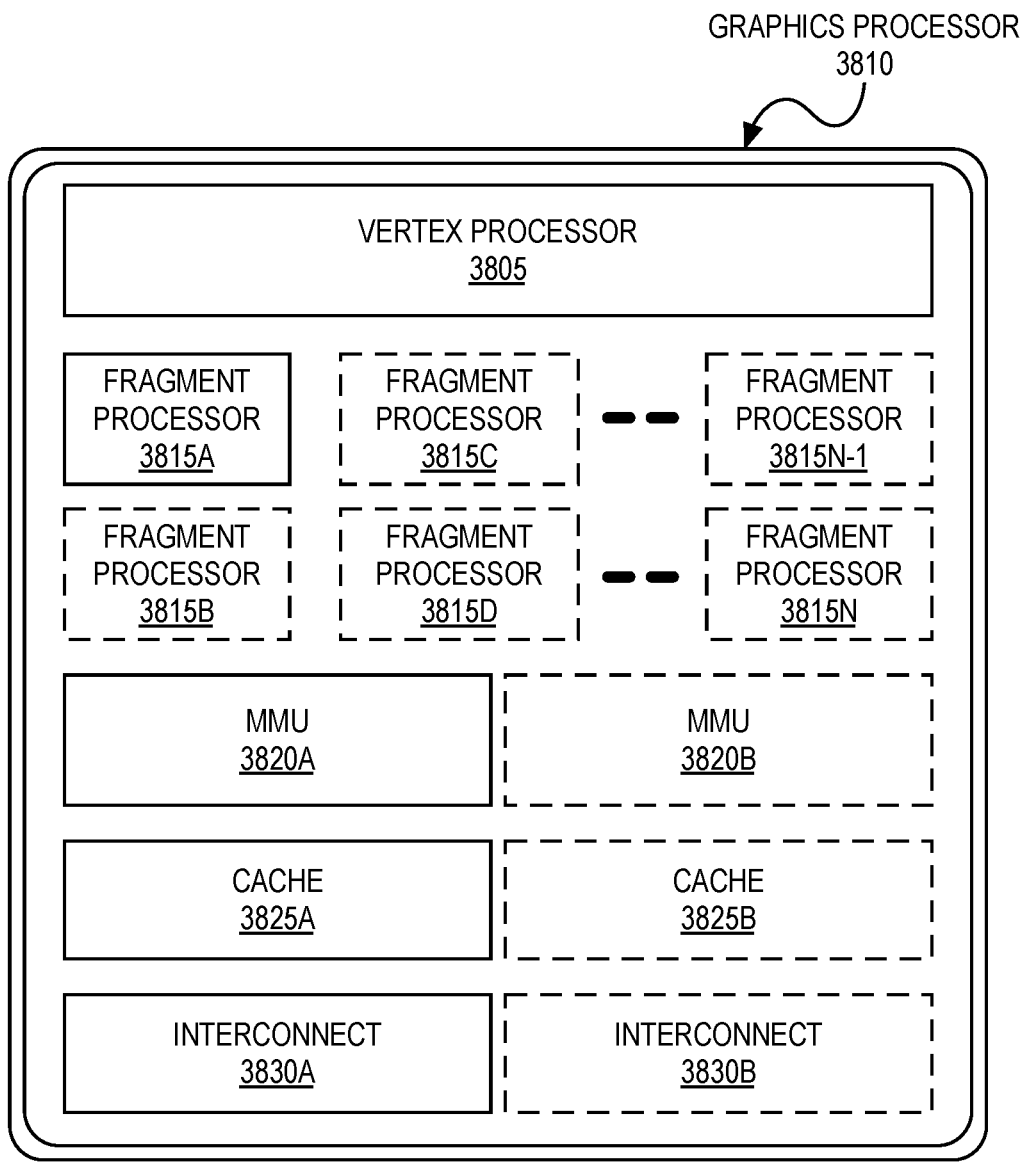
FIG. 38 is a block diagram illustrating an additional graphics processor, according to an embodiment.
Figure 39:
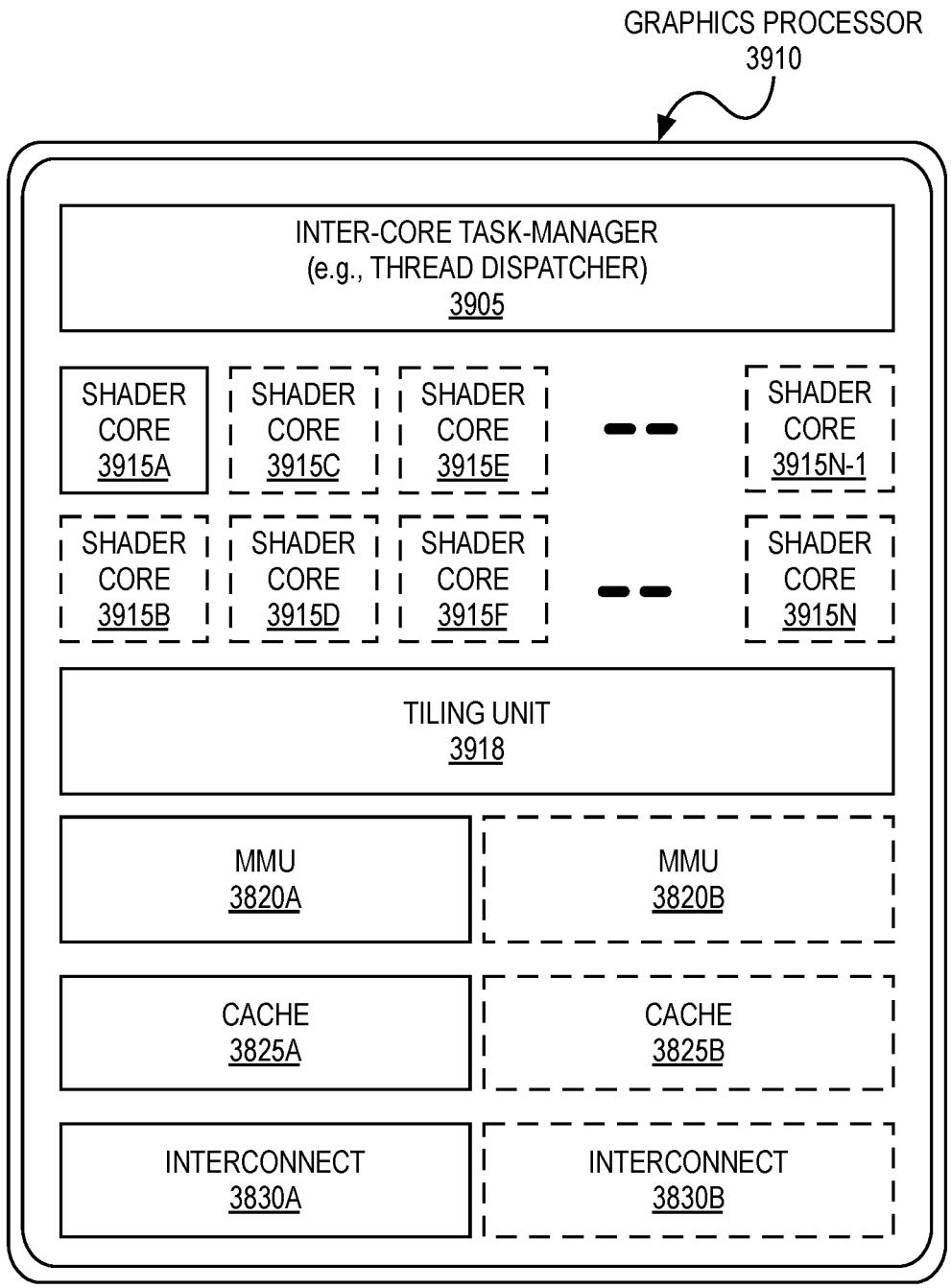
FIG. 39 is a block diagram illustrating an additional exemplary graphics processor of a system on a chip integrated circuit, according to an embodiment.

FIGS. 37-39 illustrated exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general purpose processor cores.

FIG. 37 is a block diagram illustrating an exemplary system on a chip integrated circuit 3700 that may be fabricated using one or more IP cores, according to an embodiment. Exemplary integrated circuit 3700 includes one or more application processor(s) 3705 (e.g., CPUs), at least one graphics processor 3710, and may additionally include an image processor 3715 and/or a video processor 3720, any of which may be a modular IP core from the same or multiple different design facilities. Integrated circuit 3700 includes peripheral or bus logic including a USB controller 3725, UART controller 3730, an SPI/SDIO controller 3735, and an I²S/I²C controller 3740. Additionally, the integrated circuit can include a display device 3745 coupled to one or more of a high-definition multimedia interface (HDMI) controller 3750 and a mobile industry processor interface (MIPI) display interface 3755. Storage may be provided by a flash memory subsystem 3760 including flash memory and a flash memory controller. Memory interface may be provided via a memory controller 3765 for access to SDRAM or SRAM memory devices. Some integrated circuits additionally include an embedded security engine 3770.

FIG. 38 is a block diagram illustrating an exemplary graphics processor 3810 of a system on a chip integrated circuit that may be fabricated using one or more IP cores, according to an embodiment. Graphics processor 3810 can be a variant of the graphics processor 3710 of FIG. 37. Graphics processor 3810 includes a vertex processor 3805 and one or more fragment processor(s) 3815A-3815N (e.g., 3815A, 3815B, 3815C, 3815D, through 3815N-1, and 3815N). Graphics processor 3810 can execute different shader programs via separate logic, such that the vertex processor 3805 is optimized to execute operations for vertex shader programs, while the one or more fragment processor(s) 3815A-3815N execute fragment (e.g., pixel) shading operations for fragment or pixel shader programs. The vertex processor 3805 performs the vertex processing stage of the 3D graphics pipeline and generates primitives and vertex data. The fragment processor(s) 3815A-3815N use the primitive and vertex data generated by the vertex processor 3805 to produce a framebuffer that is displayed on a display device. In one embodiment, the fragment processor(s) 3815A-3815N are optimized to execute fragment shader programs as provided for in the OpenGL API, which may be used to perform similar operations as a pixel shader program as provided for in the Direct 3D API.

Graphics processor 3810 additionally includes one or more memory management units (MMUs) 3820A-3820B, cache(s) 3825A-3825B, and circuit interconnect(s) 3830A-3830B. The one or more MMU(s) 3820A-3820B provide for virtual to physical address mapping for integrated circuit 3810, including for the vertex processor 3805 and/or fragment processor(s) 3815A-3815N, which may reference vertex or image/texture data stored in memory, in addition to vertex or image/texture data stored in the one or more cache(s) 3825A-3825B. In one embodiment the one or more MMU(s) 3825A-3825B may be synchronized with other MMUs within the system, including one or more MMUs associated with the one or more application processor(s) 3705, image processor 3715, and/or video processor 3720 of FIG. 37, such that each processor 3705-3720 can participate in a shared or unified virtual memory system. The one or more circuit interconnect(s) 3830A-3830B enable graphics processor 3810 to interface with other IP cores within the SoC, either via an internal bus of the SoC or via a direct connection, according to embodiments.

FIG. 39 is a block diagram illustrating an additional exemplary graphics processor 3910 of a system on a chip integrated circuit that may be fabricated using one or more IP cores, according to an embodiment. Graphics processor 3910 can be a variant of the graphics processor 3710 of FIG. 37. Graphics processor 3910 includes the one or more MMU(s) 3820A-3820B, caches 3825A-3825B, and circuit interconnects 3830A-3830B of the graphics processor 3810 of FIG. 38.

Graphics processor 3910 includes one or more shader core(s) 3915A-3915N (e.g., 3915A, 3915B, 3915C, 3915D, 3915E, 3915F, through 3915N-1, and 3915N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 3910 includes an inter-core task manager 3905, which acts as a thread dispatcher to dispatch execution threads to one or more shader cores 3915A-3915N and a tiling unit 3918 to accelerate tiling operations for tile-based rendering, in which rendering operations for a scene are subdivided in image space, for example to exploit local spatial coherence within a scene or to optimize use of internal caches.

The following clauses and/or examples pertain to specific embodiments or examples thereof. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Various components can be a means for performing the operations or functions described.

One embodiment provides for a computing device within an autonomous vehicle, the compute device comprising a wireless network device to enable a wireless data connection with an autonomous vehicle network, a set of multiple processors including a general-purpose processor and a general-purpose graphics processor, the set of multiple processors to execute a compute manager to manage execution of compute workloads associated with the autonomous vehicle, the compute workload associated with autonomous operations of the autonomous vehicle, and offload logic configured to execute on the set of multiple processors, the offload logic to determine to offload one or more of the compute workloads to one or more autonomous vehicles within range of the wireless network device.

One embodiment provides for a method of performing machine learning operations for an autonomous vehicle, the method comprising determining that a computational workload is to be processed by a computing device of the autonomous vehicle; determining a first latency to a remote datacenter via an autonomous vehicle network; dispatching at least a first portion of the computational workload for processing via the remote datacenter when the first latency is below a threshold associated with the computational workload; determining a second latency to an autonomous vehicle within range of wireless network device in response to a determination that the first latency is above the threshold associated with the computational workload; and dispatching at least a second portion of the computational workload in response determining that the second latency is below the threshold associated with the computational workload.

One embodiment provides for an autonomous vehicle comprising a wireless network device to enable a wireless data connection with an autonomous vehicle network; a set of multiple processors including a general-purpose processor and a general-purpose graphics processor, the set of multiple processors to execute a compute manager to manage execution of compute workloads associated with the autonomous vehicle; and offload logic configured to execute on the set of multiple processors, the offload logic to determine to offload one or more of the compute workloads to one or more autonomous vehicles within range of the wireless network device.

One embodiment provides an autonomous vehicle comprising one or more processors to provide a local compute manager to manage execution of compute workloads associated with the autonomous vehicle, the local compute manager configured to establish an encrypted communication link with an autonomous vehicle network via a wireless communication interface, receive, via the wireless communication interface, a search descriptor associated with a search operation to be performed based on real-time sensory data, and spawn a work item to perform a search operation on based on processed sensor data.

One embodiment provides a method performed by an autonomous vehicle, where the method comprises establishing an encrypted communication link with an autonomous vehicle network via a wireless communication interface, receiving, via the wireless communication interface, a search descriptor associated with a search operation to be performed based on real-time sensory data, and spawning a work item to perform a search operation on based on processed sensor data. One embodiment provides a non-transitory machine readable medium storing instructions to cause one or more processors of an autonomous vehicle to perform the method.

One embodiment provides an autonomous vehicle comprising one or more processors to provide a local compute manager to manage execution of compute workloads associated with the autonomous vehicle, the local compute manager configured to establish a map of occupied positions within the autonomous vehicle based on data received from a first set of sensors for determining an internal position of one or more occupants of the autonomous vehicle, detect an impending collision during autonomous navigation based on a second set of sensors for facilitating navigation of the autonomous vehicle, and determining whether the impending collision is unavoidable. In response to a determination that the impending collision is unavoidable, the autonomous vehicle is configured to mitigate harm caused by the impending collision based on the map of occupied positions within the autonomous vehicle.

One embodiment provides a method performed by an autonomous vehicle, where the method comprises establishing a map of occupied positions within the autonomous vehicle based on data received from a first set of sensors for determining an internal position of one or more occupants of the autonomous vehicle, detecting an impending collision during autonomous navigation based on a second set of sensors for facilitating navigation of the autonomous vehicle, and determining whether the impending collision is unavoidable. In response to determining that the impending collision is unavoidable, the method includes configuring the autonomous vehicle to mitigate harm caused by the impending collision based on the map of occupied positions within the autonomous vehicle. One embodiment provides a non-transitory machine readable medium storing instructions to cause one or more processors of an autonomous vehicle to perform the method.

One embodiment provides an autonomous vehicle comprising one or more processors to provide a local compute manager to manage execution of compute workloads associated with the autonomous vehicle, the local compute manager configured to detect a collision associated with the autonomous vehicle based on a first set of sensors for health characteristics of occupants of the autonomous vehicle or a second set of sensors for vehicle characteristics of the autonomous vehicle and, in response to detection of the collision, infer a post-collision response based on sensor data gathered via the first set of sensors or the second set of sensors.

One embodiment provides a method performed by an autonomous vehicle, where the method comprises detecting a collision associated with the autonomous vehicle based on a first set of sensors for health characteristics of occupants of the autonomous vehicle or a second set of sensors for vehicle characteristics of the autonomous vehicle and, in response to detection of the collision, inferring a post-collision response based on sensor data gathered via the first set of sensors or the second set of sensors. One embodiment provides a non-transitory machine readable medium storing instructions to cause one or more processors of an autonomous vehicle to perform the method.

The embodiments described herein refer to specific configurations of hardware, such as application specific integrated circuits (ASICs), configured to perform certain operations or having a predetermined functionality. Such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage devices of a given electronic device typically store code and/or data for execution on the set of one or more processors of that electronic device.

Of course, one or more parts of an embodiment may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the embodiments may be practiced without some of these specific details. In certain instances, well-known structures and functions were not described in elaborate detail to avoid obscuring the inventive subject matter of the embodiments. Accordingly, the scope and spirit of the invention should be judged in terms of the claims that follow.

What is claimed is:

1. An autonomous vehicle comprising:
    one or more processors to provide a local compute manager to manage execution of compute workloads associated with the autonomous vehicle, the local compute manager configured to:
        establish an encrypted communication link with an autonomous vehicle network via a wireless communication interface;
        receive, via the wireless communication interface, a search descriptor associated with a search operation to be performed based on real-time sensory data; and
        spawn a work item to perform a search operation on based on processed sensor data.

2. The autonomous vehicle as in claim 1, wherein the local compute manager is to receive the search descriptor from a vehicle-to-infrastructure node connected with the autonomous vehicle network.

3. The autonomous vehicle as in claim 1, wherein the local compute manager is to receive the search descriptor from a first remote autonomous vehicle connected with the autonomous vehicle network.

4. The autonomous vehicle as in claim 1, wherein the local compute manager is to:
    discover a remote autonomous vehicle connected with the autonomous vehicle network; and
    transmit the search descriptor to the remote autonomous vehicle, wherein the local compute manager is to:
        establish a trust relationship with a remote compute manager of the remote autonomous vehicle before transmission of the search descriptor to the remote autonomous vehicle;
        determine a location for the remote autonomous vehicle; and
        transmit the search descriptor to the remote autonomous vehicle based on the location of the remote autonomous vehicle.

5. The autonomous vehicle as in claim 1, wherein the search descriptor includes search details for the search operation.

6. The autonomous vehicle as in claim 5, wherein the search details include a search area for the search operation.

7. The autonomous vehicle as in claim 5, wherein the search details include a vehicle description for the search operation.

8. The autonomous vehicle as in claim 1, wherein the work item to perform the search operation is a background compute operation to enable passive analysis of processed sensor data.

9. An autonomous vehicle comprising:
    one or more processors to provide a local compute manager to manage execution of compute workloads associated with the autonomous vehicle, the local compute manager configured to:
        establish a map of occupied positions within the autonomous vehicle based on data received from a first set of sensors for determining an internal position of one or more occupants of the autonomous vehicle;
        detect an impending collision during autonomous navigation based on a second set of sensors for facilitating navigation of the autonomous vehicle;
        determining whether the impending collision is unavoidable; and
        in response to a determination that the impending collision is unavoidable, configure the autonomous vehicle to mitigate harm caused by the impending collision based on the map of occupied positions within the autonomous vehicle.

10. The autonomous vehicle as in claim 9, wherein to configure the autonomous vehicle to mitigate the impending collision includes to maneuver the autonomous vehicle to reduce collision damage to occupied positions within the autonomous vehicle.

11. The autonomous vehicle as in claim 9, wherein to configure the autonomous vehicle to mitigate the impending collision includes to pre-inflate an internal airbag of the autonomous vehicle.

12. The autonomous vehicle as in claim 9, wherein to configure the autonomous vehicle to mitigate the impending collision includes to pre-inflate an external airbag of the autonomous vehicle.

13. The autonomous vehicle as in claim 9, wherein to configure the autonomous vehicle to mitigate the impending collision includes to activate a seat belt pre-tensioner of the autonomous vehicle.

14. The autonomous vehicle as in claim 9, wherein the local compute manager is configured to:
    detect movement within the autonomous vehicle; and
    update the map of occupied positions within the autonomous vehicle.

15. The autonomous vehicle as in claim 9, wherein the local compute manager is configured to:
    determine a post-collision mobility state for the autonomous vehicle; and in response to determination that the autonomous vehicle is mobile, cause the autonomous vehicle to autonomously move to a location determined based on the second set of sensors.

16. An autonomous vehicle comprising:
one or more processors to provide a local compute manager to manage execution of compute workloads associated with the autonomous vehicle, the local compute manager configured to detect a collision associated with the autonomous vehicle based on a first set of sensors for health characteristics of occupants of the autonomous vehicle or a second set of sensors for vehicle characteristics of the autonomous vehicle and,
in response to detection of the collision, infer a post-collision response based on sensor data gathered via the first set of sensors or the second set of sensors.

17. The autonomous vehicle as in claim 16, wherein the second set of sensors includes a collision detection sensor or vehicle damage sensor.

18. The autonomous vehicle as in claim 16, wherein the second set of sensors includes a camera, radar sensor, or lidar sensor.

19. The autonomous vehicle as in claim 16, wherein to infer the post-collision response based on sensor data includes to provide the sensor data to a machine learning model executed by the local compute manager and receive an inferred post-collision response from the machine learning model.

20. The autonomous vehicle as in claim 16, wherein the post-collision response includes to:
compile an incident report based on the sensor data;
determine an injury severity for occupants of the autonomous vehicle; and
determine a damage severity for the autonomous vehicle.

21. The autonomous vehicle as in claim 20, wherein the post-collision response additionally includes to, in response to determination of severe damage or sever injury, transmit the incident report to emergency services associated with a determined location of the autonomous vehicle.

22. The autonomous vehicle as in claim 16, wherein the post-collision response additionally includes to:
determine a post-collision mobility state for the autonomous vehicle;
in response to determination that the autonomous vehicle is mobile, cause the autonomous vehicle to autonomously move to a location determined based on the second set of sensors; and
in response to determination that the autonomous vehicle is immobile, engage a post-collision safety feature of the autonomous vehicle.

23. The autonomous vehicle as in claim 22, wherein to engage the post-collision safety feature includes to disable a drive motor of the autonomous vehicle.

24. The autonomous vehicle as in claim 22, wherein to engage the post-collision safety feature includes to unlock a door of the autonomous vehicle.

25. The autonomous vehicle as in claim 22, wherein to engage the post-collision safety feature includes to enable a hazard or warning light of the autonomous vehicle.

* * * * *